United States Patent
Maeda et al.

(10) Patent No.: US 6,918,127 B2
(45) Date of Patent: Jul. 12, 2005

(54) DISK LOADING APPARATUS IN RECORDING AND REPRODUCING APPARATUS

(75) Inventors: Shinichi Maeda, Osaka (JP); Hidehiko Ota, Ehime (JP); Hirofumi Furukawa, Osaka (JP); Michio Fukuyama, deceased, late of Ehime (JP); Mariko Fukuyama, by legal representative, Ehime (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 216 days.

(21) Appl. No.: 10/111,805

(22) PCT Filed: Aug. 23, 2001

(86) PCT No.: PCT/JP01/07235

§ 371 (c)(1),
(2), (4) Date: Aug. 30, 2002

(87) PCT Pub. No.: WO02/19327

PCT Pub. Date: Mar. 7, 2002

(65) Prior Publication Data

US 2003/0099182 A1 May 29, 2003

(30) Foreign Application Priority Data

Aug. 31, 2000 (JP) ........................................ 2000-262448

(51) Int. Cl.[7] ............................................ G11B 33/02
(52) U.S. Cl. ..................................................... 720/620
(58) Field of Search .......................... 720/620; 369/77.1, 369/77.2, 75.1, 75.2, 78.1

(56) References Cited

U.S. PATENT DOCUMENTS

| | | | | |
|---|---|---|---|---|
| 5,022,023 A | * | 6/1991 | Toyoguchi | 369/77.1 |
| 5,226,028 A | * | 7/1993 | Yamada et al. | 369/77.1 |
| 5,416,763 A | * | 5/1995 | Ohsaki | 369/77.1 |
| 5,539,713 A | * | 7/1996 | Ido et al. | 369/30.32 |
| 5,822,290 A | * | 10/1998 | Lee | 369/75.1 |
| 6,335,914 B2 | * | 1/2002 | Tanaka et al. | 369/77.1 |
| 6,345,030 B1 | * | 2/2002 | Sakurai et al. | 369/192 |
| 6,494,370 B1 | * | 12/2002 | Sanchez | 235/454 |

FOREIGN PATENT DOCUMENTS

| | | |
|---|---|---|
| EP | 0944075 A2 | 9/1999 |
| JP | 2105264 | 8/1990 |
| JP | 04330689 | 11/1992 |
| JP | 620372 | 1/1994 |
| JP | 8167209 | 6/1996 |
| JP | 09139002 | 5/1997 |
| JP | 10255366 | 9/1998 |
| JP | 11066677 | 3/1999 |
| JP | 11259942 | 9/1999 |
| JP | 11345449 | 12/1999 |

OTHER PUBLICATIONS

International Search Report dated Dec. 18, 2001.

* cited by examiner

*Primary Examiner*—David Ometz
*Assistant Examiner*—Mark Blouin
(74) *Attorney, Agent, or Firm*—Stevens, Davis, Miller & Mosher, LLP

(57) ABSTRACT

A disk loading apparatus may include a first retaining device that is arranged in a slot for a disk to be inserted and thereby retains the outer edge of the disk so as to permit it to pass through the slot. A transferring device transfers the disk retained by the first retaining device to a predetermined position. A second retaining device is arranged in the interior from the slot and thereby retains the outer edge of the disk retained by the first retaining device and transferred by the transferring device. A rotating device rotates the disk at the predetermined position. Also, each of the first and second retaining devices has a contact section for contacting with the outer edge, upper surface, and lower surface of the disk in a slidable manner.

25 Claims, 60 Drawing Sheets

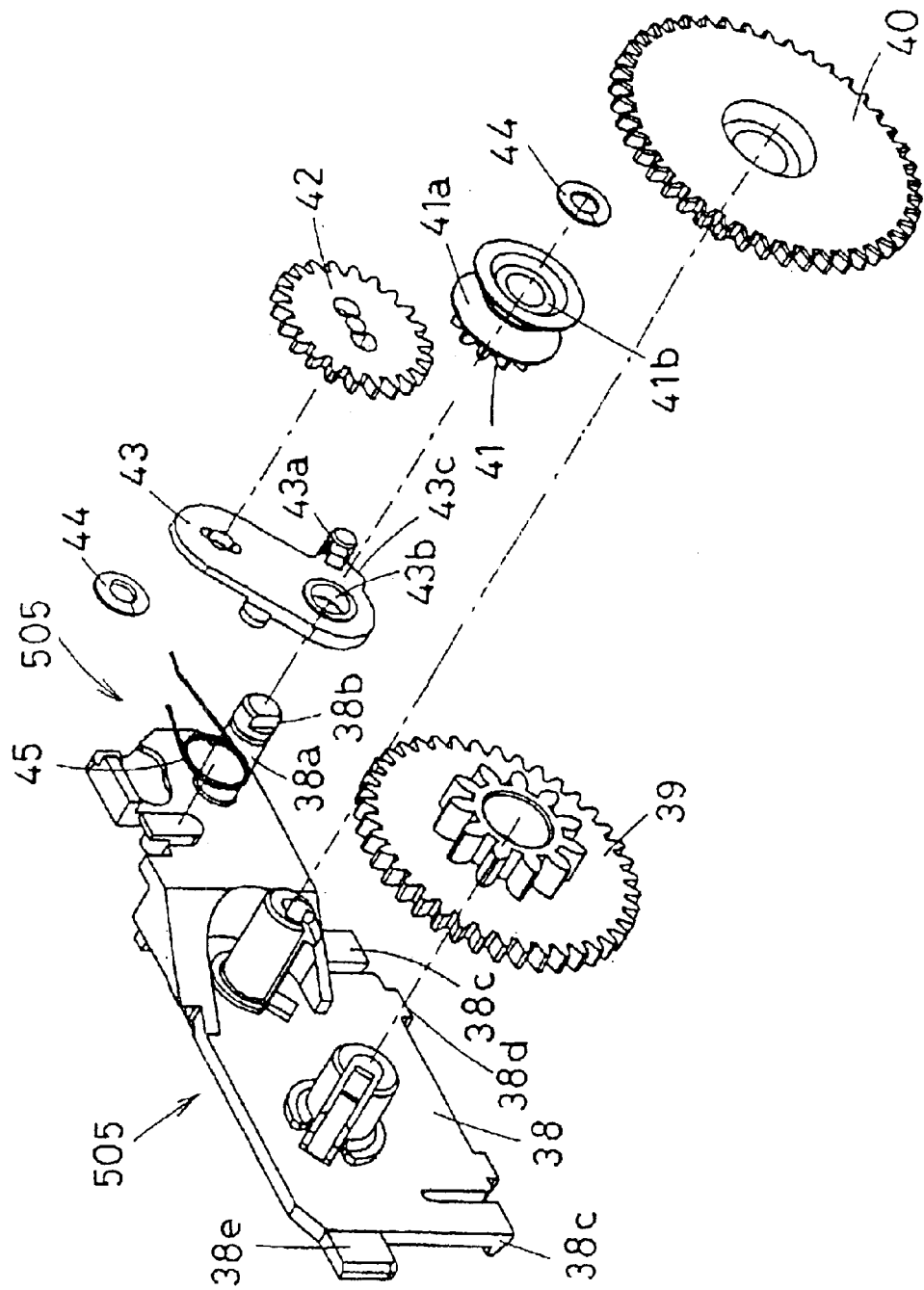

FIG. 13
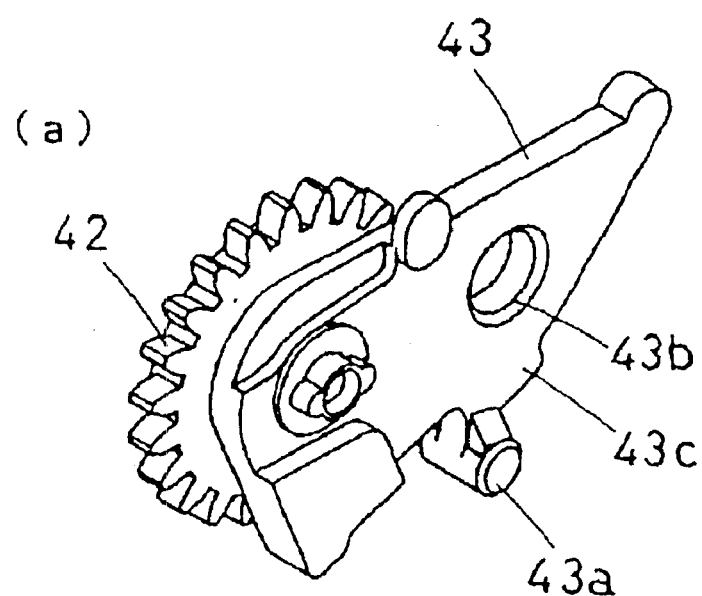
(a)
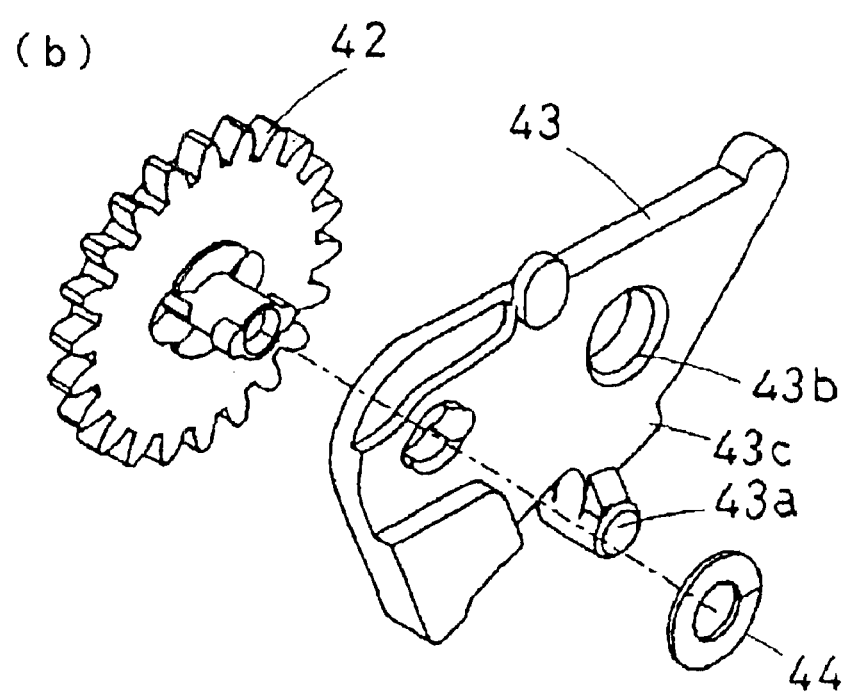
(b)

FIG. 38
(a)
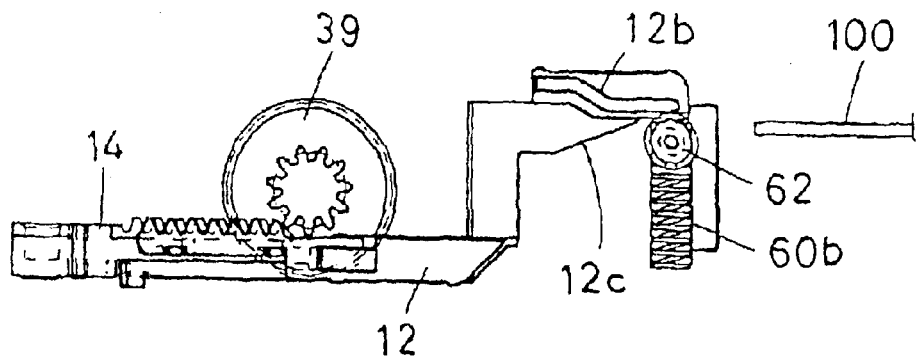
(b)
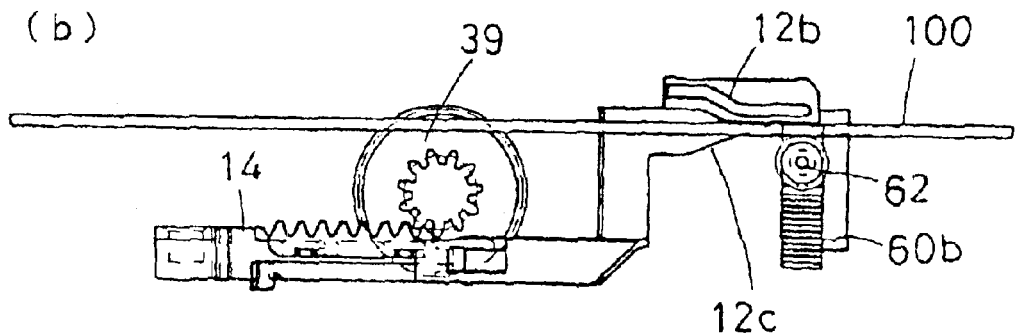
(c)
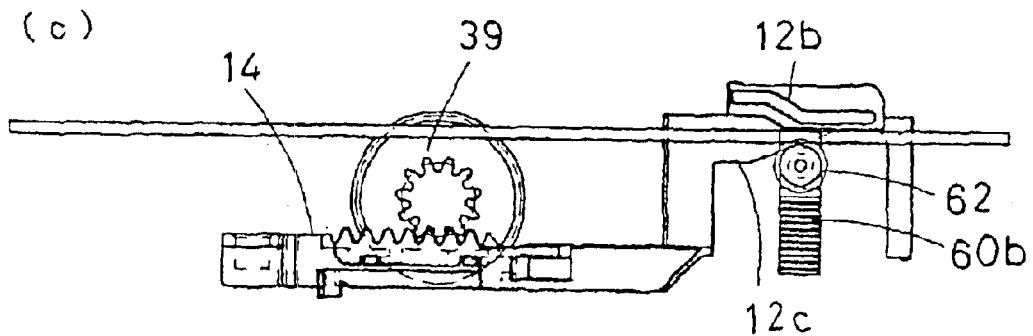
(d)
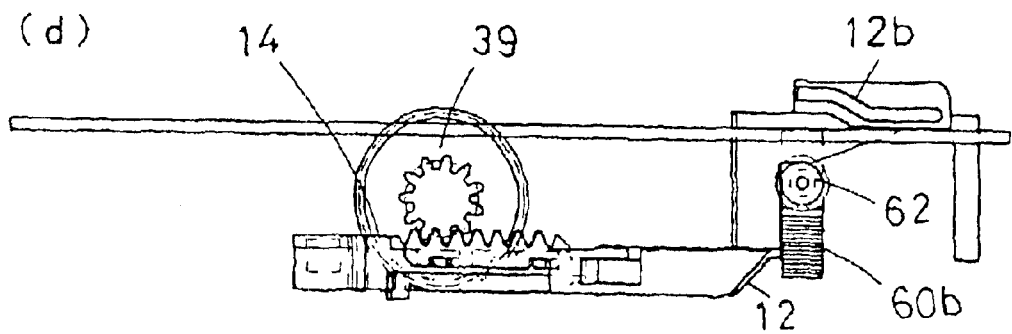

FIG. 50
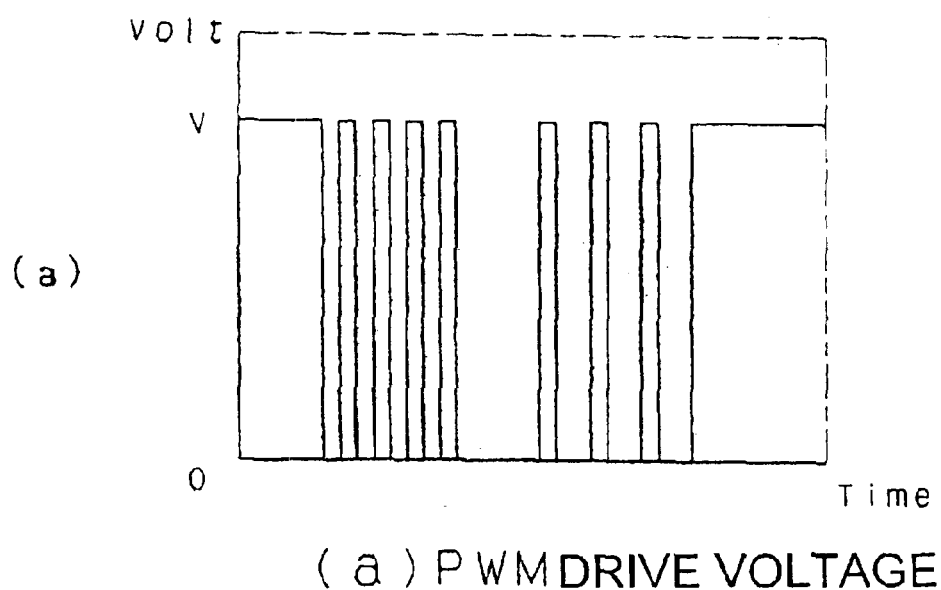
(a) PWM DRIVE VOLTAGE
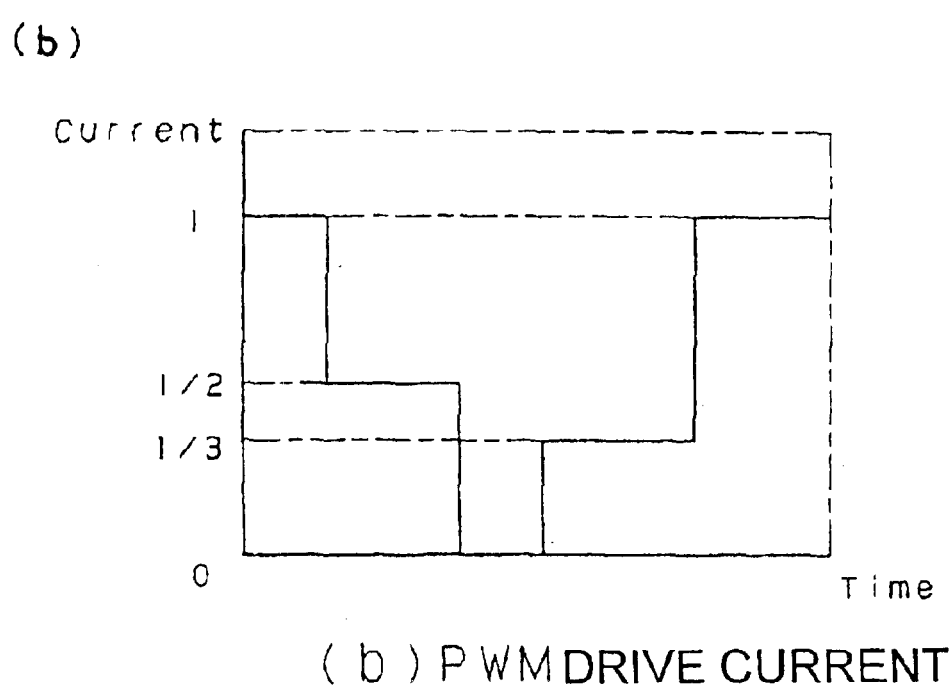
(b) PWM DRIVE CURRENT

FIG. 51
(a) Within guaranteed temperature range (normal usable temperature range)
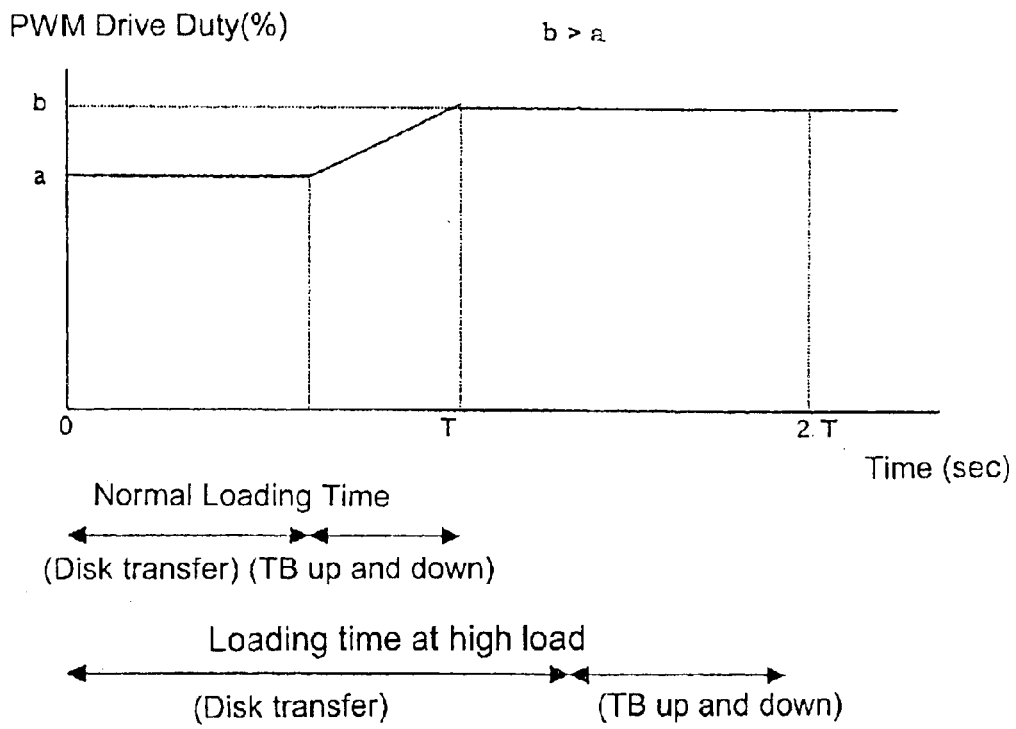
(b) Outside guaranteed temperature range
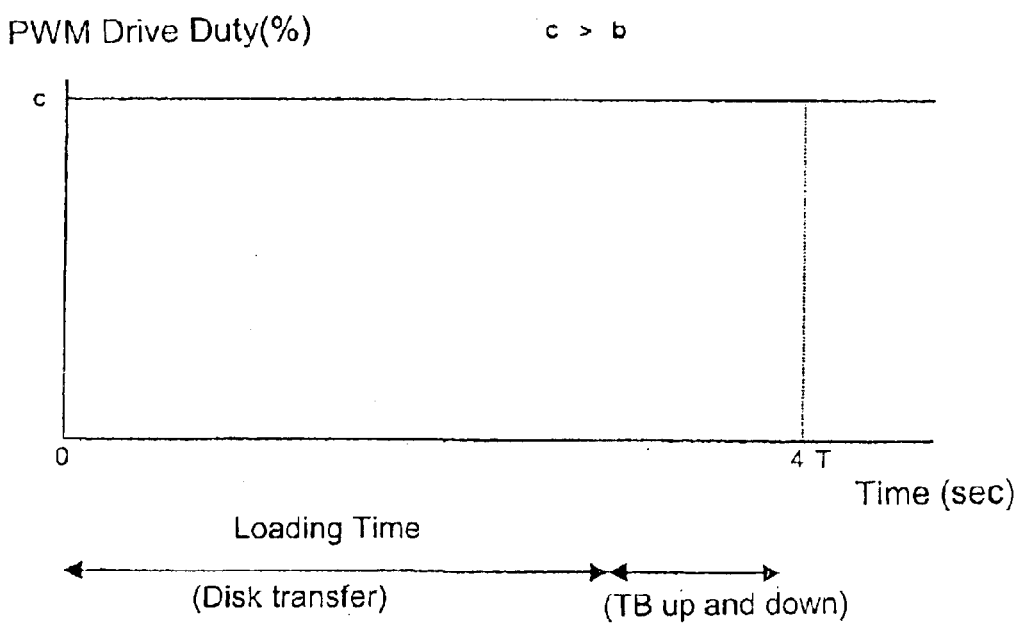

FIG. 52
(a) Within guaranteed temperature range (normal usable temperature range)
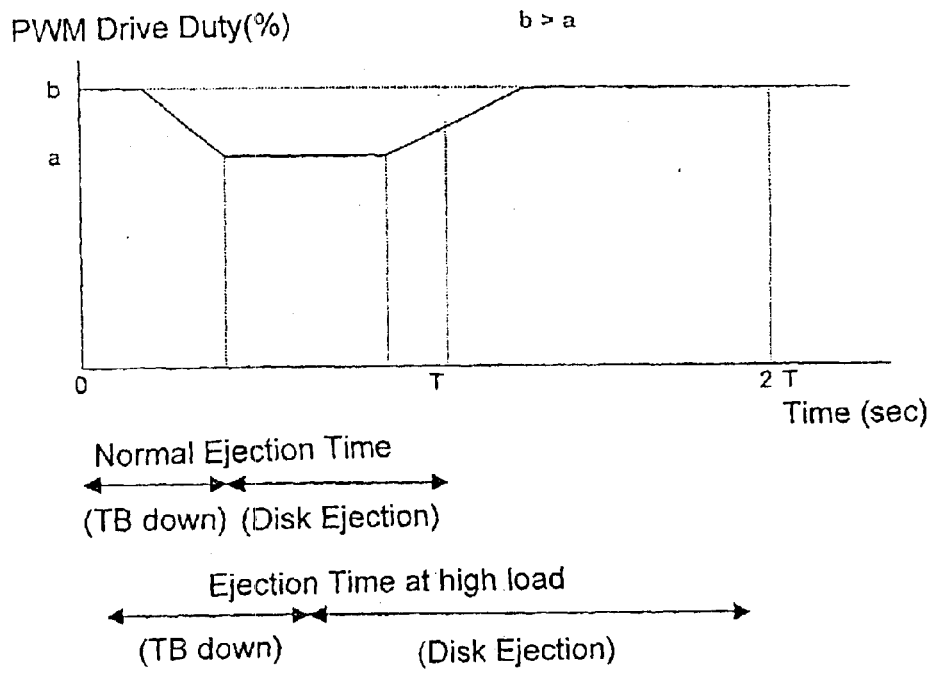
(b) Outside guaranteed temperature range
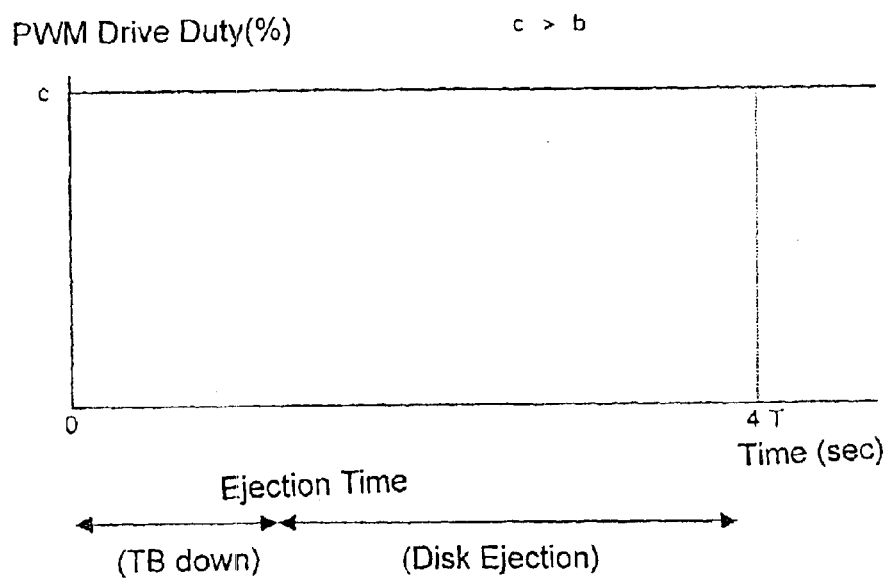

DISK LOADING APPARATUS IN RECORDING AND REPRODUCING APPARATUS

TECHNICAL FIELD

The present invention relates to a disk loading apparatus in an apparatus for recording, reproducing, or recording and reproducing information to and/or from a disk by means of light or the like, that is, in a recording and reproducing apparatus for handling a recording and reproducing disk.

BACKGROUND ART

Recording media presently used for information equipment such as computers include: reproduction dedicated disks such as CD-ROMs; and erasable (rewritable) disks according to magneto-optical method and phase change method.

A prior art disk loading apparatus for disk-shaped recording media is disclosed in JP-A 10-255366. The apparatus is a mechanism for centering a transferred disk, and comprises: at least two centering members for confronting the outer edge of a disk and thereby centering the disk, wherein the position of the centering members varies correspondingly to the size of the disk; and a detection member for detecting the size of the disk and thereby controlling the position of the centering members correspondingly to the size of the disk.

According to this disk loading apparatus, a disk of diverse size can be centered in a disk loading apparatus of so-called slot-in type.

Nevertheless, regardless of the size of the disk, the disk is supported by centering pins at the disk outer edge and by rollers in the disk thickness direction, in the course of disk transfer from the slot to the above of the turntable. Then, when the disk is placed on the turntable, the rollers supporting the disk bottom surface is lowered down, and at the same time, the disk outer edge is slightly pushed back by the elasticity of a pressed piece.

In such a configuration, the mechanism needs to have precision. Further, when the disk is placed on the turntable, a pressing force is applied to the disk substantially in an inclined state. This can cause scratches in the information surface of the disk, and still does not suppress off-centering in disk catching. During the disk catching, the rear pin contacts with the disk, but the front pin does not. Accordingly, the disk is completely not retained by the pins. Further, the disk is centered solely by the rear pin.

In a prior art drive apparatus for transferring a disk by retaining the disk outer edge, the thickness direction of the disk is clamped by tapered rubber rollers and tapered plastic members, whereby the plane in which the disk is retained inside the drive apparatus is defined by any three of these rubber rollers and plastic members. Accordingly, depending on the insert position of the disk, the leading edge of the disk deviates up, down, right, or left. This can cause the problem that the disk surface contacts with the other members inside the drive apparatus. In order to avoid the contact, sufficiently large gaps are necessary between the transferred disk and the other members. In particular, in a drive apparatus for handling a disk of diverse size, such positional deviation easily occurs in the disk outer shape.

DISCLOSURE OF INVENTION

A disk loading apparatus according to the invention used in a recording and reproducing apparatus has been devised in order to resolve the above-mentioned disadvantages and problems in the prior art. An object of the invention is to reduce the thickness of a disk loading apparatus without causing scratches in the surface of a disk of diverse size.

In order to engage a disk with a spindle motor precisely without causing scratches in the disk surface, retaining means needs to retain the disk by contacting with the outer edge thereof during disk transfer. When the disk is engaged with the spindle motor, the retaining means needs to stay at a position slightly departing from the outer edge of the disk in order to avoid an extremely large off-centering of the disk. Further, on completion of the engagement with the spindle motor, the retaining means needs to retract to a position substantially departing from the outer edge of the disk. Nevertheless, in general, such necessity causes complexity in the configuration, and thereby degrades reliability. In a disk loading apparatus according to the invention, a simple lever mechanism resolves such a problem.

In order to begin to transfer the disk without causing scratches in the disk, disk transferring means needs to move in advance by detecting that the outer edge of the disk is inserted to the apparatus. A disk loading apparatus according to the invention resolves such a problem.

In order to eject the disk from the apparatus without causing scratches in the disk, disk transferring means needs to move such that the disk ejection position does not go outside the disk retaining means. A disk loading apparatus according to the invention resolves such a problem.

In order to transfer the disk without causing scratches in the disk, positional deviation in the right and left needs to be restricted during the disk transfer. A disk loading apparatus according to the invention resolves such a problem.

In order to transfer a disk of diverse size without causing scratches in the disk, the position of the disk retaining means needs to be changed depending on the disk diameter. A disk loading apparatus according to the invention resolves such a problem.

In order to transfer a disk of diverse size without causing scratches in the disk, the position of the disk retaining means needs to be precisely changed depending on the disk diameter. A disk loading apparatus according to the invention resolves such a problem.

In order to avoid transfer shift in the retaining means and damage to the drive system caused by a drop shock during transportation, necessary is a lock mechanism for locking the retaining means when no disk is loaded. A disk loading apparatus according to the invention resolves such a problem.

In order for a single motor to drive the motion of disk insertion and disk ejection, the up and down motion of the traverse base carrying an optical pickup and a spindle motor, and the up and down motion of the clamp section, a motion switching mechanism needs to be provided in the disk transferring means. A disk loading apparatus according to the invention resolves such a problem.

In order to transfer a disk without causing scratches in the disk, and in order for a single motor to drive the motion of disk insertion and disk ejection, the up and down motion of the traverse base carrying an optical pickup and a spindle motor, and the up and down motion of the clamp section, necessary is a motion switching mechanism acting in linkage with the disk transferring means. A disk loading apparatus according to the invention resolves such a problem.

In order for a single motor to drive stably the motion of disk insertion and disk ejection, the up and down motion of the traverse base carrying an optical pickup and a spindle motor, and the up and down motion of the clamp section, the driving force transmission from the motor to the drive mechanism for disk insertion and disk ejection needs to be disconnected from the time of completion of disk insertion to the time of beginning of disk ejection. A disk loading apparatus according to the invention resolves such a problem.

In order for a single motor to drive stably the motion of disk insertion and disk ejection, the up and down motion of the traverse base carrying an optical pickup and a spindle motor, and the up and down motion of the clamp section, a pair of slide rack mechanisms slidable in opposite directions to each other need to be provided at positions symmetric with respect to the disk center. A disk loading apparatus according to the invention resolves such a problem.

In order to eject the disk from the drive apparatus by mechanical means when the power is off, necessary is a mechanism for carrying out the down motion of the traverse base carrying an optical pickup and a spindle motor, the up and hold motion of the clamp, and the motion of disk ejection. A disk loading apparatus according to the invention resolves such a problem.

In order to transfer the disk without causing scratches in the disk, a clamp restricting member acting in linkage with the transferring means need to be provided in order to prevent the transferred disk from being contacted by the clamp arranged opposingly to the disk motor across the disk. A disk loading apparatus according to the invention resolves such a problem.

In order for a single motor to drive precisely the motion of disk insertion and disk ejection, the up and down motion of the traverse base carrying an optical pickup and a spindle motor, and the up and down motion of the clamp section, a pair of slide racks slidable in two directions need to be used in the mechanical control of the various motion. A disk loading apparatus according to the invention resolves such a problem.

In order to reduce the drive length and simplify the drive configuration, the engaging and retaining sections for engaging a mechanism chassis containing the mechanism with a frame needs to be provided inside the mechanism chassis. A disk loading apparatus according to the invention resolves such a problem.

Depending on the OS (operating system) of a PC (personal computer), disk ejection by hardware is inhibited by some PC makers. It is difficult to satisfy, simultaneously by mechanical means, both the PC makers' request that an eject button for ordinary use is unnecessary but that the function of electrical forced ejection is necessary and the manufacturers' request that an eject button for ordinary use is necessary in assembly lines. A disk loading apparatus according to the invention resolves such a problem.

In order for a single motor to drive the motion of disk insertion and disk ejection, the up and down motion of the traverse base carrying an optical pickup and a spindle motor, and the up and down motion of the clamp section, and in order to reduce acoustic noise in the loading, the method of drive needs to be changed in the control circuit depending on the motion. A disk loading apparatus according to the invention resolves such a problem.

In order for a single motor to drive the motion of disk insertion and disk ejection, the up and down motion of the traverse base carrying an optical pickup and a spindle motor, and the up and down motion of the clamp section, and in order to reduce acoustic noise in the loading at normal temperatures, and further in order to increase the torque of the motor correspondingly to load increase at low temperatures, the method of drive needs to be changed in the control circuit. A disk loading apparatus according to the invention resolves such a problem.

In order for a single motor to drive the motion of disk insertion and disk ejection, the up and down motion of the traverse base carrying an optical pickup and a spindle motor, and the up and down motion of the clamp section, and in order to reduce acoustic noise in the loading at normal temperatures, and further in order to increase the torque of the motor correspondingly to aged increase in the load of disk loading, the method of drive needs to be changed in the control circuit. A disk loading apparatus according to the invention resolves such a problem.

A first aspect of the invention is a disk loading apparatus comprising: first retaining means which is arranged in a slot for a disk to be inserted and thereby retains the outer edge of the disk so as to permit the disk inserted into the slot to pass through the slot; transferring means for transferring the disk retained by the first retaining means, to a predetermined position; second retaining means which is arranged in the interior from the slot and thereby retains the outer edge of the disk retained by the first retaining means and transferred by the transferring means; and rotating means for rotating the disk at the predetermined position.

According to this configuration, the first retaining means and the second retaining means retain the outer edge of the disk during the disk transfer. This permits restriction in the elevation and the position of the disk within the apparatus. Thus, avoided is the previous necessity that in order to avoid the contact between the transferred disk and various members in the apparatus and in order to avoid scratches in the disk surface, sufficiently large gaps need to be designed between the transferred disk and various members in the apparatus. This permits reduction in the thickness of the apparatus. Further, the invention is applicable to disks of diverse size.

In the above-mentioned configuration, the discrepancy is set substantially reduced between the disk transfer level of the transferring means and the disk rotation level of the rotating means.

According to this configuration, the substantial reduction in the discrepancy between the disk transfer level and the disk rotation level permits further reduction in the thickness of the apparatus. Further, the reduction in the disk traveling distance reduces the possibility of scratching in the disk.

In the above-mentioned configuration: each of the first retaining means and the second retaining means has groove-shaped confronting sections for engaging with the outer edge of the disk in a slidable manner; and at the beginning of engagement between the disk and the rotating means, each confronting section stays at a position in which the groove bottom of the confronting section is slightly departing from the outer edge of the disk, while on completion of the engagement between the disk and the rotating means, each confronting section retracts to a position substantially departing from the outer edge of the disk.

According to this configuration, at the beginning of engagement between the disk and the rotating means, each of the first retaining means and the second retaining means stays at a position slightly departing from the outer edge of the disk, while on completion of the engagement between the disk and the rotating means, each retaining means retracts to a position substantially departing from the outer edge of the disk. Accordingly, the first retaining means and the second retaining means can be formed with simple arms. Further, without suffering scratches in the disk surface, the disk can engage with the spindle motor precisely.

In the above-mentioned configuration, the first retaining means comprises a pair of levers which grip the outer edge of the disk in a slidable manner and are arranged at positions symmetric with respect to the transfer direction of the disk.

According to this configuration, positional shift is avoided in the direction perpendicular to the direction of disk transfer.

In the above-mentioned configuration, at least one lever in the pair of levers comprises an arm for contacting with the disk at first when the disk is inserted into the disk loading apparatus.

According to this configuration, the arm serves as a disk detection arm when the disk is inserted. Accordingly, when it is detected that the outer edge of the disk enters into the apparatus, the disk transferring means is moved in advance, whereby disk transfer is started without suffering scratches in the disk.

In the above-mentioned configuration, at least one lever in the pair of levers comprises an arm for contacting with the disk at last when the disk is ejected from the disk loading apparatus.

According to this configuration, the position of disk ejection can be set not to go outside the disk retaining means, whereby the disk is ejected without suffering scratches in the disk.

In the above-mentioned configuration, the pair of levers comprise a link mechanism in which a motion of one lever causes a motion of the other lever.

According to this configuration, positional shift of the disk is restricted in the right and left during disk transfer, whereby the disk is transferred without suffering scratches in the disk.

In the above-mentioned configuration, the second retaining means comprises three levers.

According to this configuration, the retaining position of the retaining means can be changed depending on the disk diameter, whereby a disk of diverse size is transferred without suffering scratches in the disk.

In the above-mentioned configuration, the second retaining means comprises: three levers; and cam plates for engaging with the levers and thereby defining the path of disk transfer.

According to this configuration, the retaining position of the retaining means can be precisely changed depending on the disk diameter, whereby a disk of diverse size is transferred without suffering scratches in the disk.

In the above-mentioned configuration, the three levers are configured such that a second lever and a third lever are attached to a first lever.

According to this configuration, in addition to the effect of claim 8 or 9, the retaining position of the retaining means can be precisely changed depending on the disk diameter by means of a simple lever mechanism, whereby a disk of diverse size is transferred without suffering scratches in the disk.

In the above-mentioned configuration, the second lever or the third lever comprises a rotary arm for retaining the outer edge of the disk in a slidable manner.

According to this configuration, when no disk is loaded (inserted), the rotary arm serves as a lock mechanism for the second retaining means, whereby avoided are transfer shift in the retaining means and damage to the drive system caused by a drop shock during transportation.

In the above-mentioned configuration, the cam plates are composed of a first cam plate fixed to the disk loading apparatus and a second cam plate which is movable.

According to this configuration, the fixed first cam plate determines the path during disk transfer. On completion of disk transfer, a motor drives the second cam plate via the disk and the second cam plate, whereby this single motor can drive the motion of disk insertion and disk ejection, the up and down motion of the traverse base carrying an optical pickup and a spindle motor, and the up and down motion of the clamp section.

In the above-mentioned configuration, the transferring means for the disk comprises: a transfer mechanism for pressing and retaining the outer circumference solely of the disk; a motor and a series of gears for driving the transfer mechanism; and racks capable of engaging with and departing from at least one gear in the series of gears.

This configuration permits a motion switching mechanism in the disk transferring means, whereby a single motor can drive the motion of disk insertion and disk ejection, the up and down motion of the traverse base carrying an optical pickup and a spindle motor, and the up and down motion of the clamp section.

In the above-mentioned configuration, the transfer mechanism comprises a pair of rotary retaining members which are arranged opposingly to each other in the direction perpendicular to the disk transfer direction and parallel to the disk and thereby move the outer circumference of the disk by friction.

According to this configuration, the transfer mechanism comprises a pair of rotary retaining members such as tapered rubber rollers, whereby the disk is transferred without suffering scratches in the disk.

In the above-mentioned configuration, the transfer mechanism comprises: a fixed member for sliding along the outer circumference of the disk; and a rotary retaining member for moving the outer circumference of the disk by friction; the members are arranged opposingly to each other in the direction of disk thickness.

According to this configuration, the transfer mechanism comprises: a fixed member such as a tapered plastic pad; and a rotary retaining member such as a tapered rubber roller; whereby the disk is transferred without suffering scratches in the disk.

In the above-mentioned configuration, the series of gears further comprise a clutch capable of engaging with and departing from the gear of at least one rotary retaining member.

This configuration permits a motion switching mechanism acting in linkage with the disk transferring means. Further, the disk is transferred without suffering scratches in the disk. Furthermore, a single motor can drive the motion of disk insertion and disk ejection, the up and down motion of the traverse base carrying an optical pickup and a spindle motor, and the up and down motion of the clamp section.

In the above-mentioned configuration, the racks are composed of: a first rack engaging with the second retaining means; and a second rack not engaging with the second retaining means but slidable along the first rack; wherein when the first rack is moved by the second retaining means, each of the first rack and the second rack engages with a gear in the series of gears.

According to this configuration, the racks are composed of a first rack and a second rack, whereby the driving force transmission from the motor to the drive mechanism for disk insertion and disk ejection can be disconnected from the time of completion of disk insertion to the time of beginning of disk ejection. Accordingly, a single motor can drive stably the motion of disk insertion and disk ejection, the up and down motion of the traverse base carrying an optical pickup and a spindle motor, and the up and down motion of the clamp section.

In the above-mentioned configuration, the racks further comprise a third rack for acting symmetrically to the second rack by means of a link mechanism.

According to this configuration, the second rack and the third rack form a pair of slide rack mechanisms slidable in opposite directions to each other provided at positions symmetric with respect to the disk center. Accordingly, a single motor can drive stably the motion of disk insertion and disk ejection, the up and down motion of the traverse base carrying an optical pickup and a spindle motor, and the up and down motion of the clamp section.

In the above-mentioned configuration, the racks further comprise a fourth rack capable of engaging with and departing from the gear of the rotary retaining member.

According to this configuration, the fourth rack permits a mechanism for carrying out the down motion of the traverse base carrying an optical pickup and a spindle motor, the up and hold motion of the clamp, and the motion of disk ejection. This permits the ejection of the disk from the drive apparatus by mechanical means when the power is off.

In the above-mentioned configuration, the rotating means for the disk comprises: a disk motor for retaining the disk; a clamp arranged opposingly to the disk motor across the disk; and a clamp restricting member capable of engaging with and departing from the clamp.

This configuration permits a clamp restricting member acting in linkage with the transferring means so as to prevent the transferred disk from being contacted by the clamp. Accordingly, the disk is transferred without suffering scratches in the disk.

In the above-mentioned configuration, the rotating means for the disk comprises: a disk motor for retaining the disk; a clamp arranged opposingly to the disk motor across the disk; and a clamp restricting member capable of engaging with and departing from the clamp; wherein each of the second rack and the third rack is provided with: a cam groove for the up and down motion of the rotating means for the disk; a cam groove for the up and down motion of the clamp; and a cam groove for the engagement motion of the clamp restricting member.

According to this configuration, a pair of slide racks slidable in two directions can carry out precisely the mechanical control of the various motion.

A second aspect of the invention is a disk loading apparatus comprising: a mechanism chassis for containing a mechanism; and a frame serving as a cover capable of engaging with and departing from the mechanism chassis; wherein each of both side surfaces of the mechanism chassis is provided with a groove open forward and backward, and wherein the frame is provided with bent members each capable of engaging with and departing from the groove.

According to this configuration, the engaging and retaining sections for engaging the mechanism chassis containing the mechanism with the frame can be provided inside the mechanism chassis. This reduces the drive length and simplifies the drive configuration.

A third aspect of the invention is a disk loading apparatus comprising: a disk ejection switch; and disk transferring means for transferring a disk in response to the disk ejection switch; wherein depending on the frequency or the duration in which the disk ejection switch is pressed, the method of disk ejection is changed in the disk transferring means.

According to this configuration, for example, when the pressed duration is 1 sec or shorter, the disk transferring means ejects the disk, whereas when the pressed duration is longer, the disk transferring means ejects the disk during the pressed duration. Then, without adding a new mechanism, this configuration satisfies both the PC makers' request that an eject button for ordinary use is unnecessary but that the function of electrical forced ejection is necessary and the manufacturers' request that an eject button for ordinary use is necessary in assembly lines.

A fourth aspect of the invention is a disk loading apparatus comprising: a switch for detecting the completion of disk loading; a switch for detecting the completion of disk ejection; a disk ejection switch; and disk transferring means for transferring a disk in response to the disk ejection switch; wherein when the disk ejection switch is pressed, the method of disk ejection is changed in the disk transferring means depending on the state of the switch for detecting the completion of disk loading or the switch for detecting the completion of disk ejection.

According to this configuration, for example, during disk loading, the disk transferring means ejects the disk. During disk ejection, when the pressed duration of the disk ejection switch is 1 sec or shorter, the motion is changed in to disk loading, whereas when the pressed duration is longer, the disk transferring means ejects the disk during the pressed duration. Then, without adding a new mechanism, this configuration satisfies both the PC makers' request that an eject button for ordinary use is unnecessary but that the function of electrical forced ejection is necessary and the manufacturers' request that an eject button for ordinary use is necessary in assembly lines.

A fifth aspect of the invention is a disk loading apparatus comprising: disk transferring means; a drive circuit for the disk transferring means; and disk rotating means; wherein the drive circuit is composed of a PWM drive circuit, whereby the operation duty can be changed between a value for disk insertion and disk ejection and a value for the up and down motion of the disk rotating means after the disk is loaded.

This configuration permits optimization of the drive in the control circuit correspondingly to each motion. Accordingly, a single motor can drive the motion of disk insertion and disk ejection, the up and down motion of the traverse base carrying an optical pickup and a spindle motor, and the up and down motion of the clamp section. Further, acoustic noise is reduced in the loading.

A sixth aspect of the invention is a disk loading apparatus comprising: disk transferring means; a drive circuit for the disk transferring means; and temperature detecting means; wherein the drive circuit is composed of a PWM drive circuit, whereby the operation duty of the disk transferring means is changed on the basis of the detected temperature.

According to this configuration, the method of drive can be changed in the control circuit. Accordingly, a single motor can drive the motion of disk insertion and disk ejection, the up and down motion of the traverse base carrying an optical pickup and a spindle motor, and the up and down motion of the clamp section. Further, acoustic noise is reduced in the loading at normal temperatures. Furthermore, the torque of the motor is increased correspondingly to load increase at low temperatures.

In the above-mentioned configuration, the operation duty during disk insertion and disk ejection is set lower than the value for the up and down motion of the disk rotating means after the disk is loaded.

According to this configuration, the method of drive can be changed in the control circuit. Accordingly, a single motor can drive the motion of disk insertion and disk ejection, the up and down motion of the traverse base carrying an optical pickup and a spindle motor, and the up and down motion of the clamp section. Further, acoustic noise is reduced in the loading at normal temperatures.

In the above-mentioned configuration, a time-out limit is provided in the PWM drive of the drive circuit, wherein the time-out limit is set at or longer than the twice of either the disk loading time or the disk ejection time at normal temperatures.

According to this configuration, similarly to claim 25, the method of drive can be changed in the control circuit. Accordingly, a single motor can drive the motion of disk insertion and disk ejection, the up and down motion of the traverse base carrying an optical pickup and a spindle motor, and the up and down motion of the clamp section. Further, acoustic noise is reduced in the loading at normal temperatures. Furthermore, the torque of the motor is increased correspondingly to aged increase in the load of disk loading.

BRIEF DESCRIPTION OF THE DRAWINGS

FIG. 2 shows an exploded perspective view of a mechanism chassis unit, an out lever unit, and the like.

FIG. 3 shows an exploded perspective view of a mechanism chassis unit, an out lever unit, a motor base unit, a slide cam unit, and the like.

FIG. 11 shows an exploded perspective view of a motor base B unit.

FIG. 12 shows a perspective view of a motor base B unit.

FIG. 13 shows a perspective view of a clutch.

FIG. 15 shows a perspective view of the assembled state of a set lever, a check lever, and the like.

FIG. 16 shows an exploded perspective view of a check plate unit in the assembled state of a set lever, a check lever, and the like.

FIG. 38 shows a view illustrating the situation that a roller unit disengages from a disk.

FIG. 50(a) shows PWM drive voltage.

FIG. 50(b) shows PWM drive current.

FIG. 51(a) shows the specification of PWM drive duty as a function of time in disk loading at temperatures within a guaranteed temperature range.

FIG. 51(b) shows the specification of PWM drive duty as a function of time in disk loading at temperatures outside a guaranteed temperature range.

FIG. 52(a) shows the specification of PWM drive duty as a function of time in disk ejection at temperatures within a guaranteed temperature range.

FIG. 52(b) shows the specification of PWM drive duty as a function of time in disk ejection at temperatures outside a guaranteed temperature range.

BEST MODE FOR CARRYING OUT THE INVENTION

An embodiment of the invention is described below with reference to the drawings. A disk loading apparatus according to the invention can be used in horizontal, vertical, and upward installation. The last installation indicates that the insertion slot is in the top surface. For simplicity in the following description, the disk loading apparatus is assumed to be in horizontal installation.

The invention treats: reproducing disks such as music CDs and DVD-ROMs; and recording disks such as DVD-RAMs; both having a diameter of 8 cm or 12 cm. These disks are generically referred to as media, herein. What needs to be considered regarding the loading mechanism is the shape of a medium. Thus, the scheme of recording and reproducing and the recording density are not restricted to the above-mentioned ones.

The general configuration of the disk loading apparatus is described below at first. Then, the configuration of each section is described in detail.

Figure 1:
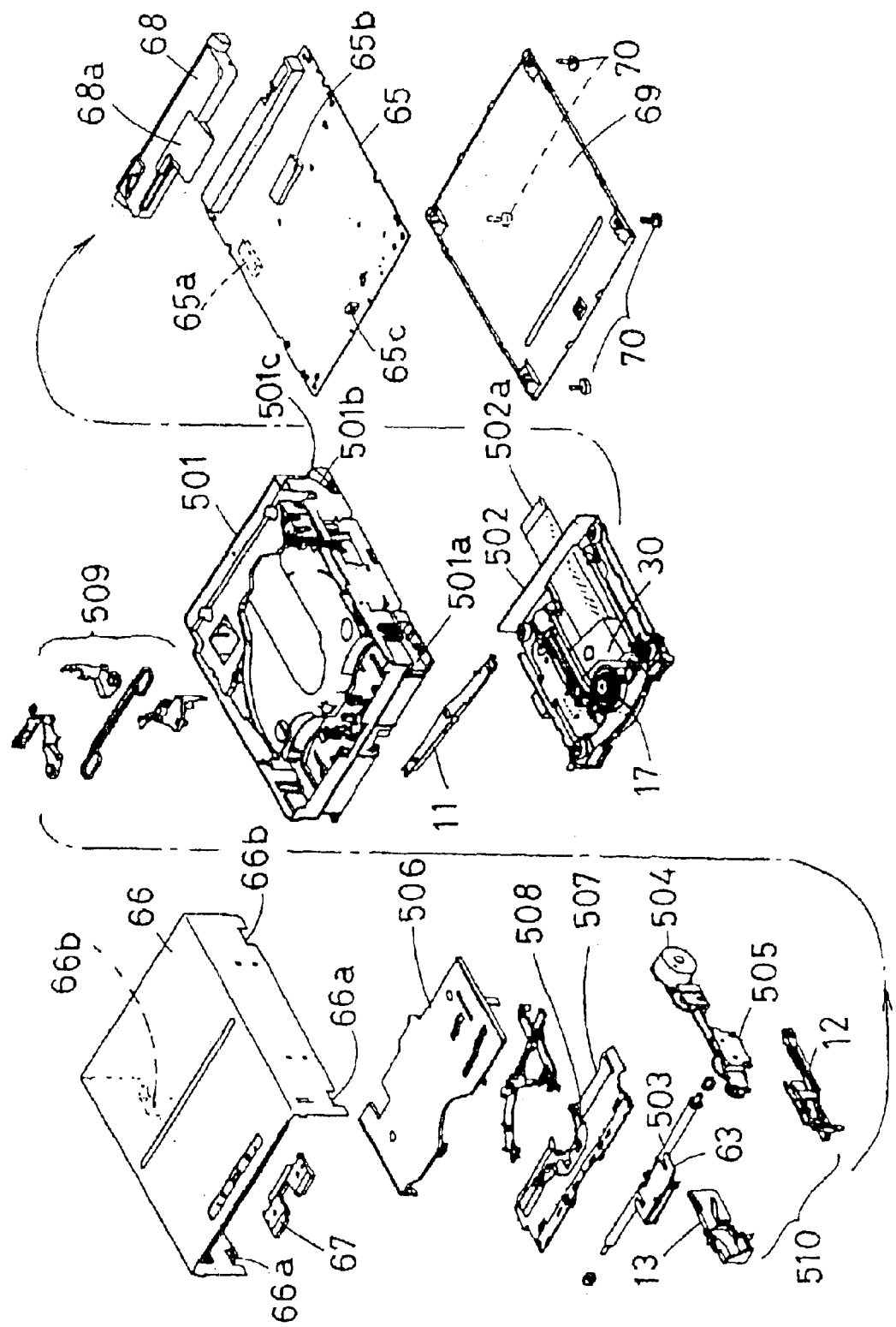
FIG. 1 shows an exploded perspective view of an embodiment of the invention.

FIG. 1 shows a basic configuration of the drive apparatus. The basic configuration comprises: a mechanism chassis unit 501 serving as the main body; a traverse unit 502 for recording and reproducing; a roller unit 503 serving as transferring means; a motor base A unit 504; a motor base B unit 505; a check plate unit 506 serving as second retaining means; a top plate unit 507 located above the disk; a clamp unit 508 (see FIG. 21); an out-lever unit 509 serving as first retaining means; and a slide cam unit 510.

Below the mechanism chassis unit 501, sequentially stacked are the traverse unit 502, a printed circuit board 65 (P board, hereafter), and a lower shield 69 serving as a bottom plate. Above the mechanism chassis unit 501, sequentially stacked are the out-lever unit 509, the slide cam unit 510, the motor base units 504 and 505, the roller unit 503, the top plate unit 507, the clamp unit 508, and the check plate unit 506. A frame 66 serving as a cover closes the top of the mechanism chassis unit 501. In this assembly, an insertion slot for a disk is formed between the mechanism chassis unit 501 and the frame 66. Attachment pieces 66a and 66b which are cut and bent inward in both side surfaces of the frame 66 engage with grooves 501a and 501b which are provided in the side surfaces of the mechanism chassis unit 501 such as to be open forward and backward. With covering the mechanism chassis unit 501 with the frame 66, the front attachment pieces 66a are inserted into the front grooves 501a, while the rear attachment pieces 66b are inserted into the rear grooves 501b, whereby alignment is achieved. More specifically, a guide ridge 501c is provided in the entrance of the rear groove 501b, whereby the attachment piece 66b is slid down along the guide ridge 501c. As such, alignment is achieved. Then, the attachment pieces 66a and 66b are screwed to the mechanism chassis unit 501 by screws 70, together with the P board 65 and the lower shield 69.

A top guide 67 is attached to the frame 66 by screws, and thereby guides the leading edge of a disk 100 when the disk 100 is inserted in the disk insertion slot formed between the frame 66 and the mechanism chassis unit 501.

Numeral 11 indicates a slide cam rod the center of which is supported rotatably around an axis in the mechanism chassis unit 501 and both ends of which engage with right and left slide cams 12 and 13 of the slide cam unit 510, whereby sliding of the slide cam R 12 causes sliding of the slide cam L 13 in the opposite direction. Numeral 68 indicates a base cover for protecting the P board 65 from the traverse unit 502. A flexible portion 502a of a flexible lead connected to an optical pickup 30 (see FIG. 8) of the traverse unit 502 bends downward on the base cover 68. The leading tip thereof goes further to the opposite direction downward, and thereby connects to the connector 65b of the P board 65. Accordingly, the flexible lead can follow the travel of the optical pickup 30.

Figure 2:
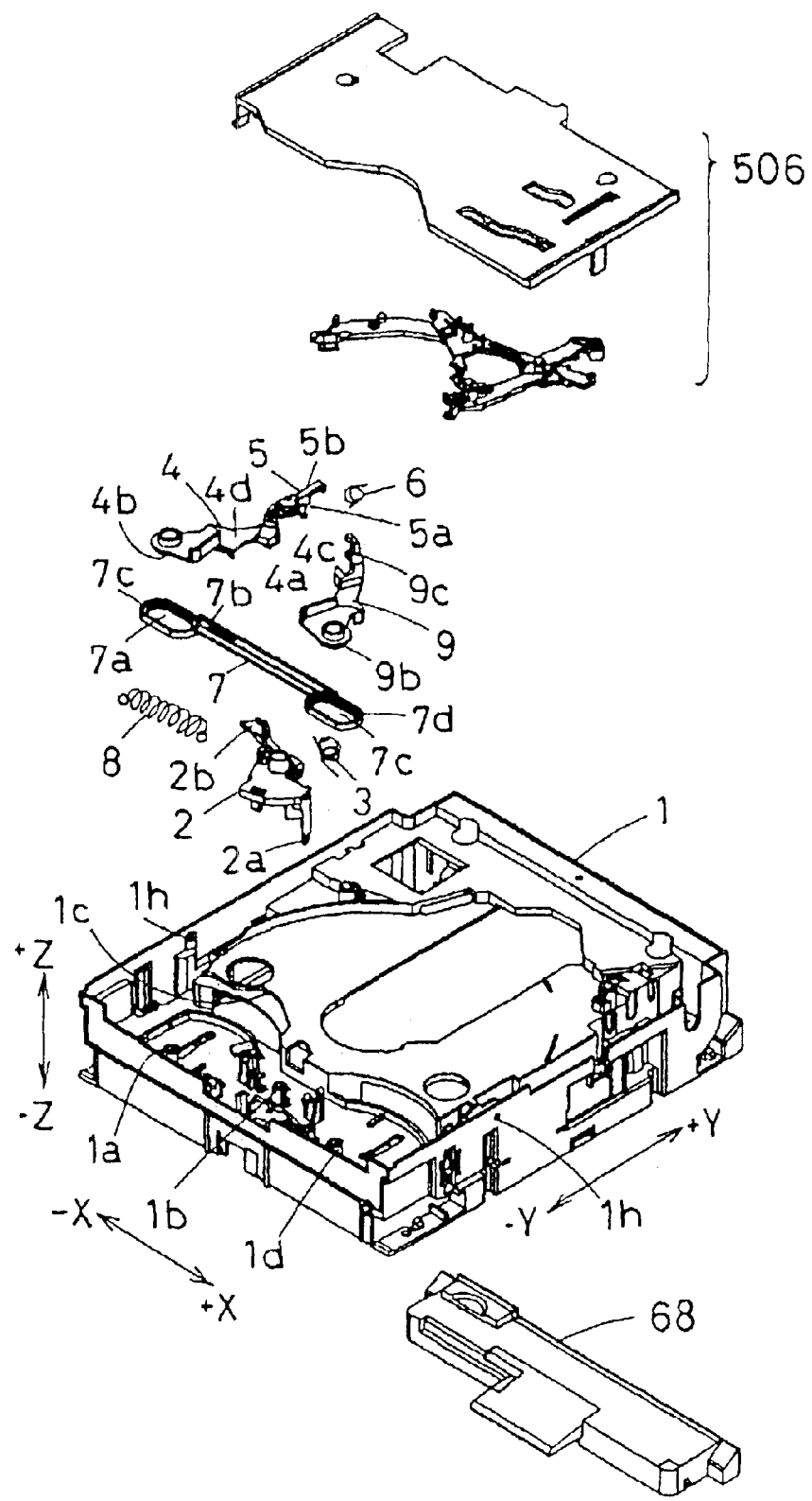

FIG. 2 shows mainly the mechanism chassis unit 501, the out-lever unit 509, and the check plate unit 506. In the mechanism chassis unit 501, a switch lever 2 is attached to a boss 1b of the mechanism chassis 1. The switch lever 2 is enforced to be at the neutral position by a switch lever spring 3. A rib 2a forming a protrusion in the switch lever 2 at a position departing from the boss goes through a through hole (not shown) in the mechanism chassis 1, and thereby confronts and presses a detection switch 65d which is provided on the P board 65 attached in the bottom surface of the mechanism chassis 1 and thereby detects the completion of ejection (see FIG. 22).

A cam 2b of the switch lever 2 engages with a cam 4a provided in the bottom surface of the out-lever L 4 attached to the mechanism chassis 1, and thereby determines the timing that the rib 2a of the switch lever 2 confronts the detection switch 65d on the P board 65. When the out-lever L 4 rotates and when the cam 4a presses the cam 2b, the switch lever 2 rotates and the rib 2a departs from the switch 65d, whereby switching is carried out. As a result of the operation of the detection switch 65d, a loading motor 32 rotates in the direction of disk transfer.

An out-rod 7 is provided such that an out-rod spring 8 is inserted between a hook 7b and a hook (not shown) of the mechanism chassis 1, and that right and left bosses 1a and 1d in the mechanism chassis 1 provided with the switch lever 2 are inserted into elongated holes 7a and 7d, respectively. Accordingly, the out-rod 7 is enforced in the +X direction. Each of the elongated holes 7a and 7d is provided with a rack 7c.

The out-lever L 4 is rotatable attached to the boss 1a of the mechanism chassis 1 in a manner such as to engage with the rack 7c of the out-rod 7. An out-lever R 9 is rotatable attached to the boss 1d of the mechanism chassis 1 in a manner such as to engage with the rack 7c of the out-rod 7.

The elevation of the racks in the elongated holes 7a and 7d of the out-rod 7 is different from each other. The positional relation between the gear 4b of the out-lever L 4 and the gear 9b of the out-lever R 9, each engaging with each rack 7c, is such that when enforced by the out-rod spring 8, a disk confronting section 4c substantially having a groove shape in the out-lever L 4 and a disk confronting section 9c substantially having a groove shape in the out-lever R 9 become close to each other. Starting from this situation, when either the out-lever L 4 or the out-lever R 9 is rotated in the direction departing from each other, the other lever also rotates in cooperation with the opposite direction by the same rotation angle by virtue of the positional relation among the rack 7c of the out-rod 7 and the gears 4b and 9b. Accordingly, the outer edge of the disk is retained by the disk confronting sections 4c and 9c in a manner such that the disk can pass through between the disk confronting sections 4c and 9c.

In the out-lever L 4, an in-push arm 5 which can detect disk insertion and disk ejection is enforced to be at the neutral position by an in-push arm spring 6. A rib 5a which is a protrusion in the in-push arm 5 confronts a cam section 1c formed in the mechanism chassis 1, and thereby determines the path of the tip 5b of the in-push arm 5.

The check plate unit 506 is described later.

Figure 3:
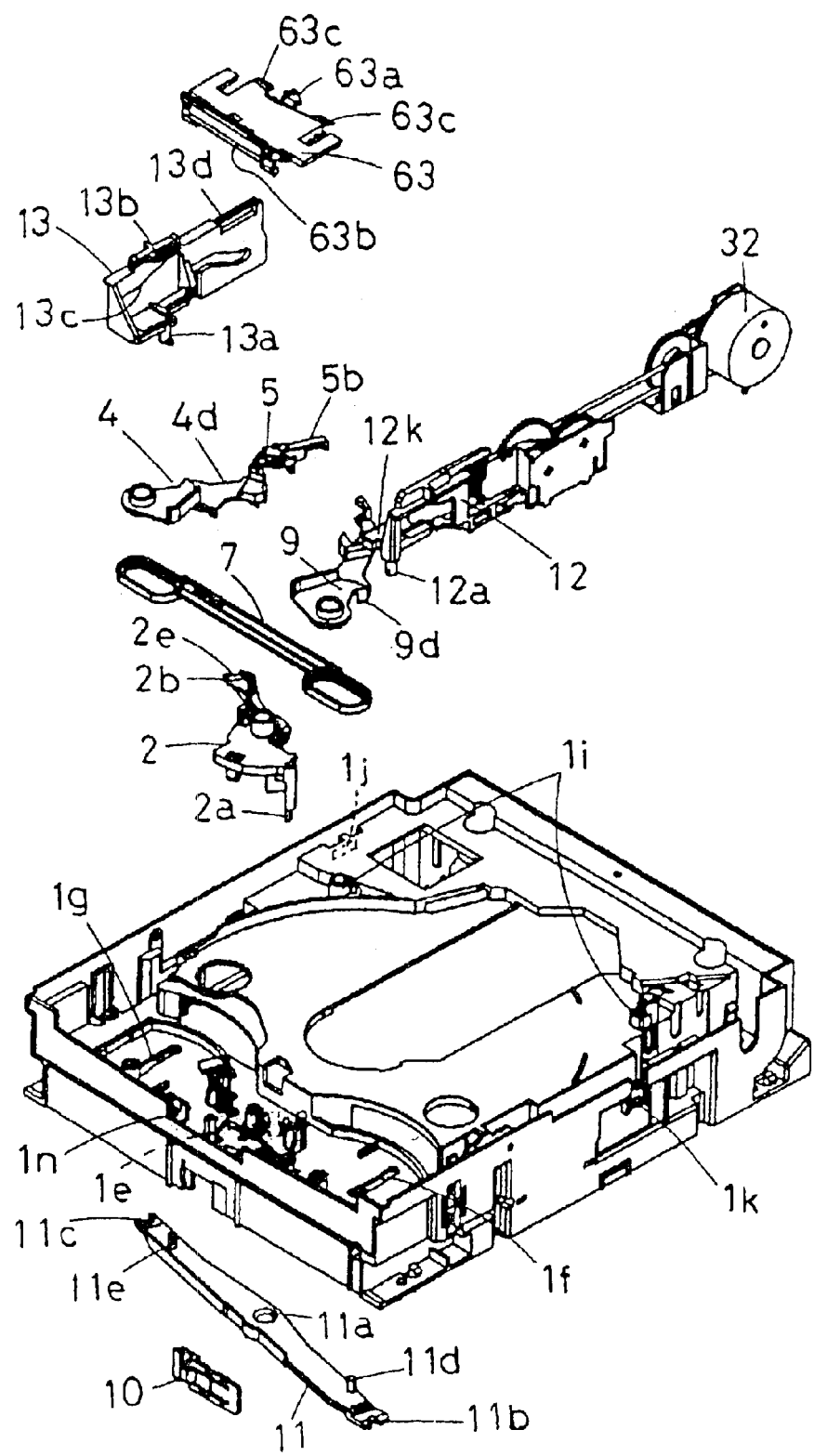

As shown in FIG. 3, the mechanism chassis 1 is provided with an eject button 10. Generally, the center portion of the eject button 10 confronts an eject switch 65e (see FIGS. 1 and 22) in a manner such that a sufficient stroke is ensured when the eject switch 65e on the P board 65 is pressed. Further, the amount of deflection in the eject button 10 is restricted in order to avoid damage to the eject switch 65e even when the tip of the eject switch 65e is pressed with an extremely strong force.

A slide cam rod 11 shown in FIG. 3 forms a slide cam unit 510. A hole 11a substantially in the center engages with a boss 1e in the bottom surface of the mechanism chassis 1, whereby the slide cam rod 11 is attached in a rotatable manner. A U-shaped groove 11b in one end of the slide cam rod 11 engages with a boss 12a of a slide cam R 12, while a U-shaped groove 11c in the other end engages with a boss 13a of a slide cam L 13, whereby formed is a link mechanism composed of three sections. Accordingly, the slide cam L 13 moves symmetrically to the slide cam R 12, that is, in the opposite direction. Cams 13b–13d are also shaped symmetrically, as described later. After the disk is transferred to a predetermined position, in order to clamp the disk between a spindle motor serving as a disk motor 17 and the clamp unit 508, out-levers 4 and 9 serving as retaining means for retaining the outer edge of the disk depart from the disk slightly. For the purpose of this, a rib 11d which is a protrusion in the slide cam rod 11 goes through a hole 1f in the mechanism chassis 1, and thereby engages with a cam 9d in the out-lever R 9 in the course of rotation of the out-lever R 9. Similarly, a rib 11e which is a protrusion in the slide cam rod 11 goes through a hole 1g in the mechanism chassis 1, and thereby engages with a cam 4d in the out-lever L 4 in the course of rotation of the out-lever R 9.

Numeral 63 indicates a front guide provided on the mechanism chassis 1 side and opposing to the top guide 67. The front end 63b is located on the inner side of a center cut-out in (see FIG. 1) serving as the center of the disk insertion slot in the mechanism chassis 1. The rear end 63c engages with the center portion of a roller shaft 60 for tapered rollers 61, and thereby is supported in a floating state around the roller shaft 60 serving as the fulcrum by a spring. Further, a cam section 63a capable of being confronted by a boss 5b in the in-push arm 5 is provided in a position exceeding the roller shaft 60. When the boss 5b confronts the cam section 63a, the tip of the boss 5b protrudes to the insertion slot. Accordingly, when the disk is inserted into the insertion slot, and then guided between the top guide 67 and the front guide 63, and when the leading portion of the outer edge of the disk presses the boss 5b of the in-push arm 5, the boss 5b slides the cam section 63a, and thereby rotates the out-lever L 4 so as to open. As a result, the switch lever 2 is pressed, whereby the detection switch 65d operates. When the disk is further transferred, the in-push arm 5 slides and rotates in a manner such that the rib 5a goes along the cam section 1, whereby the out-lever L 4 rotates in the state that the outer edge of the disk is gripped by the disk confronting sections 4c and 9c. As the out-lever L 4 rotates, by virtue of the out-rod 7, the out-lever R 12 rotates so as to open in the direction opposite to the out-lever L 4. Accordingly, disk transfer is allowed, and the disk can pass through in the state being retained by the levers 4 and 12.

Figure 4:
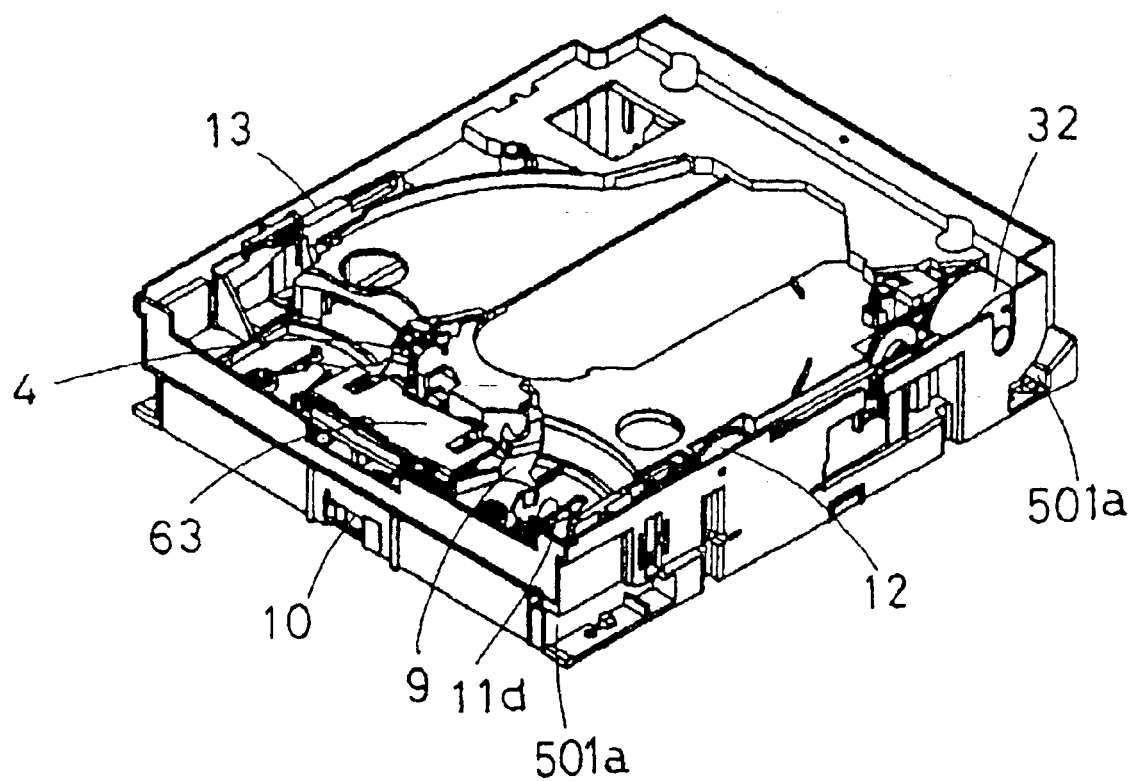
FIG. 4 shows a perspective view of a mechanism chassis unit.

FIG. 4 shows the situation that the front guide 63, the slide cams 12 and 13, a motor 32, and the like are assembled in the mechanism chassis 1.

Figure 5:
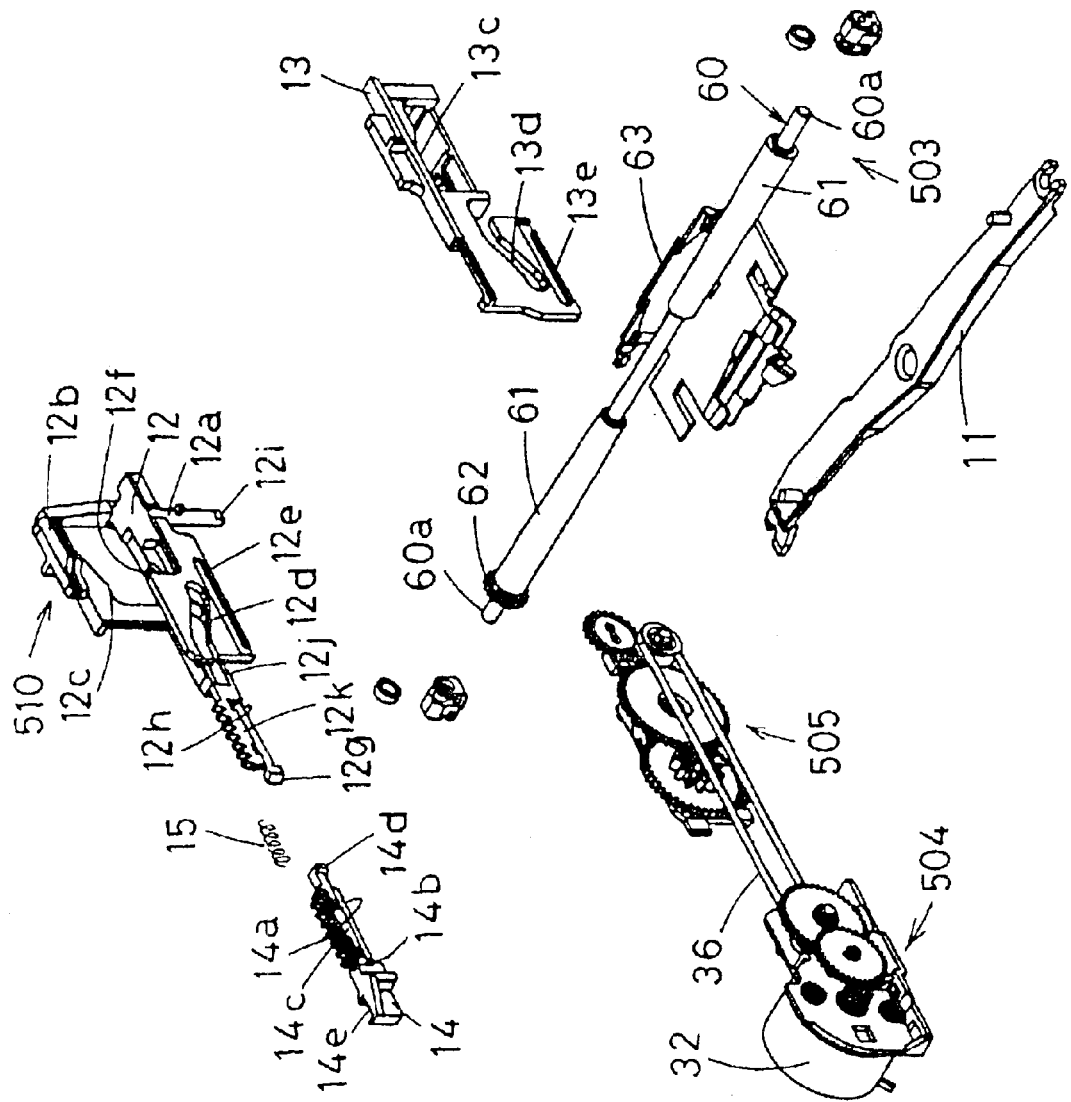
FIG. 5 shows an exploded perspective view of a motor base unit, a roller unit, and a slide cam unit.
Figure 6:
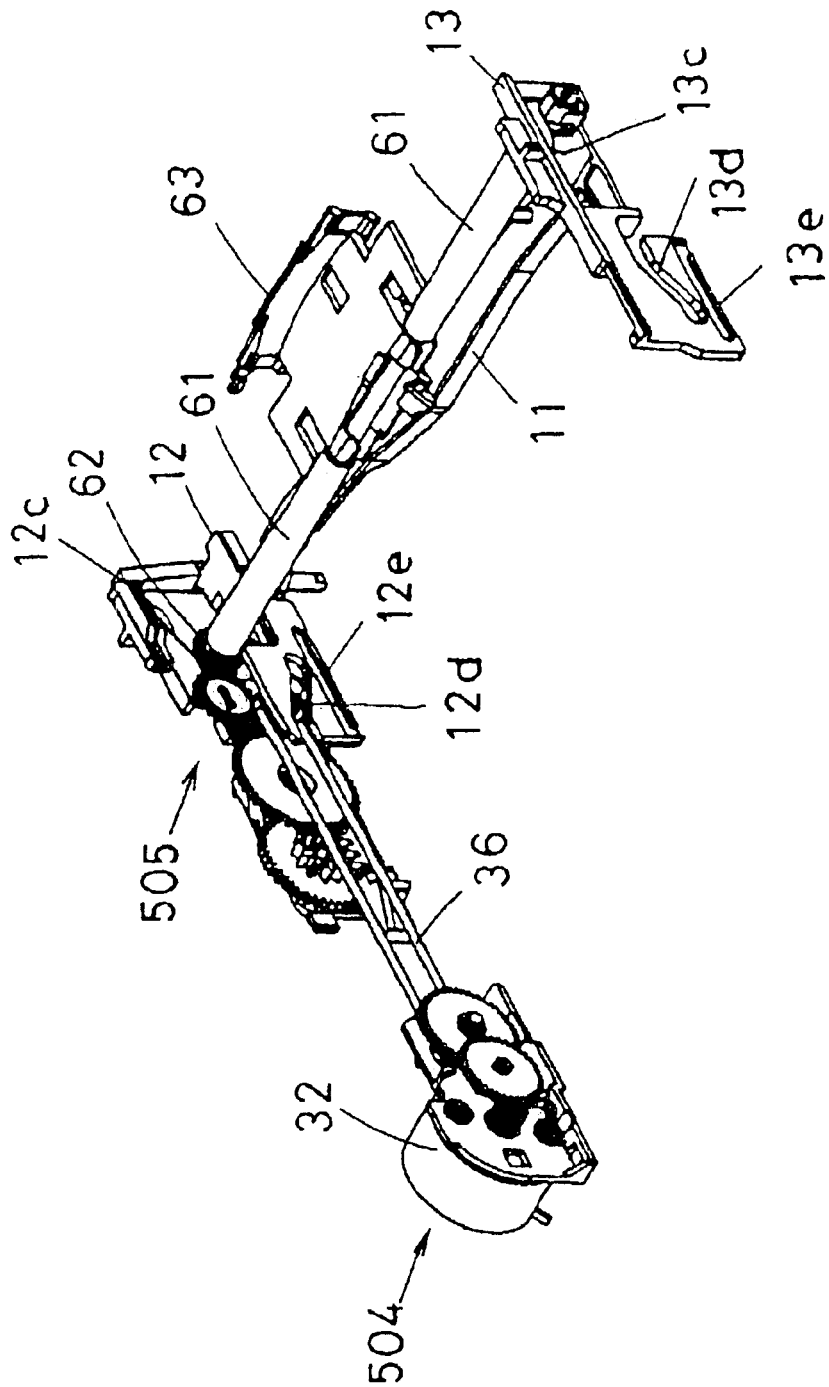
FIG. 6 shows a perspective view of the assembled state of the components shown in FIG. 5.
Figure 16:
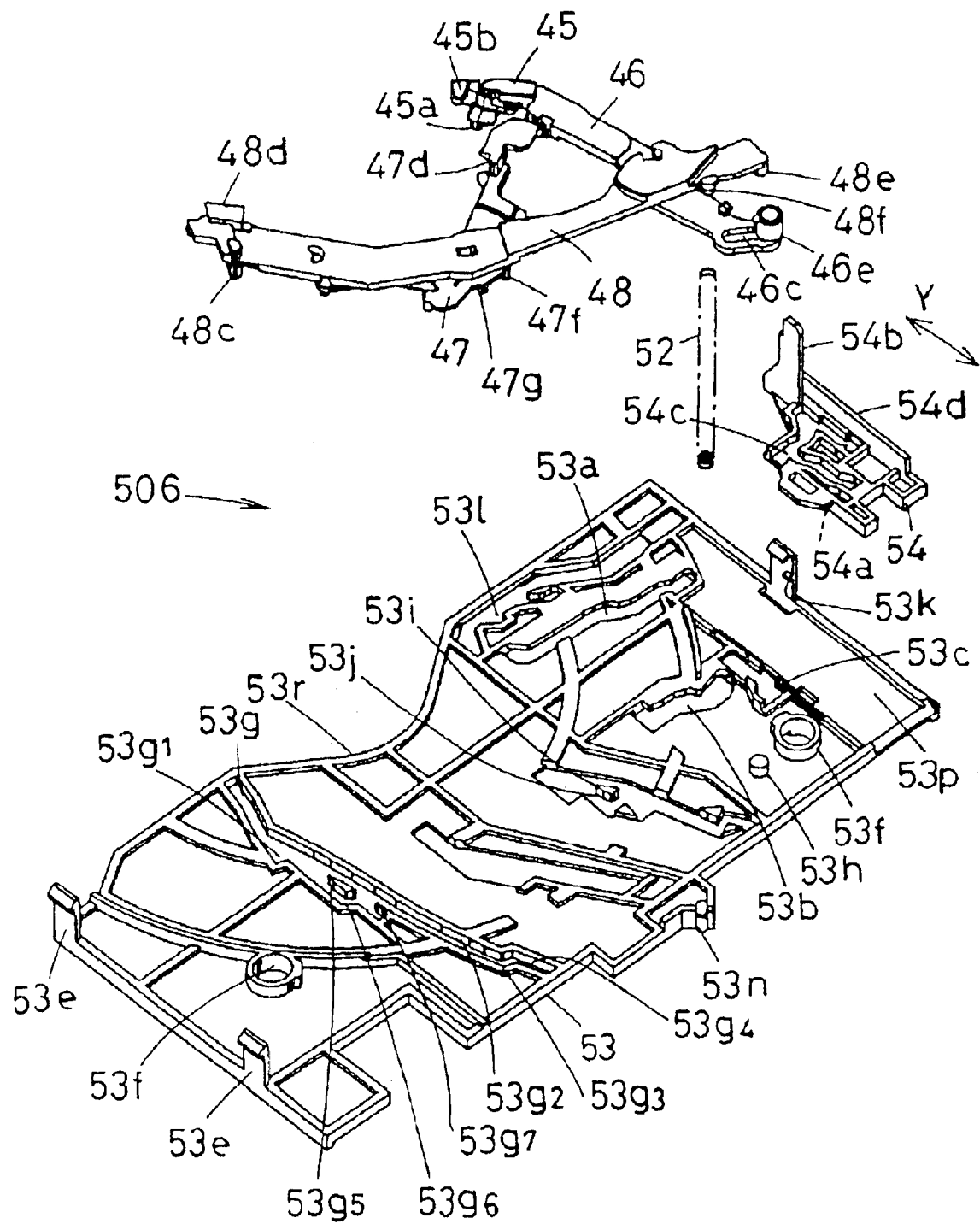

FIGS. 5 and 6 show the slide cam unit 510, the motor base units 504 and 505, and the roller unit 503 serving as rotary retaining means. The slide cam R 12 is provided with a rack section 12k. A slide rack 14 engaging with a guide groove 14a (see FIGS. 32 and 33) through a hook 12h in a slidable manner is attached to the rack section 12k. The slide rack 14 has an engagement groove 14b in the bottom surface. When the engagement groove 14b engages with the lever 12g of the slide cam R 12, the slide rack 14 is integrated into the slide cam R 12. Further, provided is a rack section 14c having the same phase as that of the rack section 12k of the slide cam R 12. A slide rack spring 15 is provided between the protrusion 14d of the slide rack 14 and the protrusion 12j of the slide cam R 12, whereby the slide rack 14 is enforced in the +Y direction. A bottom surface protrusion of the head 12g1 of the lever 12g is located in a groove 1p formed in the mechanism chassis, and thereby engages with a protrusion 1q in the groove 1p (see FIG. 34(b)). When the slide rack spring 15 causes the slide rack 14 to depart from the slide cam R 12 (see FIG. 34), a side protrusion of the head 12g1 of the lever 12g departs from the engagement groove 14b by virtue of the elasticity of the plastics and the tapered shape of the engagement groove 14b. Further, the slide cam R 12 is positioned such that the bottom surface protrusion of the head 12g1 engages with the end of the protrusion 1q in the groove 1p. This restricts the travel of the slide cam R 12. When a check cam 54 described later (see FIGS. 16 and 17) presses the slide rack 14 against the slide rack spring 15 to the direction of the slide cam R 12, the head 12g1 of the lever 12g engages with the engagement groove 14b, whereby the slide rack 14 and the slide cam R 12 engage with each other into one piece by virtue of the tapered shape of the engagement groove 14b (see FIG. 35). When the head 12g1 departs from the end of the protrusion 1q, the slide cam R 12 becomes slidable. At this time, with engaging with the engagement groove 14b, the head 12g1 moves along the surface of the head 12g1, whereby the movement is restricted such as not to go outside the engagement groove 14b.

Figure 7:
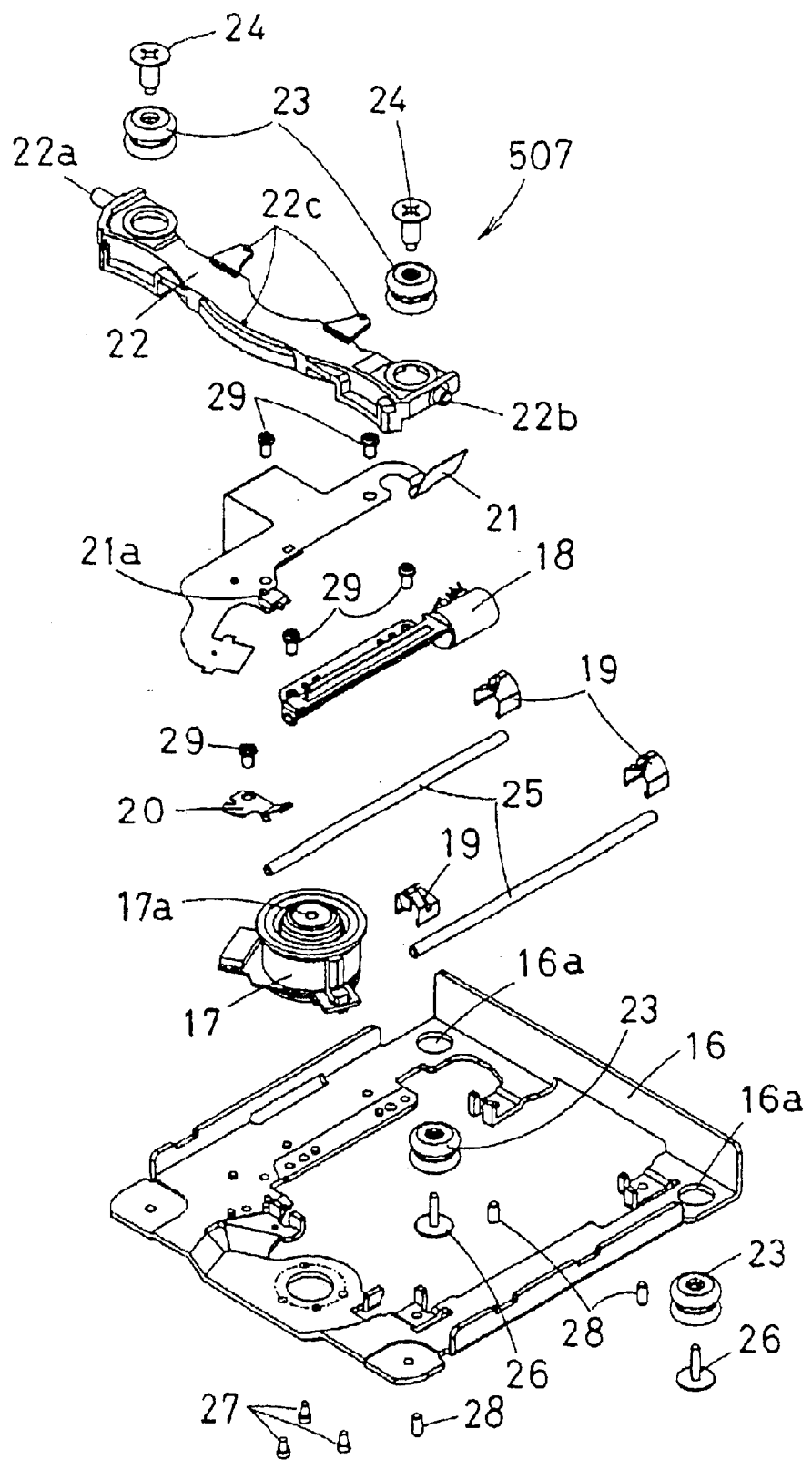
FIG. 7 shows an exploded perspective view of a traverse unit.

The slide cam R12 comprises: a cam groove 12b for engaging with a pin 57d (see FIG. 19) of the top plate unit 507; a cam groove 12c for engaging with a roller guide 60a provided in one end of the roller shaft 60; a cam groove 12d for engaging with a pin 22a of a traverse chassis 22 shown in FIG. 7; a cam groove 12e for engaging with a pin (not shown) for avoiding a gap from the mechanism chassis 1; and a cam groove 12f for engaging with a boss 43a of the clutch 43 (see FIG. 11). When the slide cam R 12 slides in the direction opposite to the −Y direction, the cam groove 12b causes the clamp unit 508 to carry out clamping motion, whereby the disk is pressed onto the disk motor 17. The cam groove 12c lowers the roller guide 60a, whereby the tapered rollers 61 depart from the disk before disk clamping. The cam groove 12d raises the traverse unit 502, whereby the disk motor 17 protrudes to the clamp, and thereby supports the disk. The cam groove 12f rotates the clutch 43, whereby the gear 42 departs from the gear 62 on the roller side. Then, the rotation of the tapered rollers 61 stops, whereby the travel of the disk stops. The tip 12i of the rib 12a of the slide cam R 12 confronts a stop switch 65c on the P board 65, whereby the rotation of the motor 32 stops and the stop position of the slide cam R 12 is indicated. When the slide cam R 12 slides in the reversed direction, the above-mentioned operation is reversed to the original state.

The slide cam L 13 comprises: a cam groove 13b for engaging with a pin 57c of the top plate unit 507; a cam groove 13c for engaging with the roller guide 60a; a cam groove 13d for engaging with a pin 22b of the traverse chassis 22; and a cam groove 13e for engaging with a pin (not shown) for avoiding a gap from the mechanism chassis 1. The slide cam L 13 moves in the direction opposite to that of the slide cam R 12 by virtue of the slide rod 11. Accordingly, the shape of the cam is formed symmetrically to the slide cam R 12, as described above.

In the roller unit 503, the front guide 63 is attached to the center of the roller shaft 60 in a rotatable manner. The roller unit 503 further comprises: the tapered rollers 61 provided on both sides of the roller shaft 60; and the gear 62 pushed into one end of the roller shaft 60. Further, two poly-slide washers are inserted respectively between the tapered rollers 61 and the other member such as the front guide 63 in order to ensure smooth rotation of the tapered rollers 61. A roller guide 60a is provided in each end of the roller shaft 60, and a compression spring 60b (see FIG. 38) is inserted between each roller guide 60a and the mechanism chassis 1, whereby the roller guide 60a is pressed against the racks forming the cam grooves 12c and 13c of the slide cams 12 and 13.

The motor base units 504 and 505 are described later.

Figure 8:
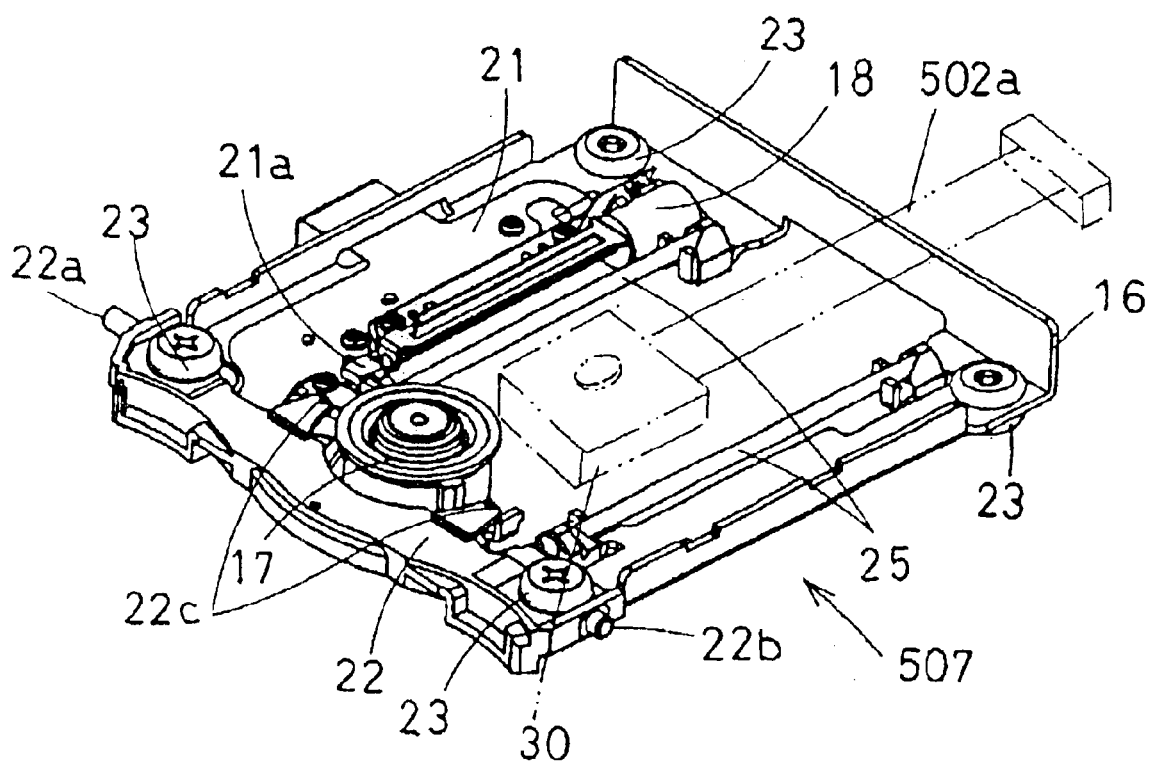
FIG. 8 shows a perspective view of a traverse unit.

FIGS. 7 and 8 show a traverse base unit 507. In a traverse base 16, a disk motor 17 is fixed by screws 27, while a stepping motor 18 for driving an optical pickup 30 is fixed by screws 29.

Guide shafts 25 for guiding the optical pickup 30 is retained by: a shaft spring 20 attached to the traverse base 16 by a screw 29; and tilt springs 19 attached by worm screws 28. After adjustment, the optical pickup 30 is mounted on the guide shafts 25. The disk motor 17 and the stepping motor 18 are connected to a connector 65a (see FIG. 24) on the bottom surface of the P board 65, through a terminal 21a in a motor flexible plate 21 using a flexible lead. The optical pickup 30 is connected to a connector 65b (see FIG. 23) through a flexible lead 502a.

A traverse chassis 22 is attached to the traverse base 16 by damper screws 24 each surrounded by a damper 23 provided on the front side of the traverse base 16.

As for the attachment of the traverse chassis 22 to the mechanism chassis 1, the rear side is elastically supported by ribs (on the rear side, not shown) of the mechanism chassis 1 by using screws 26 and dampers 23 attached in the holes 16a of the traverse base 16. In the front side, a shaft 22a engages with a cam groove 13d of the slide cam L 13, via a engagement groove (not shown) on the rear side of the mechanism chassis 1. Similarly, a shaft 22b engages with a cam groove 12d (having a reversed phase to the cam groove 13d of the slide cam L 13) of the slide cam R 12. The roller shaft 60 is inserted between the cam grooves 13c and 12c for the up and down motion of the rollers, in the slide cams L 13 and R 12, respectively. Inclination is in the opposite direction between the cam grooves 13c, 12c and the cam grooves 13d, 12d. Accordingly, the shafts 22a and 22b of the traverse chassis 22 do not go outside the cam grooves 13d and 12d of the slide cams 12 and 13.

The traverse base 16 rotates between the position in which the disk motor 17 supports the disk and the position in which the disk motor 17 departs from the disk, around the damper 23 on the rear side in linkage with the motion of the slide cam R 12.

Figure 9:
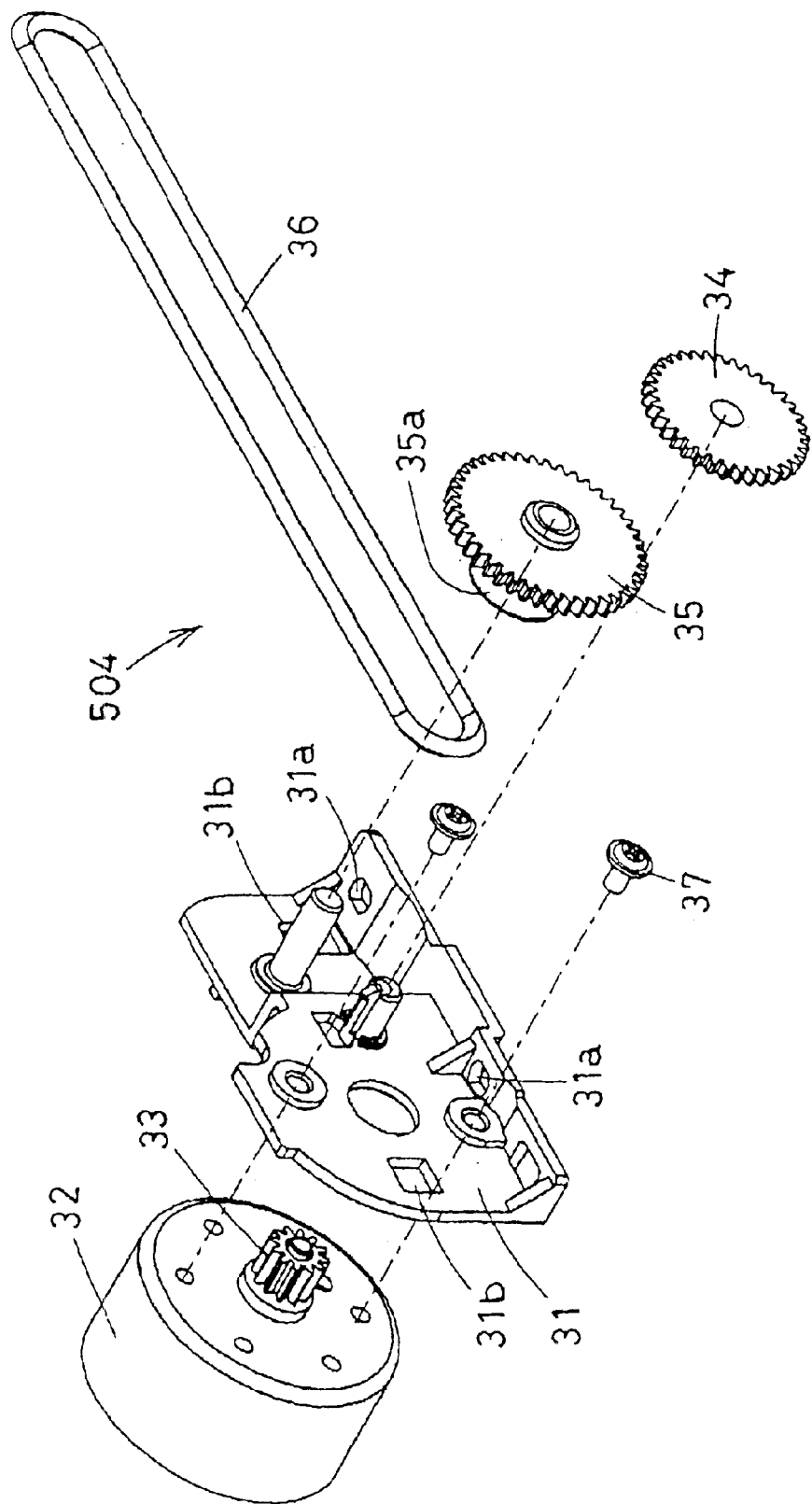
FIG. 9 shows an exploded perspective view of a motor base A unit.
Figure 10:
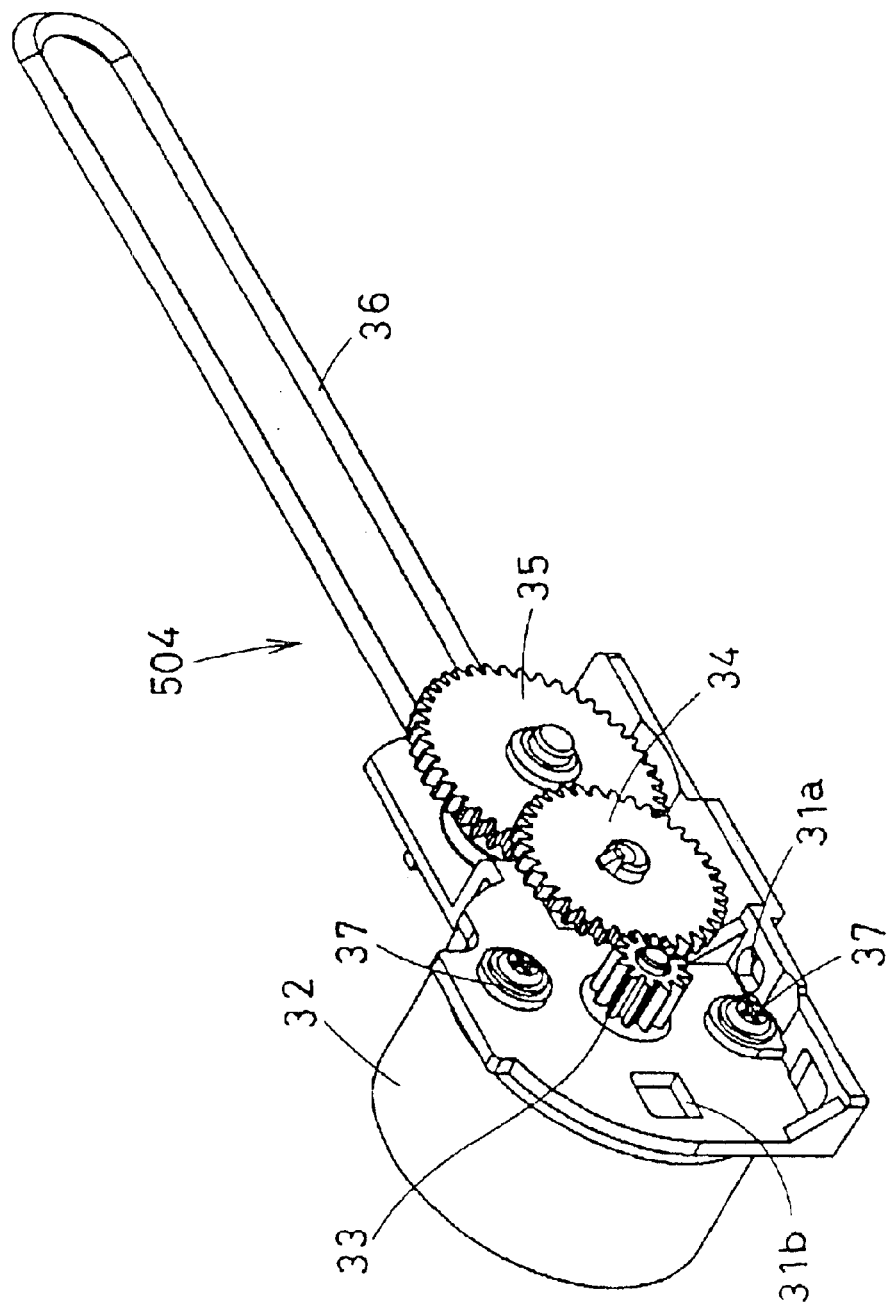
FIG. 10 shows a perspective view of a motor base A unit.
Figure 1:
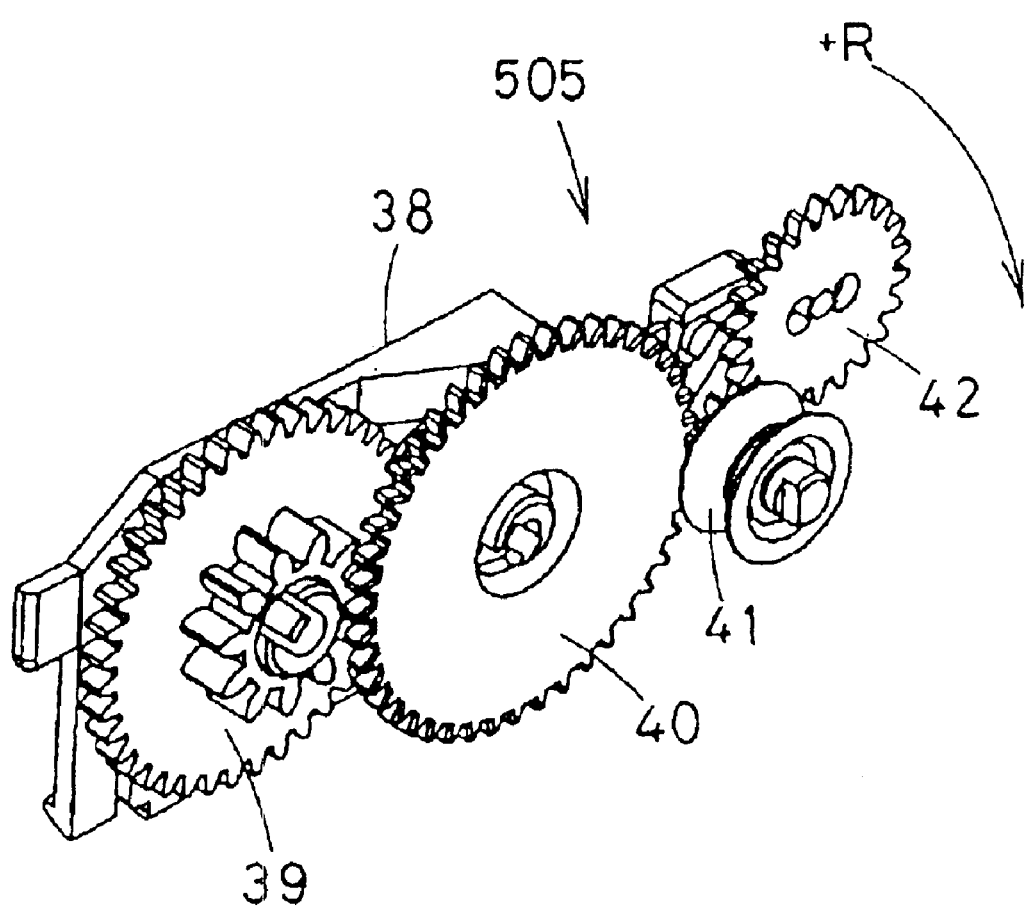
Figure 14:
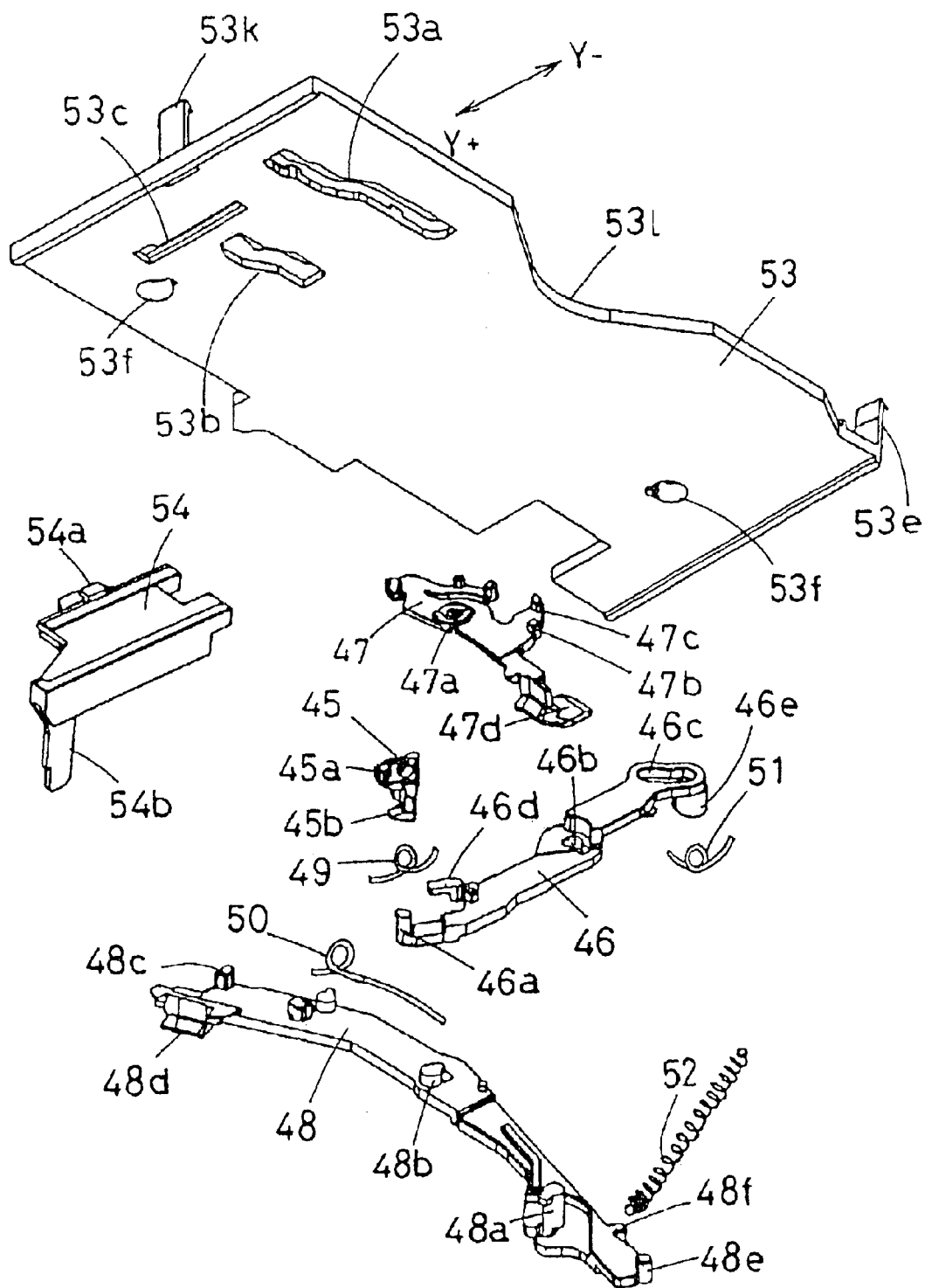
FIG. 14 shows an exploded perspective view of a check plate unit.
Figure 15:
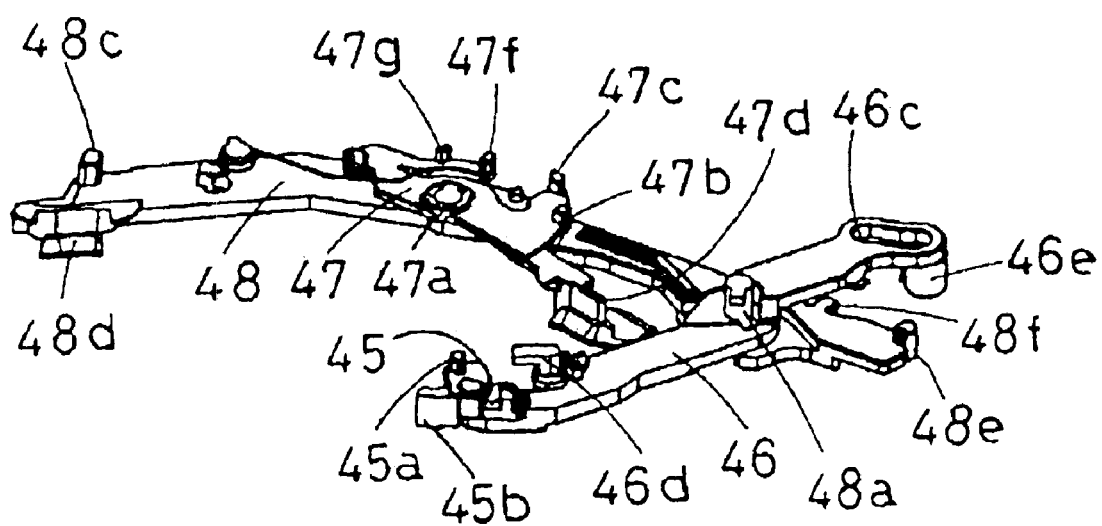

FIGS. 9 and 10 show the motor base A unit 504. The motor base A unit 504 comprises: a loading motor 32 attached to a motor base A 31 by screws 37; a gear 33 pushed into the shaft of the loading motor 32; a gear 34 fixed to the motor base A 31 in a rotatable manner within the same series of gears as the gear 33; a pulley gear 35; and a pulley belt 36 around the pulley section 35a thereof.

In the motor base A unit 504, the opposite side of the pulley belt 36 goes around the pulley section 41a of the pulley gear 41 in the motor base B unit 505 described later, whereby the driving force is transmitted. The motor base A unit 504 is fixed to the mechanism chassis 1 by elongated holes 31a for positioning and square holes 31b for avoiding a gap.

FIGS. 11–13 show Y the motor base B unit 505. The motor base B unit 505 comprises: a gear 39 attached to a motor base B 38; a gear 40 and a pulley gear 41 fixed to the motor base B 38 in a rotatable manner within the same series of gears as the gear 39; a gear 42 attached to the clutch 43 by a cut washer 44; and a clutch spring 45 for enforcing the clutch 43 in the +R direction.

A hole 43b in the clutch 43 and a center hole 41b in the pulley gear 41 are fixed coaxially to a shaft 38b in the motor base B 38 by a cut washer 44. The gear 42 serves as a planetary gear around the pulley gear 41 within the rotatable range of the clutch 43. The clutch 43 comprises: a pin 43a used for engaging with the cam groove 12f of the slide cam R 12 by a clutch spring 45; and a protrusion 43c serving as a stopper for confronting the cam groove 12f of the slide cam R 12 when the clutch 43 rotates largely in the +R direction.

The pulley belt 36 goes around the pulley section 41a of the pulley gear 41 as described above. The revolution of the pulley belt 36 is transmitted to the gears 40 and 42, and then transmitted from the gear 40 to the gear 39. When the gear 39 engages with the rack sections 12k and 14c of the slide rack 14 and the slide cam R 12, the slide cam R 12 starts to slide. In the course of the slide, the slide cam R 12 operates as described above.

The motor base B unit 505 is fixed using: protrusions 38d and 38e for positioning by engaging with the holes in the mechanism chassis 1 positioning; and claws 38c for avoiding a gap.

FIGS. 14–17 show the check plate unit 506. The check plate unit 506 comprises a four-section link composed of: a side arm 45 supported around a pin 46a of a set lever 46 and enforced by a side arm spring 49; a set lever 46 in which a hole 46b of the side arm 45 is attached around a pin 46b of the check lever 48 in a rotatable manner; a stop arm 47 a hole 47a of which is attached around a pin 48b of the check lever 48 in a rotatable manner and which is enforced by a stop arm spring 50. The check plate unit 506 further comprises: a check plate 53 serving as a first cam plate; and a check cam 54 serving as a second cam plate attached to the check plate 53 in a movable manner.

The check cam 54 fits into a recess 53p of the check plate 53 in a slidable manner. A hook-shaped guide protrusion 54a provided on a side engages with a slit-shaped guide groove 53c provided on a side of the recess 53p, in a slidable manner. The other side 54d engages with a claw 53k provided in the check plate 53, in the width direction. Accordingly, the check cam 54 is attached such as not to drop from the check plate 53, in a slidable manner in the Y direction. The check cam 54 is provided with a rib 54b serving as a protrusion for engaging with a groove 14e which is formed in the slide rack 14 in order for the slide rack 14 to slide. Further, the check cam 54 is provided with a cam groove 54c for engaging with a pin 48e of the check lever 48. The cam groove 54c has substantially an L shape, whereby the pin 48a enters from an end of the groove. In case of a disk of large size, the pin 48e goes to the leading end, and thereby presses the check cam 54. Then, the rib 54b presses the slide rack 14. In case of a disk of small size, before the pin 48 turns to the leading end, the pin 48 presses the side surface of the cam groove having substantially an L shape, and thereby moves the check cam 54. Then, the rib 54b presses the slide rack 14.

The hook-shaped guide p in 48a of the check lever 48 forming the above-mentioned 4-section link engages with a guide groove 53b of the check plate 53 in a slidable manner. The hook-shaped guide pin 46d of the set lever 46 engages with a guide groove 53a of the check plate 53 in a slidable manner. The pin 48c of the check lever 48 engages with a cam groove 53g of the check plate 53. The pin 45a of the side arm 45 engages with the stopper section of the cam groove 53l of the check plate 53 by spring action, and thereby restricts the motion of the set lever 46 and the check lever 48 caused by vibration and the like. The elongated hole 46c of the set lever 46 engages with the pin 53h of the check plate 53 in a rotatable manner. In case of a 12-cm disk, the pin 47b of the stop arm 47 engages with the cam groove 53i of the check plate 53. The pin 47b is then pressed by the disk, and thereby confronts the protrusion 53t of the cam groove 53i. Accordingly, the rotation is restricted and stops (see FIG. 59). In case of an 8-cm disk, the pin 47c confronts the protrusion 53u of the cam groove 53j. Accordingly, the rotation is restricted and stops (see FIG. 60). Further, the pin 48e of the check lever 48 engages with the cam groove 54c of the check cam 54 as described above. Numerals 45b and 47d indicate confronting sections having substantially a groove shape and confronting the outer edge of the disk.

Figure 17:
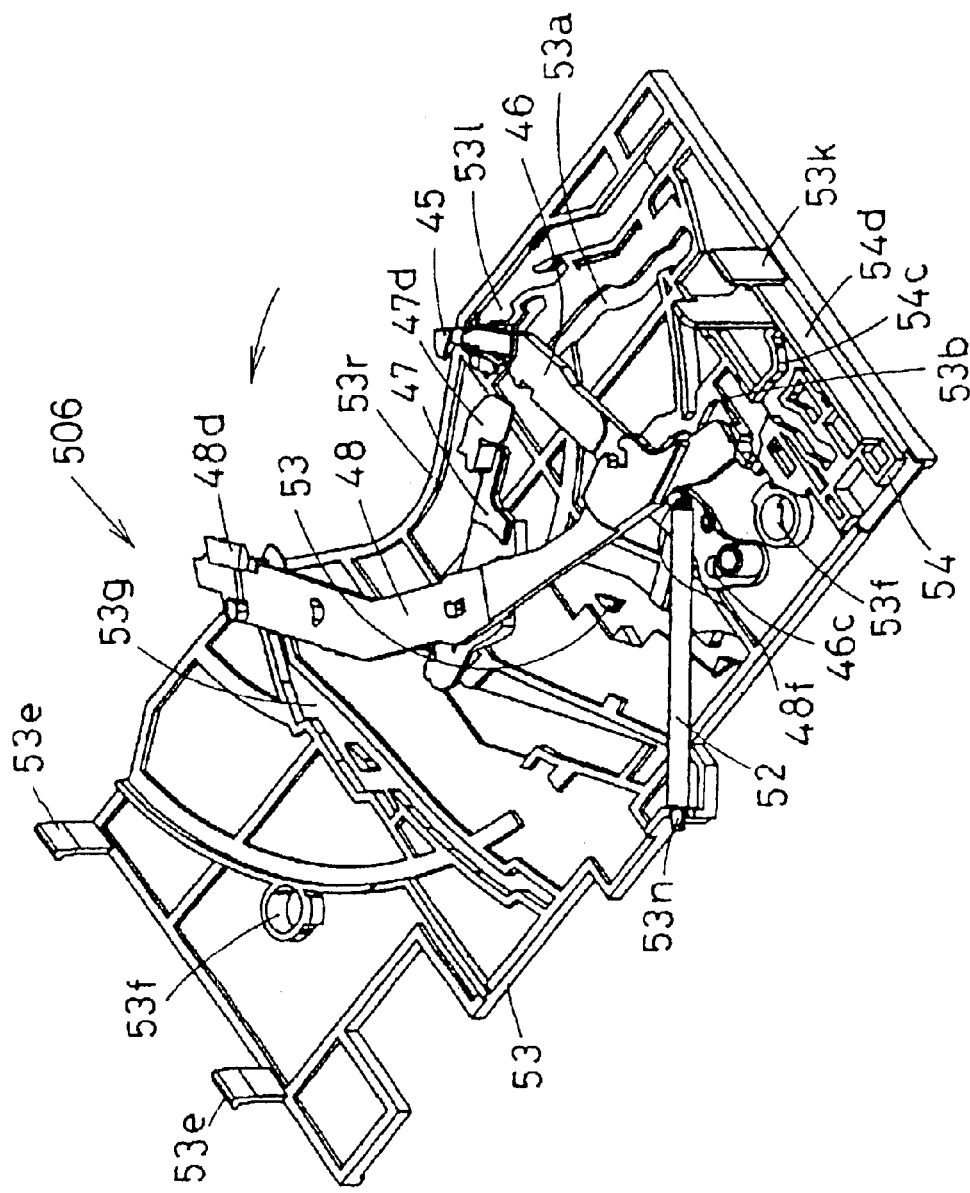
FIG. 17 shows a perspective view of a check plate unit.

When the check plate 53 is assembled, a set lever spring 51 is inserted around a spring stud 46e, and thereby enforces the set lever 46 in the direction shown by the arrow in FIG. 17. A check lever spring 52 (tension spring) is stretched between the hook 48f of the check lever 48 and the hook 53n of the check plate 53, whereby the substantially groove-shaped disk confronting section 48d side of the check lever 48 is rotated around the shaft 48a so as to face in the direction of the outer edge of the disk. As such, the check lever 48 and the like are retained on the check plate 53 by the attachment of the check lever spring 52 and by the engagement between the guide pins 46d, 48a and the guide grooves 53a, 53b.

These levers and arms travel along the guide and cam grooves in the check plate 53, whereby disk insertion and disk ejection are carried out. When a disk is inserted and then passes the out-lever unit 509 by, the outer edge of the disk confronts and rotates the confronting section 45b of the side arm 45 against the side arm spring 49. Accordingly, the pin 45a is released from the engagement with the stopper section of the cam groove 53l. At the same time, a force is exerted on the set lever 46 in the longitudinal direction. However, the direction of the force is perpendicular to the cam grooves 53a and 53b. Accordingly, the rotation of the set lever 46 is restricted and does not occur. With confronting the side arm 45, the outer edge of the disk further confronts the confronting section 48d of the check lever 48. Then, the guide pin 48a of the check lever 48 travels along the cam groove 53b, while the guide pin 46d of these t lever 46 travels along the cam groove 53a. Further, the elongated hole 46c travels around the shaft 53h. This permits the rotation of the set lever 46. The pin 45a of the side arm 45 slides along the cam groove 53l, while the set lever 46 and the check lever 48 rotate so as to open relatively to each other. When the disk is inserted, and when the outer edge of the disk confronts at first the confronting section 48d of the check lever 48 and thereby rotates the confronting section 45b, but when the disk does not press the set lever 46, the pin 48c engages with the stopper section 53g1 of the guide groove 53g, and thereby restricts the rotation. When the outer edge of the disk confronts the confronting section 45b and thereby presses and rotates the set lever 46, the pin 48c is released from the stopper section 53g1. This permits the rotation of the check lever 48. As a result, when the disk is off-centered and hence presses only one of the set lever 46 and the check lever 48, the restriction in lever rotation causes the centering of the disk. Accordingly, the disk presses both levers. This permits the rotation of both levers and hence the entrance of the disk.

When the disk enters between the set lever 46 and the check lever 48, the outer edge of the disk presses and rotates the confronting section 47d of the stop arm 47 against the stop arm spring 50 into the state that the pin 47b engages with the protrusion 53t of the cam groove 53i. The check lever 48 temporarily stops the rotation at the engagement section 53g3 (see FIG. 59). The set lever 46 also stops.

In response to the rotation of the check lever 48, the pin 48e engages with the cam groove 54c of the check cam 54, and thereby moves the check cam 54, whereby the above-mentioned slide rack 14 engages with the gear. In case of a large disk of the diameter of 12 cm, because of the relation to the set lever 46 pressed by the disk, the pin 48c of the check lever 48 passes through the first groove 53g2 of the cam groove 53g. Before the pin 48c reaches and engages with the engagement section 53g3, the pin 48e is positioned at the end of the engagement groove 54c, and thereby moves the check cam 54. The motion of slide cams 12 and 13 is caused by the motion of the check cam 54, whereby the check cam 54 is pressed. Then, the pin 48e is pressed in reverse by the cam groove 54c, whereby the check lever 48 is rotated further. At that time, the pin 48c moves into the groove 53g4 continuing to the far end of the first groove 53g2. In case of a small disk of the diameter of 8 cm, the pin passes through the second groove 53g5 of the cam groove 53g and reaches the engagement section 53g6. In the course of passage, the pin press the side of the cam groove 54c of the check cam 54. When the slide cams 12 and 13 moves similarly to the above-mentioned case, the pin 48e is pressed by the cam groove 54c, whereby the check lever 48 is rotated further. At that time, the pin 48c moves into the groove 53g7 continuing to the far end of the second groove 53g5. When the check lever 48 rotates along the groove 53g4 or 53g7, the confronting section 48d of the check lever 48 departs from the outer edge of the disk. At the same time, the confronting sections 45b and 47b of the set lever 46 and the set lever 46 also depart from the disk.

Figure 59:
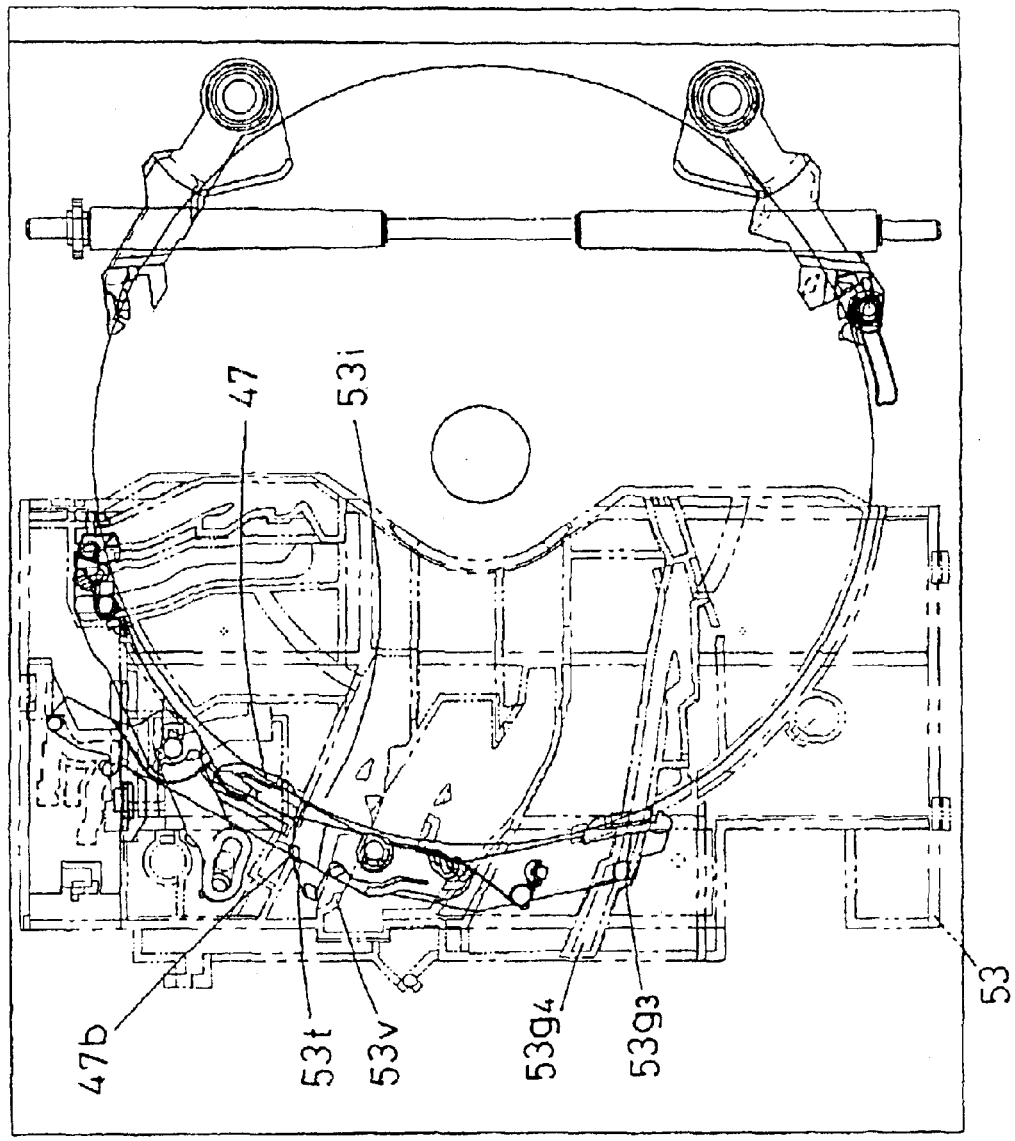
FIG. 59 shows a plan view illustrating the situation that a stop arm confronting a 12-cm disk stops.
Figure 60:
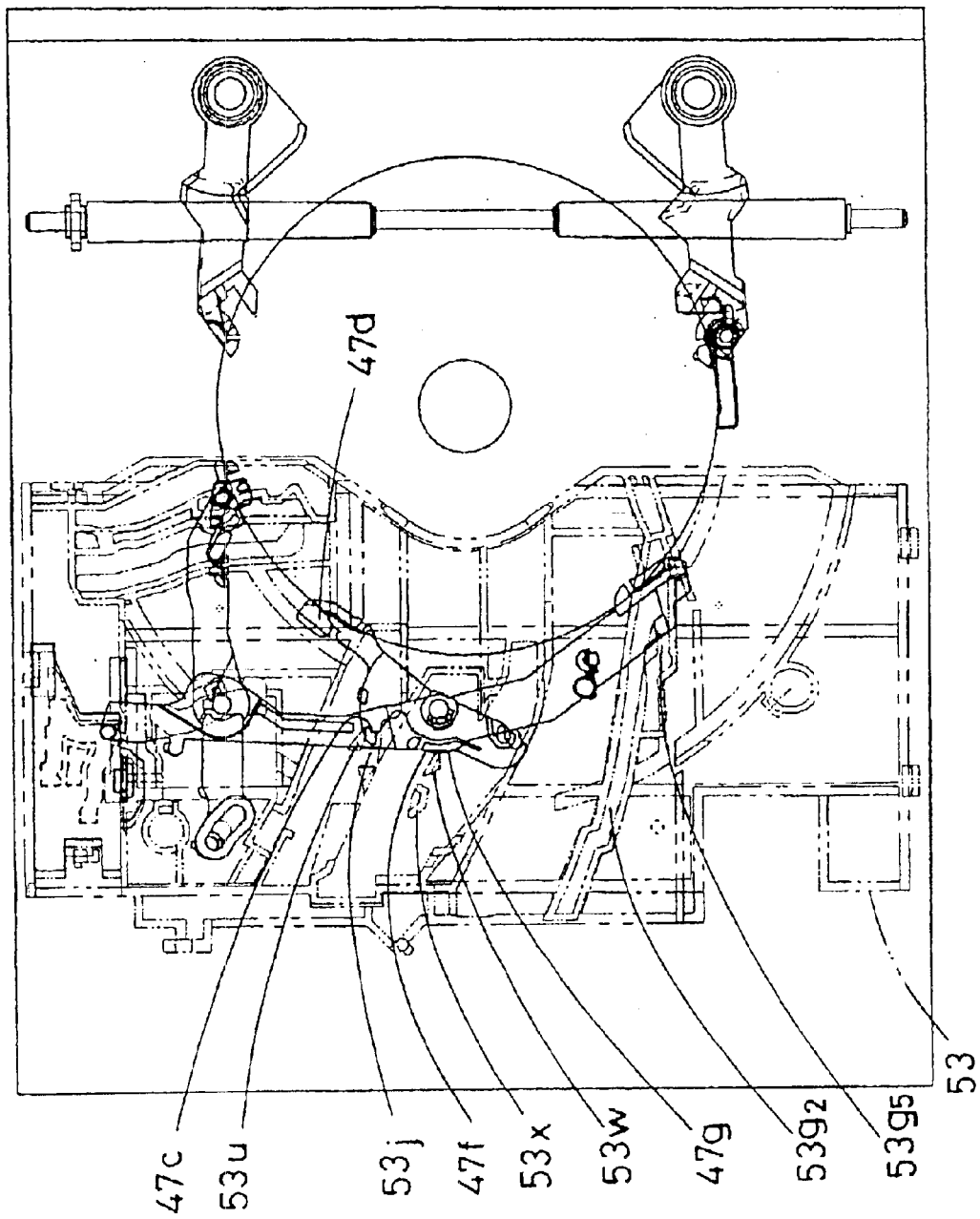
FIG. 60 shows a plan view illustrating the situation that a stop arm confronting an 8-cm disk stops.

That is, before the disk goes to the position in which the stop arm 47 stops at the engagement position, the slide cam R 12 and slide cam L 13 slide, whereby the clutch gear 42 departs from the roller gear 62. Accordingly, the rotation of the roller unit 503 stops, and then disk transfer stops. Then, the rollers 61 for transferring the disk depart from the disk. At that time, in order to maintain the groove bottom surfaces of the confronting sections 45b and 48d to be departing from the outer edge of the disk, for example, by 0.5 mm or the like, the pin 48c of the check lever 48 engages with the engagement section 53g3 or 53g6 (for a small disk) of the cam groove 53g. Accordingly, the center hole in the disk engages with a protrusion which has an inclined side surface of a substantially trapezoidal shape and is formed in the upper edge of the disk motor 17. This permits easy centering of the disk. Then, the slide rack 14 traveling together with the slide cam R 12 travels and thereby causes the travel of the check cam 54. Accordingly, the cam groove 54c presses the pin 48e in reverse. This causes the set lever 46 and the check lever 48 to open in order for the confronting sections 45b and 48d to depart further from the outer edge of the disk by one or a few mm. This permits clamping of the disk onto the disk motor 17. In case of a 12-cm disk, in the stop arm 47, when the pin 48c of the check lever 48 enters from the engagement section 53g3 into the groove 53g4, the protrusion 47b is released from the engagement section 53t as shown in FIG. 59. Then, the protrusion 47f of the stop arm 47 confronts the protrusion 53v of the cam groove 53j, whereby the confronting section 47d rotates so as to depart from the disk. In case of an 8-cm disk, in the stop arm 47, when the pin 48c of the check lever 48 enters from the engagement section 53g6 into the groove 53g7, the protrusion 47c is released from the engagement section 53u as shown in FIG. 60. Then, a protrusion (not shown) in the bottom surface of the protrusion 47g of the stop arm 47 confronts the protrusion 53x of the cam groove 53j, whereby the confronting section 47d rotates so as to depart from the disk.

At that time, linking is made such that the motion of the slide cams 12 and 13 causes the ribs 11d and 11e of the slide cam rod 11 to engage with the cam grooves 4d and 9d of the out-levers 5 and 9, and thereby causes the out-levers 5 and 9 depart from the disk.

As for the fix and attachment of the check plate 53 to the mechanism chassis 1, the hole 53f is fixed to the boss 1i with claw (see FIG. 3) of the mechanism chassis 1, while the claws 53k and 53e are engaged with the holes 1k and 1j, respectively.

At this time, the attachment is made such that the rib 54b of the check cam 54 engages with the groove 14e of the slide rack 14. Further, an arc-shaped recess 53r through which the clamp unit 508 passes is provided in the center of the front end of the check plate 53.

Figure 18:
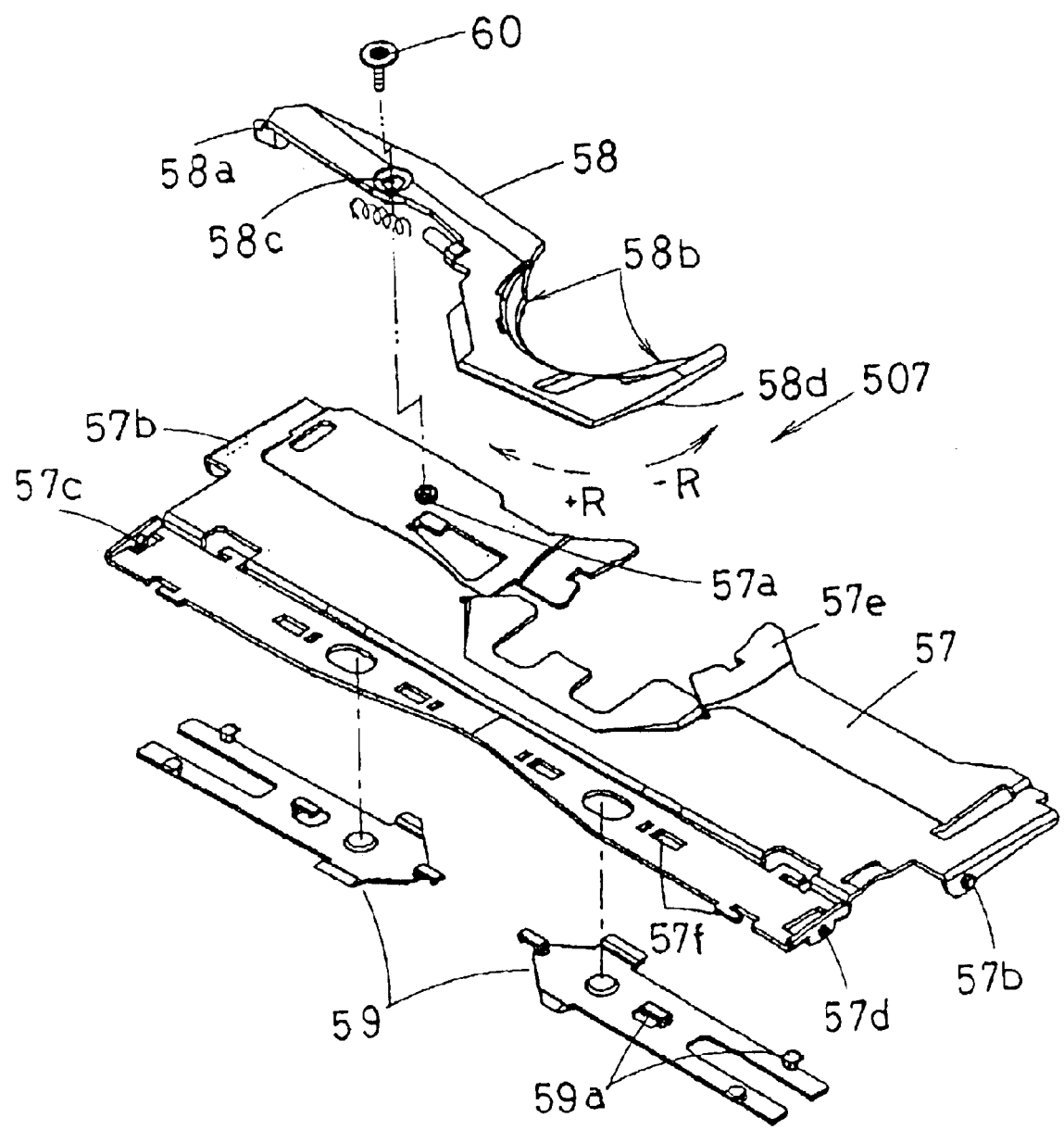
FIG. 18 shows an exploded perspective view of a top plate unit.
Figure 19:
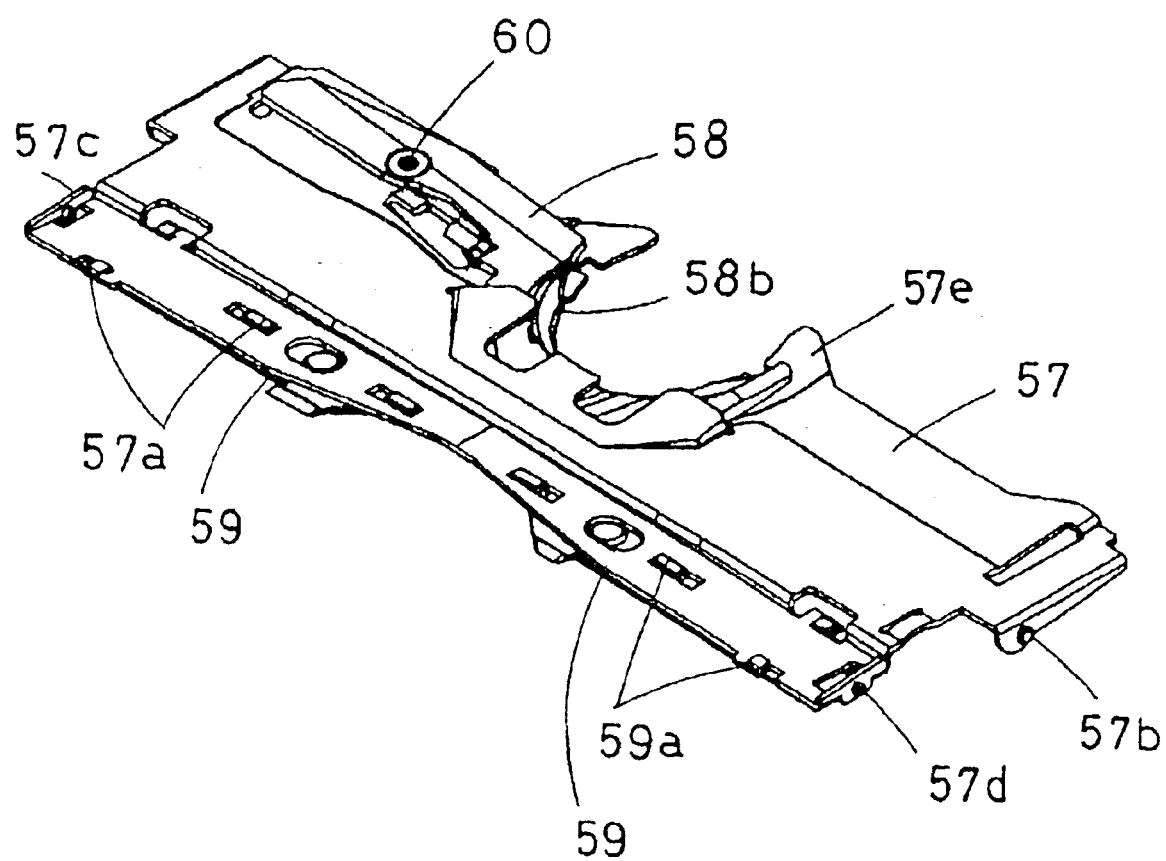
FIG. 19 shows a perspective view of a top plate unit.

FIGS. 18 and 19 show top plate unit 507. The top plate unit 507 comprises: a top plate 57; top pads 59 attached to the top plate 57; and a clamp lock 58 attached to a barring 57a in a rotatable manner by a screw 60 passing through a hole 58c in the middle portion.

In the top plate 57, shafts 57b at both ends of the top plate 57 are attached in a rotatable manner in holes 1h (see FIG. 2) at both ends of the mechanism chassis 1. A protrusion 57c engages with a cam groove 13b of the slide cam L 13, while a protrusion 57d engages with a cam groove 12b (having a reversed phase to the cam groove of the slide cam L 13) of the slide cam R 12 (see FIG. 45). In linkage with the motion of the slide cam R 12, the top plate 57 rotates around the shafts 57b, whereby the top pads 59 clamping the disk in cooperation with the tapered rollers 61 can depart from the disk. This permits later clamping.

Each top pad 59 is attached to a member 57e having a chevron shape in the top plate 57, and thereby retains the outer edge alone of the disk against a tapered roller 61 on the opposite side. This permits disk transfer without causing scratches in the disk. Numeral 59a indicates an attachment section. Numeral 57f indicates a counter attachment section.

In the clamp lock 58, an arc-shaped section 58d at the tip is enforced in the R direction by a clamp lock spring 58c. Between the arc-shaped section 58d and the arc-shaped recess 53r of the check plate 53, a clamp unit 508 described later is pushed up by an inclined surface 58b formed along the inner circumference of the arc-shaped section 58d. This avoids droop of the clamp unit 508 and maintains the locked state. Accordingly, contact to the clamp unit 508 is avoided during disk insertion. At the same time, the load to the drive mechanism is reduced when the clamp unit 508 is released at disk ejection.

A protruding rib 58a in the top plate 57 confronts the rib 13d of the slide cam L 13 immediately before the completion of disk loading (see FIG. 3). Then, the rib 58a is pressed by the slide cam L 13, and thereby rotates in the +R direction. Accordingly, the lock of the clamp unit 508 is released, and so is the clamp unit 508 itself. Then, the disk 100 is clambed between the clamp unit 508 and the disk motor 17. This permits the rotation of the disk 100 by the disk motor 17.

Figure 20:
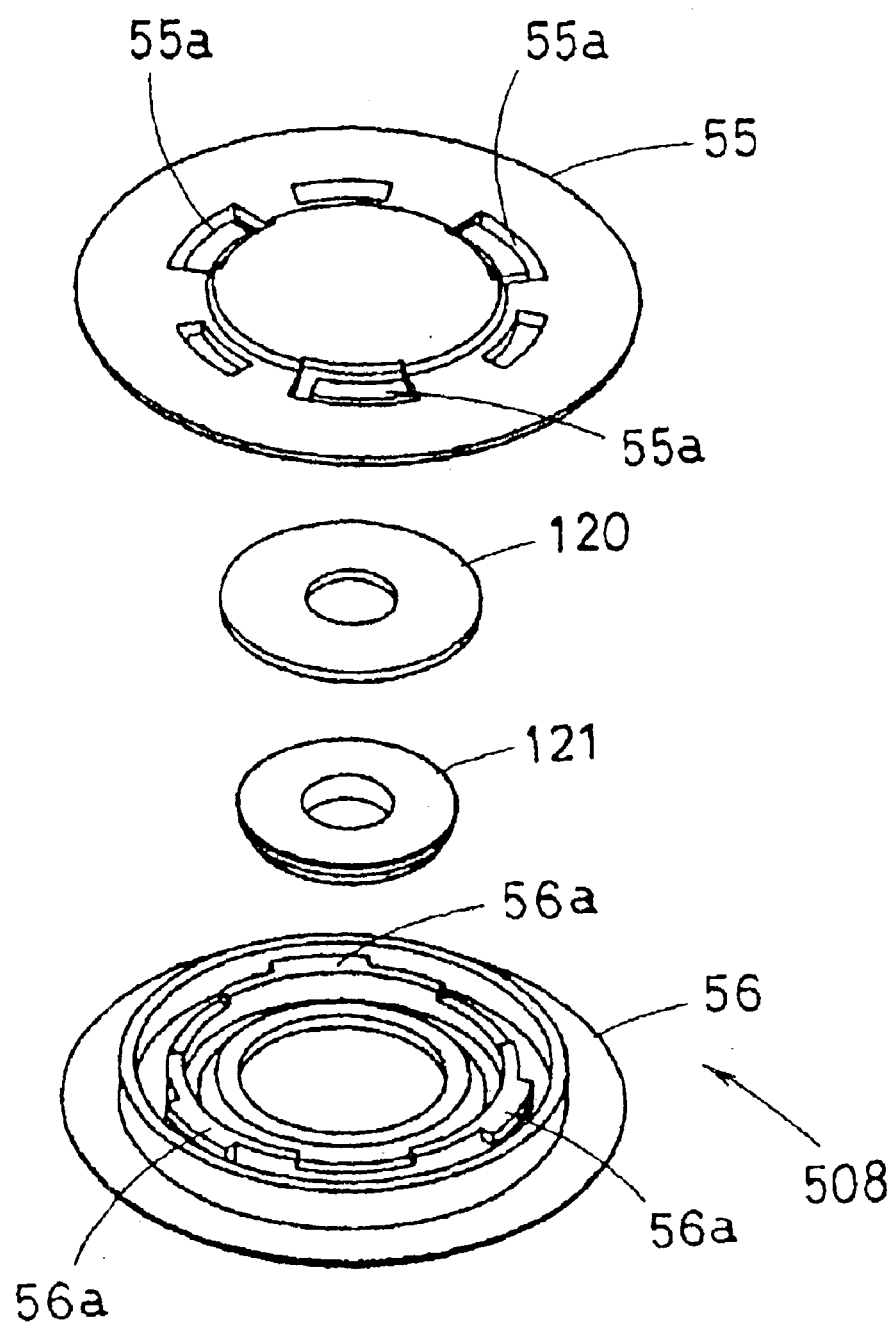
FIG. 20 shows an exploded perspective view of a clamp unit.
Figure 21:
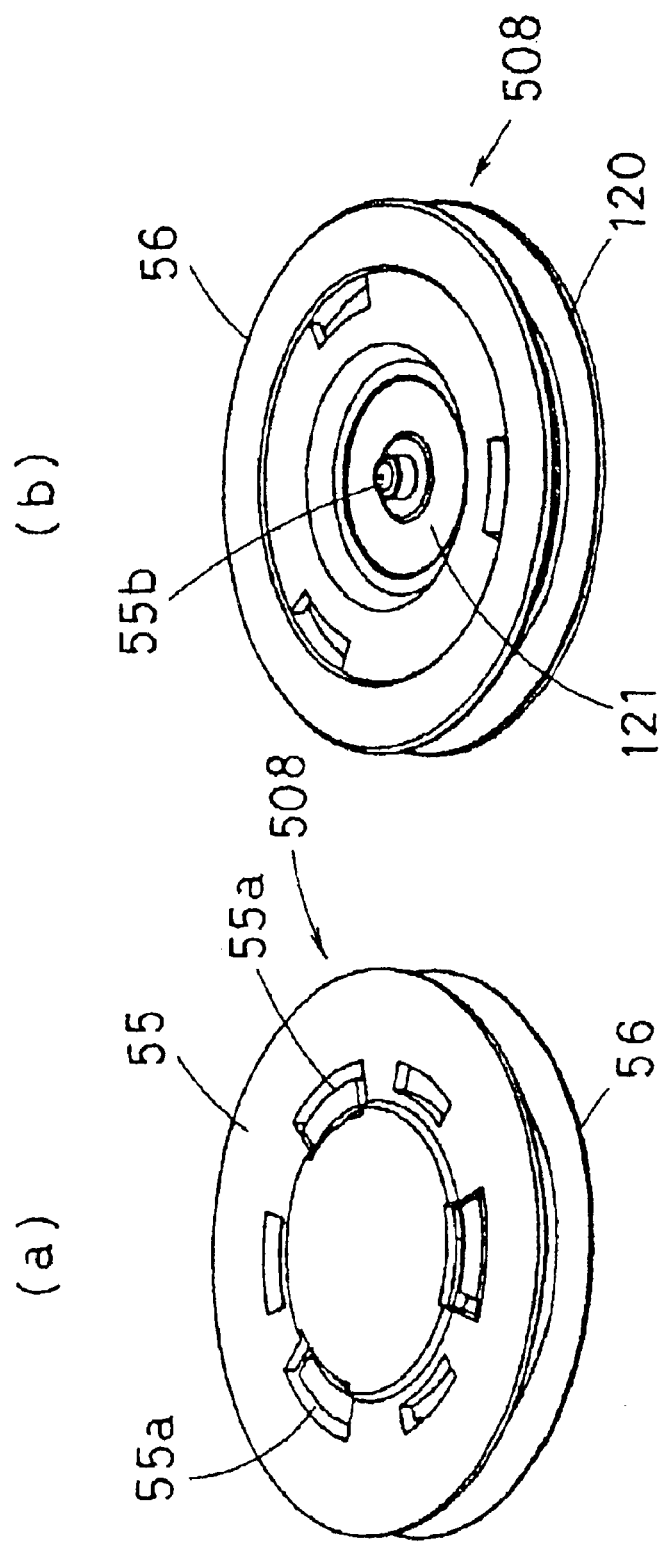
FIG. 21(a) shows a perspective view of a clamp unit viewed from above.
FIG. 21(b) shows a perspective view of a clamp unit viewed from below.

FIGS. 20 and 21 show the clamp unit 508. In the clamp unit 508, a clamp B 55 contains a magnet 121 and a back yoke 120, and then is covered by a clamp A 56. Three engagement claws 56a in the clamp A 56 engage with claw receptions 55a in the clamp B 55, whereby the assembly is completed. The clamp unit 508 magnetically sticks to the disk motor 17, and thereby clamps and fixes the disk therebetween. The clamp is relesed by being pushed up by the inclined surface 58b of the clamp lock 58. Numeral 58b indicates a protrusion for positioning by engaging with the recess 17a (see FIG. 7) on top of the disk motor 17 during disk clamping.

Figure 22:
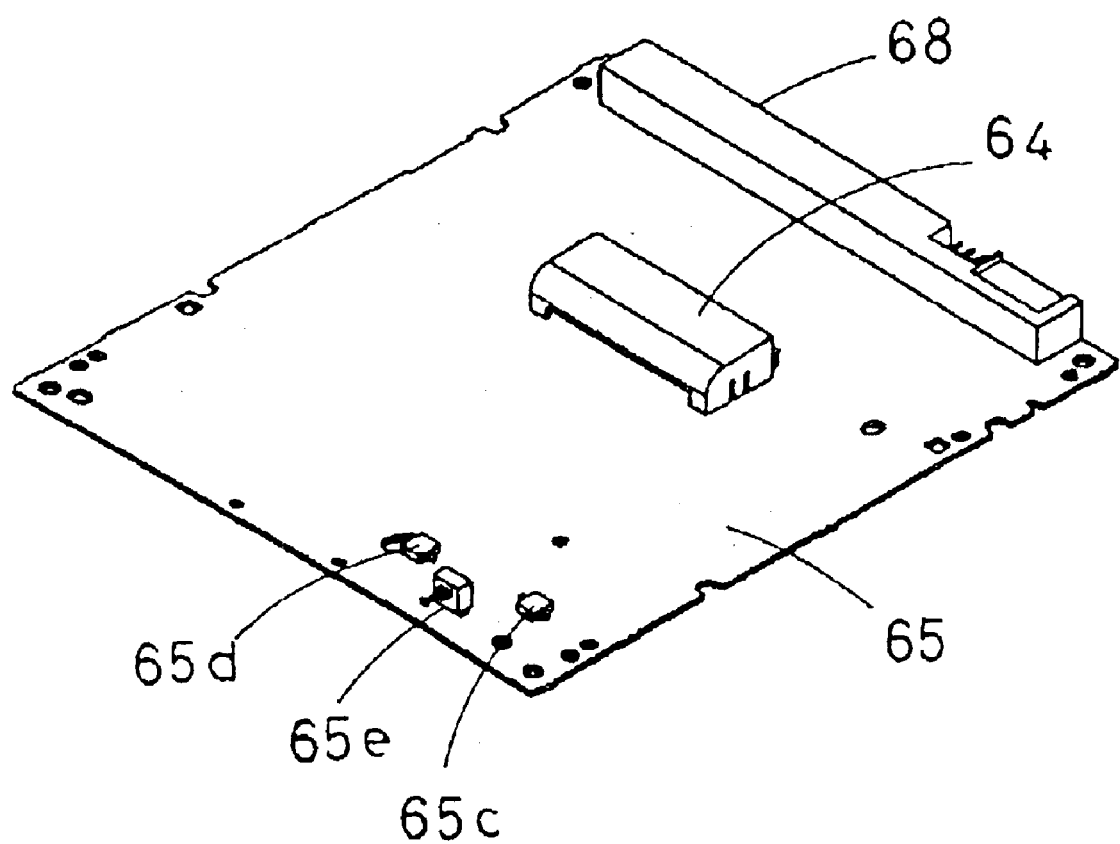
FIG. 22 shows a perspective view of a P board with a cover being attached.
Figure 23:
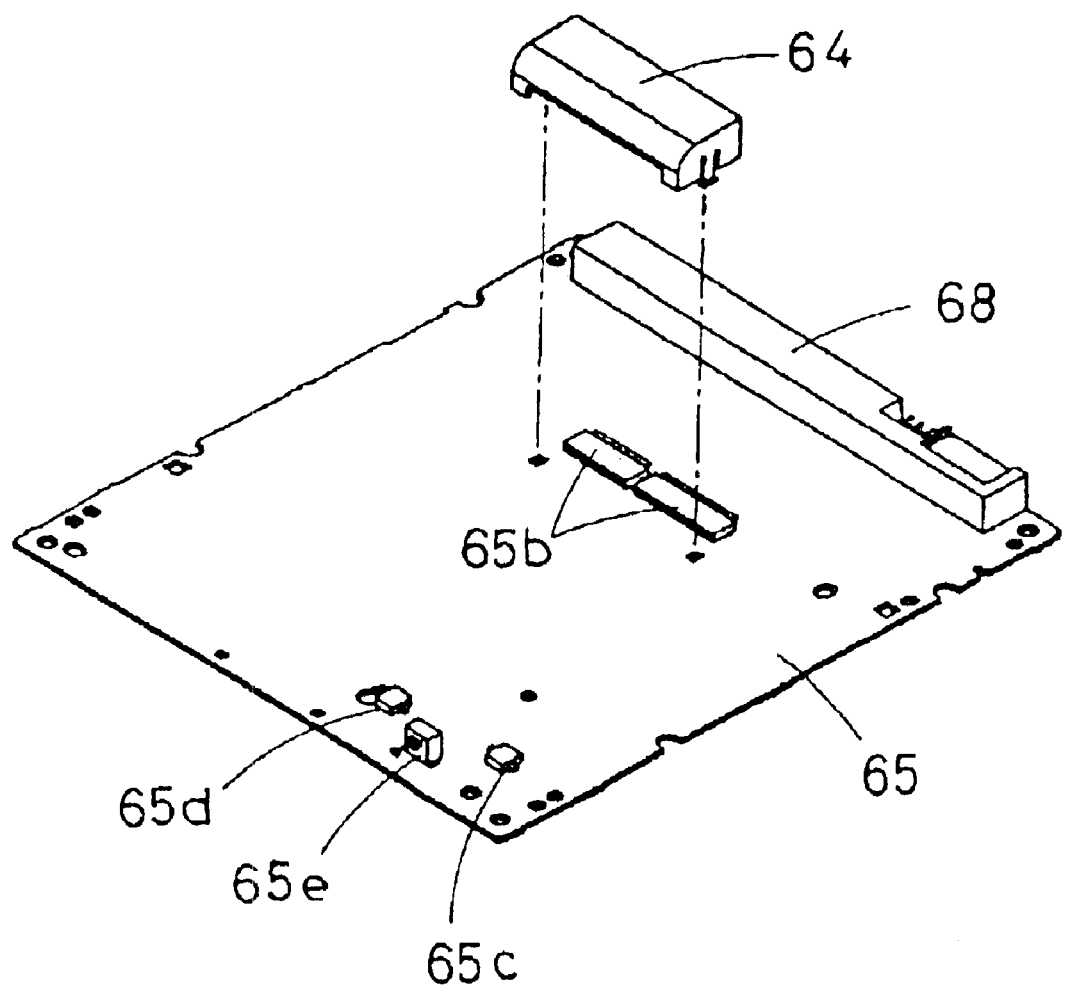
FIG. 23 shows a perspective view of a P board with a cover being detached.
Figure 24:
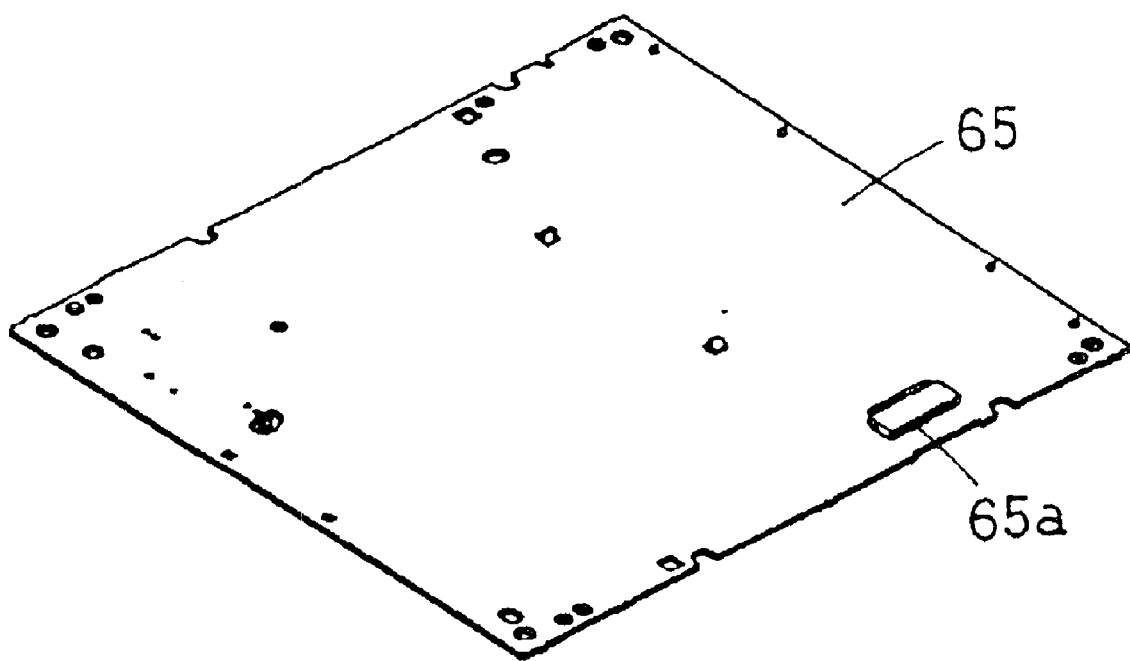
FIG. 24 shows a perspective bottom view of a P board.

FIGS. 22–24 show the P board 65. As described above, the connector 65a on the bottom surface of the P board 65 is connected to the terminal 21a of the motor flexible plate 21 of the stepping motor 18. The connector 65b on the top surface is connected to the flexible lead 502a of the optical pickup 30. A base cover 68 covers the output section of the P board 65. An FPC cover 64 covers the connector 65b. The base cover 68 and the FPC cover 64 guide the intermediate bent portion of the flexible lead 502a of the optical pickup 30. Numeral 65c indicates a stop switch serving also as a switch for detecting the completion of disk loading.

In the P board 65, positioning pins (not shown) on the bottom surface of the mechanism chassis 1 engage with holes in the P board 65. The P board 65 and the mechanism chassis 1 are fixed to the frame 66 by screws 70 with being sandwiched by the lower shield 69.

Loading of a 12-cm disk is described below.

Figure 25:
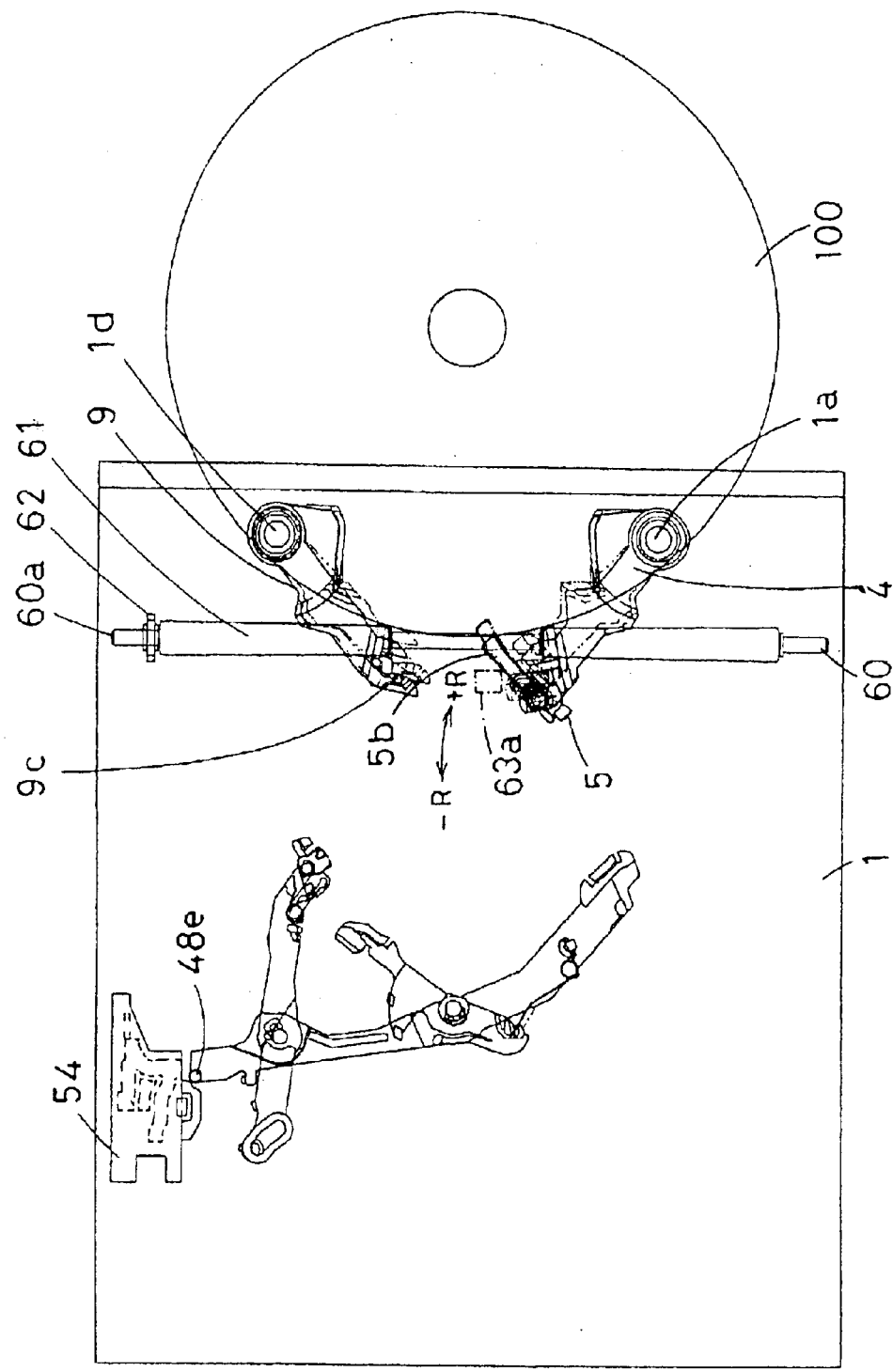
FIG. 25 shows a schematic plan view illustrating the situation that a disk is inserted, and thereby confronts an in-push arm, whereby tapered rollers begin to rotatee.

When a 12-cm disk 100 is inserted into the slot formed between the top surface of the mechanism chassis 1 and the frame 66 as shown in FIG. 1, the 12-cm disk 100 confronts the lever 5b of the in-push arm 5 attached at the tip of the out-lever L 4 in a rotatable manner, as shown in FIG. 25, whereby the in-push arm 5 rotates in the −R direction. Before the rotation of the in-push arm 5, the boss 5a of the in-push arm 5 confronts the cam section 63a of the front guide 63. At the same time, the out-levers L 4 and R 9 are linked to each other by the out-rod 7, whereby the out-levers L 4 and R 9 are restricted such as not to be moved separately by external disturbance such as vibration and shock. In this situation, the lower-surface cam 4d of the out-lever L 4 confronts the the cam section 2b of the switch lever 2, whereby the boss 2a of the switch lever 2 presses the detection switch 65d on the P board 65.

As described above, when the in-push arm 5 rotates, the boss 5a thereof slides along the cam section 63a, and at the same time, the out-lever L 4 carrying the in-push arm 5 rotates. The lower-surface cam 4d goes from the cam section 2b of the switch lever 2 to the cam groove 2e (see FIG. 3). Accordingly, the switch lever 2 rotates in the +R direction, whereby the boss 2a departs from the detection switch 65d on the P board 65. A CPU detects this change, and thereby causes the loading motor 32 to rotatee in the direction that the tapered rollers 61 transfers the 12-cm disk 100 into the apparatus. The 12-cm disk 100 is transferred in the state that the outer edge alone of the disk 100 is retained between the tapered rollers 61 and the top pads 59 which are on the opposite sides with respect to the disk 100. Accordingly, the recording surface and the back surface of the disk 100 are not contacted, and hence do not suffer scratches.

Figure 26:
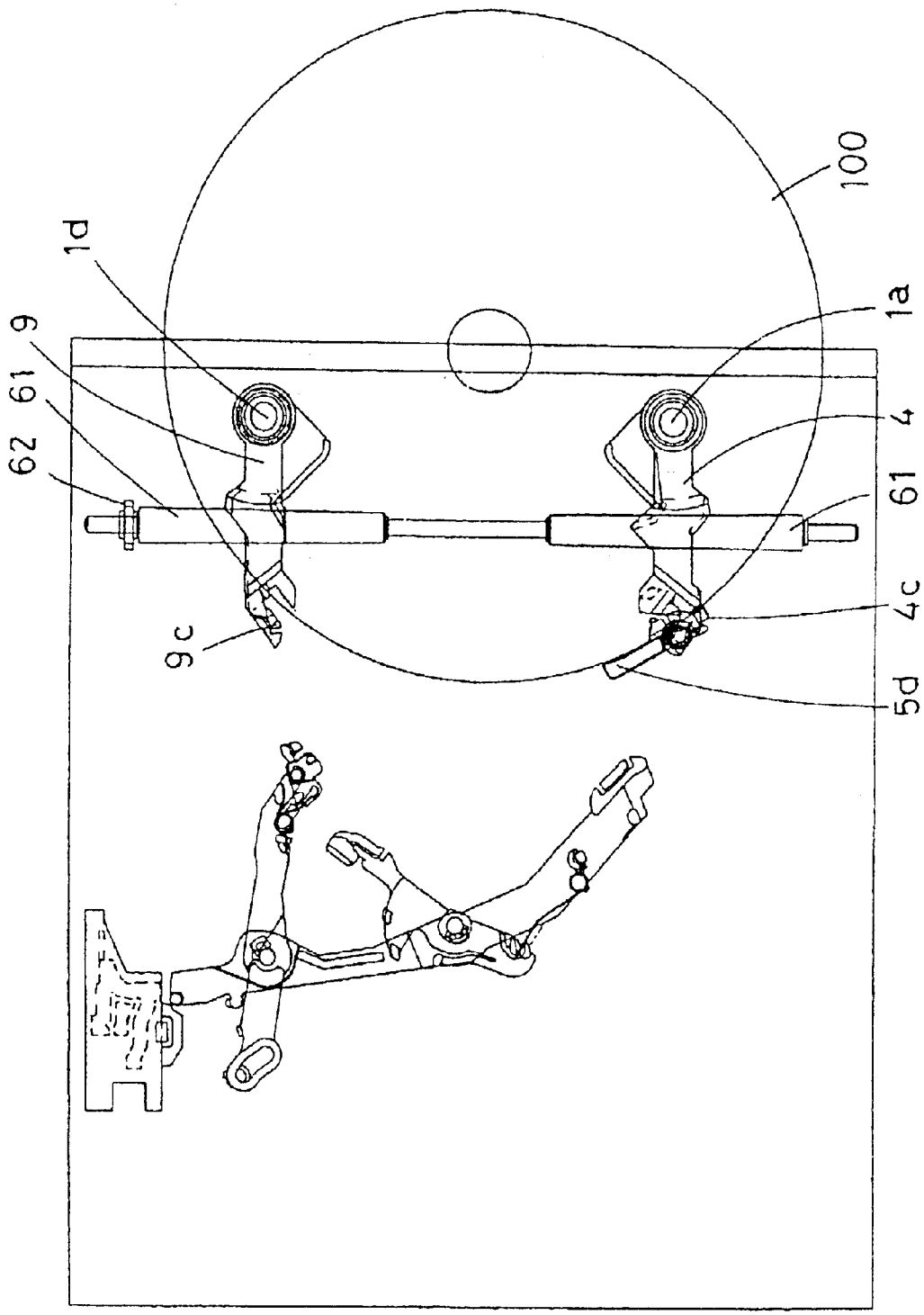
FIG. 26 shows a schematic plan view illustrating the situation that a disk is further transferred, and thereby opens an out-lever.

The 12-cm disk 100 is transferred into the apparatus in the state that the outer edge is retained among the guide groove 9c of the confronting section of the out-lever R 9, the guide groove 4c of the confronting section of the out-lever L 4, and the guide of the in-push arm 5, as shown in FIG. 26. The out-levers R 9 and L 4 rotate such as to depart from each other depending on the diameter of the disk 100. Here, the out-levers R9 and L4 are linked to each other by the out-rod 7. Accordingly, the angle of rotation is substantially the same in both levers. This avoids the side shift of the center of the disk 100.

Figure 27:
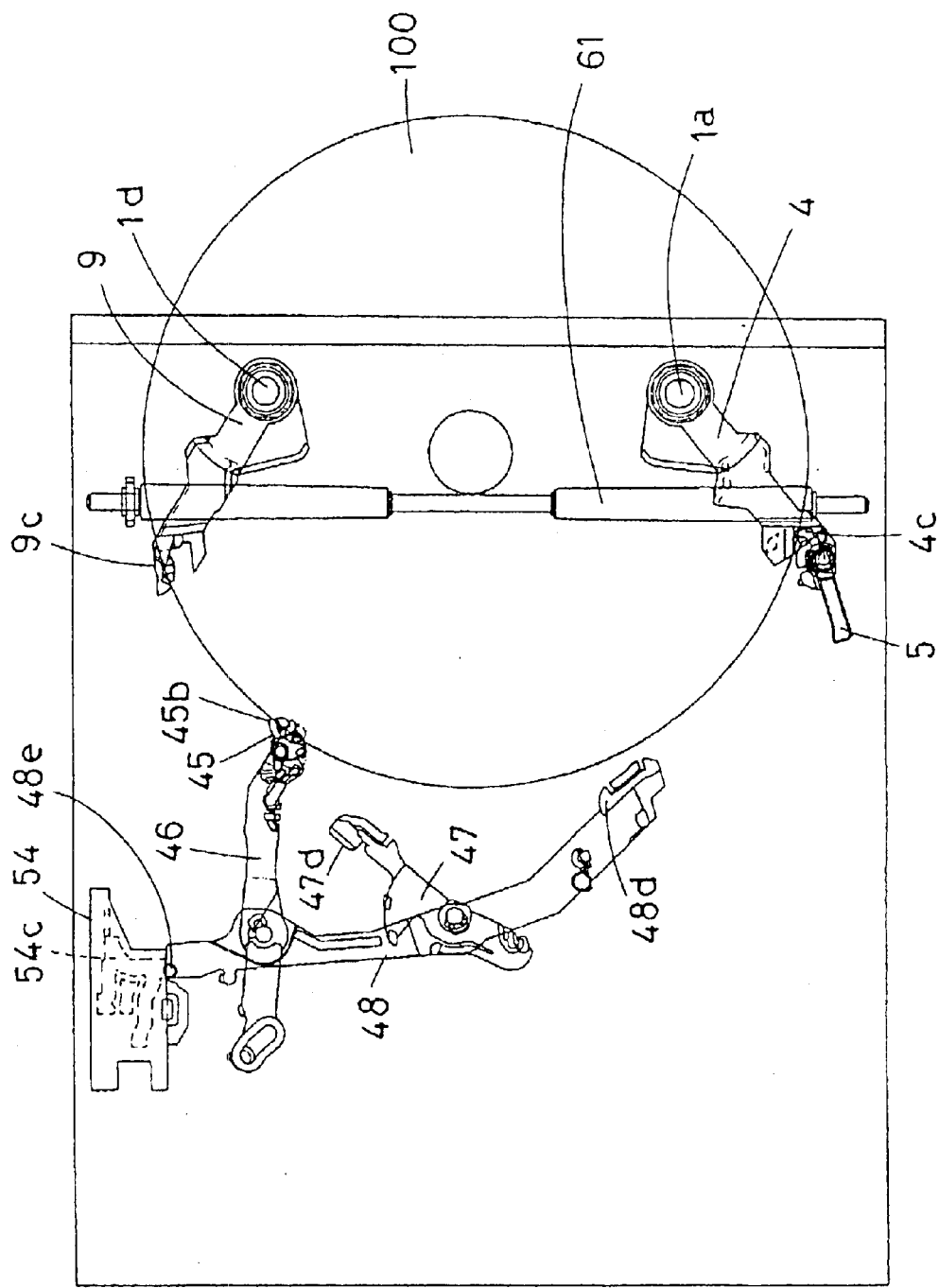
FIG. 27 shows a schematic plan view illustrating the situation that a disk is further transferred, passes an out-lever by, and thereby confronts a side lever.

The 12-cm disk 100 is transferred further into the apparatus in the state that the outer edge is retained among the guide groove 9c of the confronting section of the out-lever R9, the guide groove 4c of the confronting section of the out-lever L 4, and the guide of the in-push arm 5, as shown in FIG. 27. The leading edge of the 12-cm disk 100 then confronts the confronting section 45b of the guide groove of the side arm 45, and thereby rotates the side arm 45 relatively to the set lever 46. This releases the restriction on the set lever 46, and thereby permits the rotation on the check plate 53.

Figure 28:
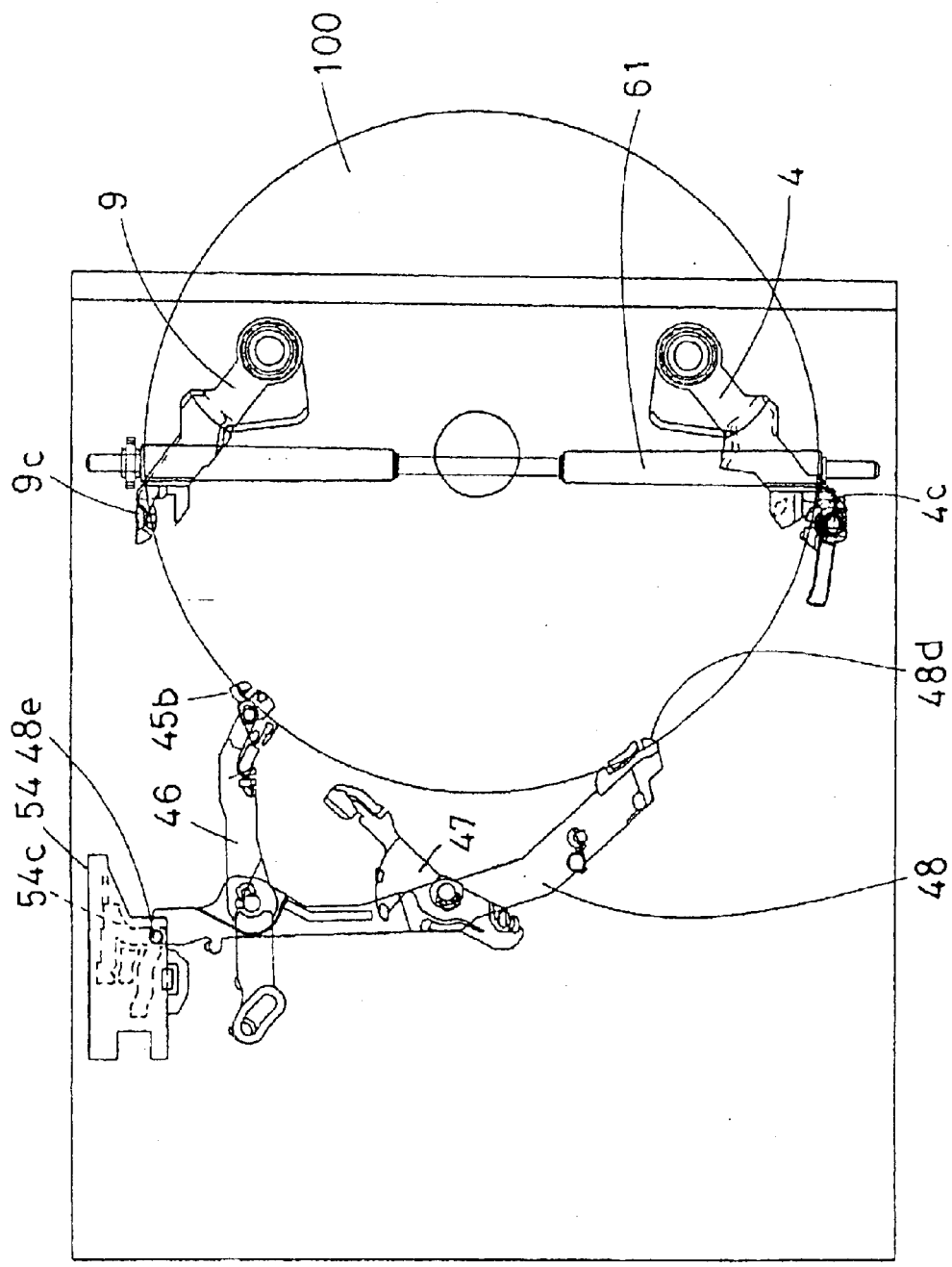
FIG. 28 shows a schematic plan view illustrating the situation that a disk is further transferred, and thereby confronts a side lever and a check lever.

As shown in FIG. 28, after being retained by the side arm 45, the 12-cm disk 100 also confronts the confronting section 48d of the guide groove of the check lever 48. This permits the check lever 48 to travel on the check plate 53. The set lever 46 is provided with a guide section 46d in the vicinity of the tip. The guide section 46d and the guide section 48a of the check lever 48 engage with the cam grooves 53a and 53b of the check plate 53 in a slidable manner (see FIG. 14). Accordingly, the set lever 46 and the check lever 48 are restricted by the cam shapes of the cam grooves 53a and 53b of the check plate 53 in order to ensure that the center hole of the disk 100 does not deviate largely from the center of the disk motor 17 when the disk insertion is completed, and that the path of insertion of the center hole of the disk 100 passes through the center of the disk motor 17.

Figure 29:
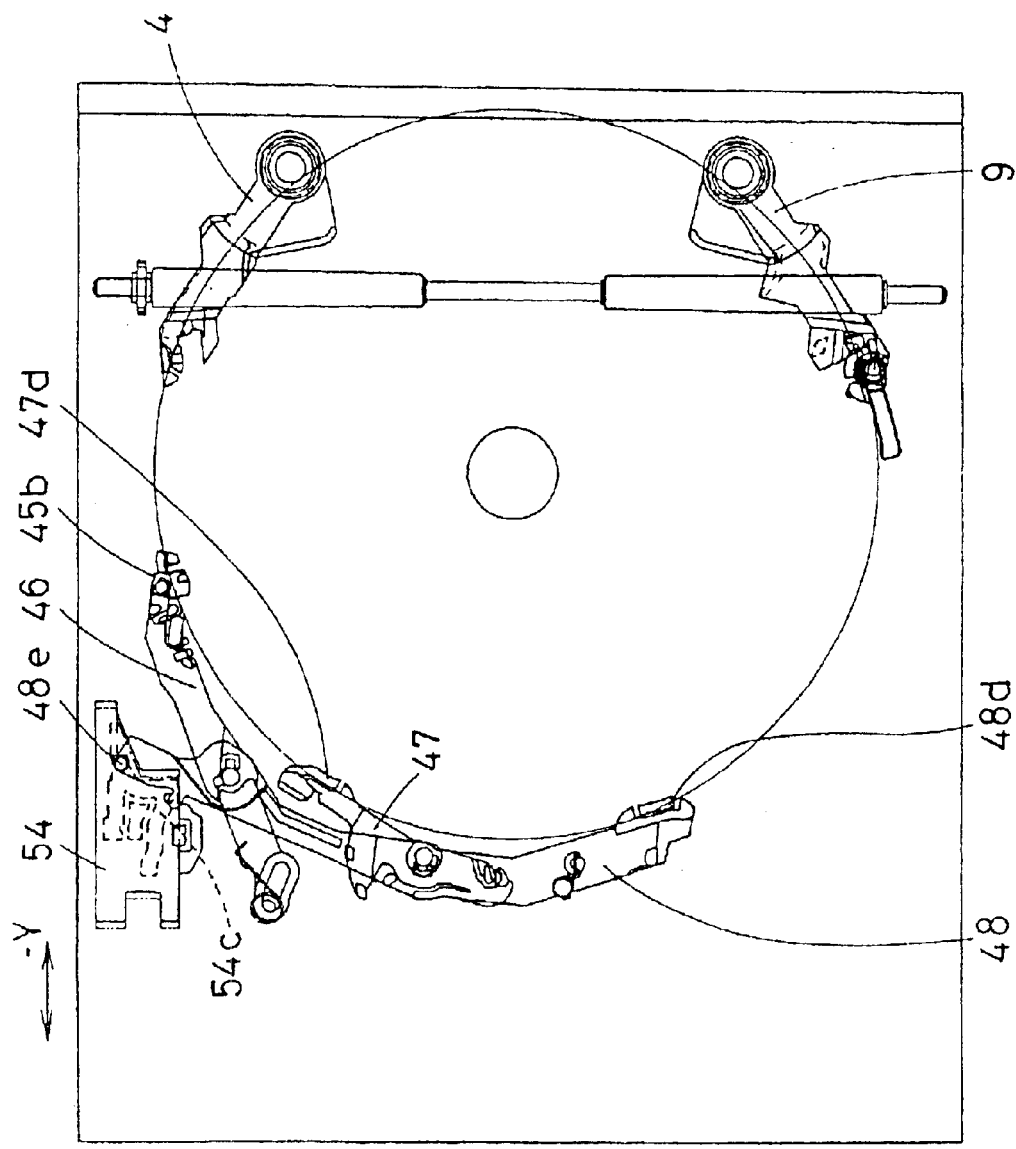
FIG. 29 shows a schematic plan view illustrating the situation that a disk confronts a stop arm.
Figure 33:
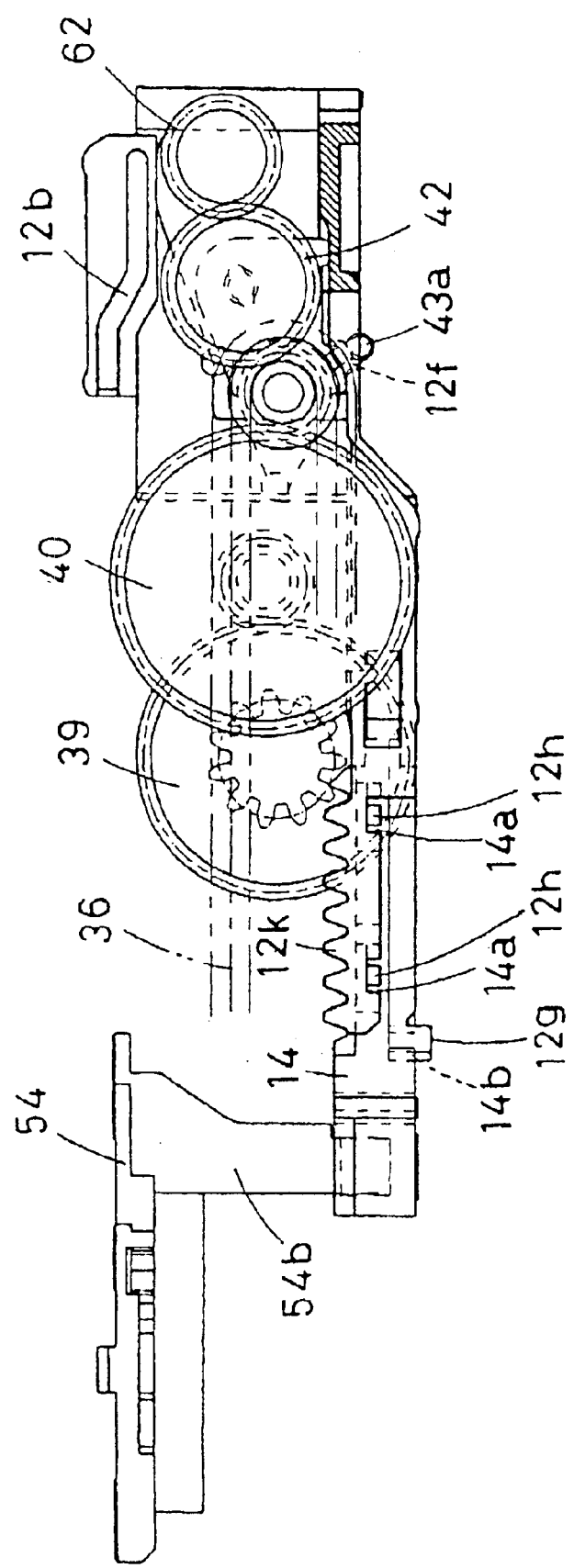
FIG. 33 shows an elevation view illustrating the situation that a slide rack engages with a gear.
Figure 34:
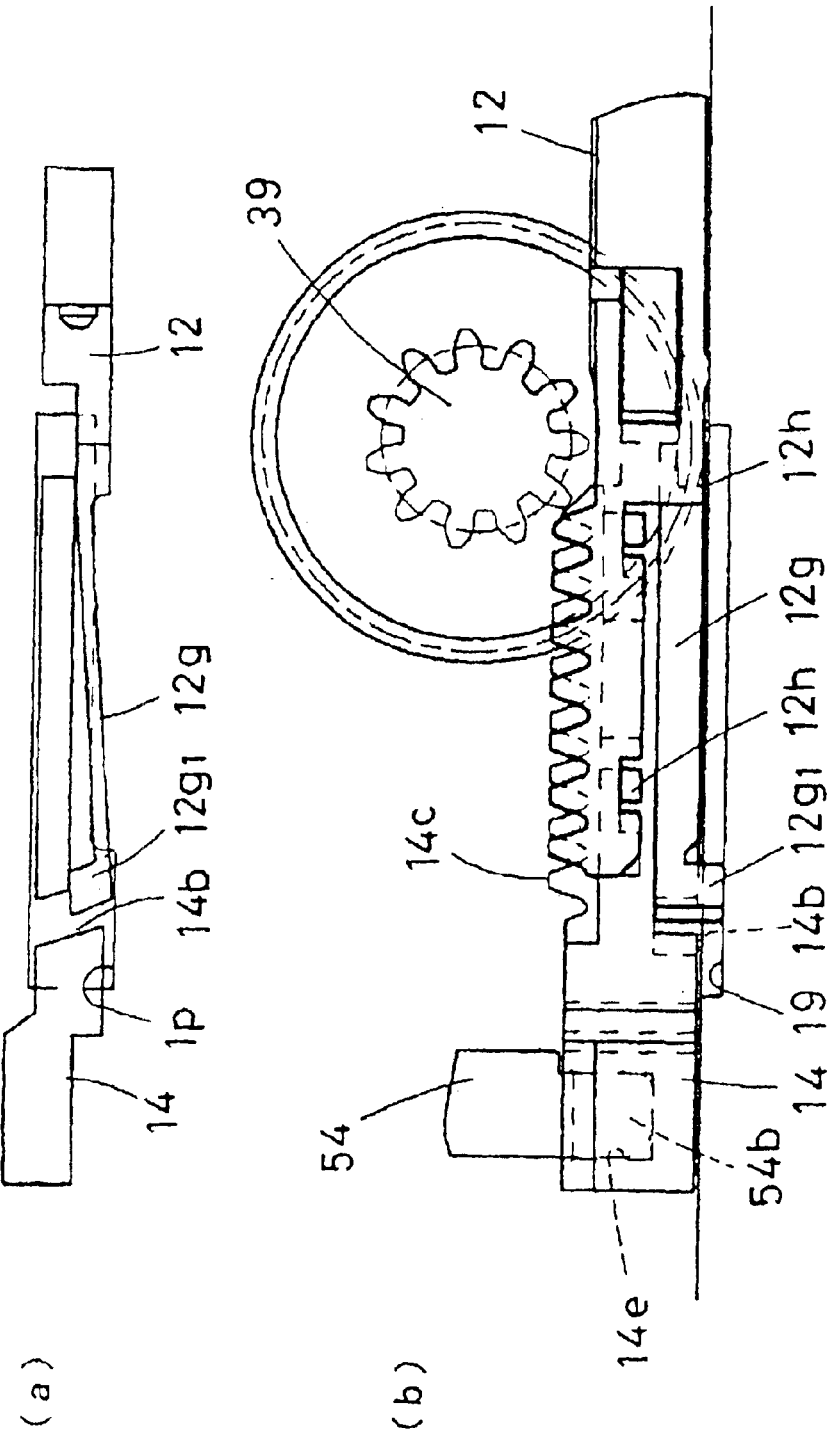
FIG. 34(a) shows a cross sectional view of the main part of a slide rack in a disengaged state.
FIG. 34(b) shows an elevation view of a slide rack in a disengaged state.
Figure 35:
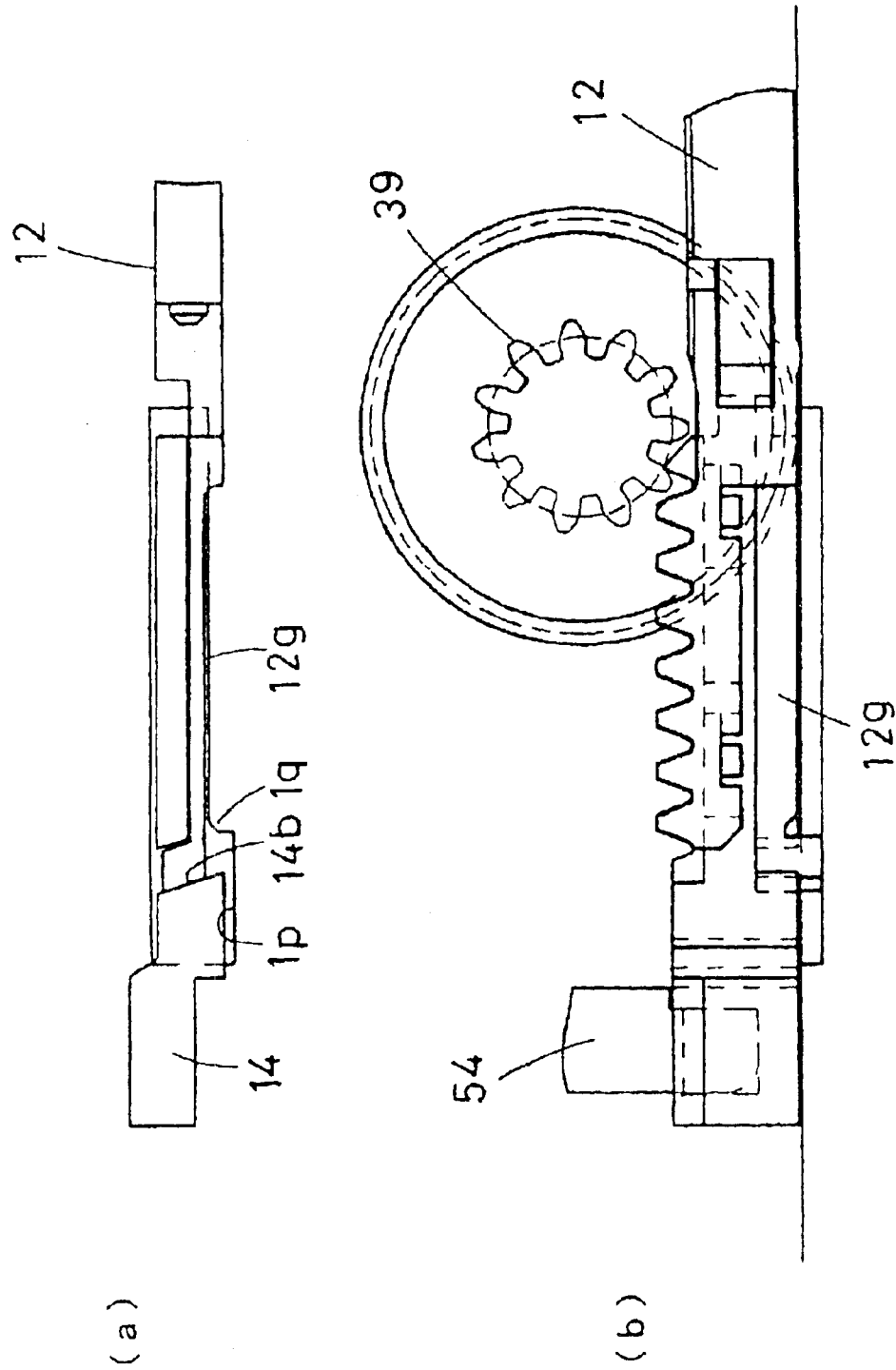
FIG. 35(a) shows a cross sectional view of the main part of a slide rack in an engaged state.
FIG. 35(b) shows an elevation view of a slide rack in an engaged state.
Figure 36:
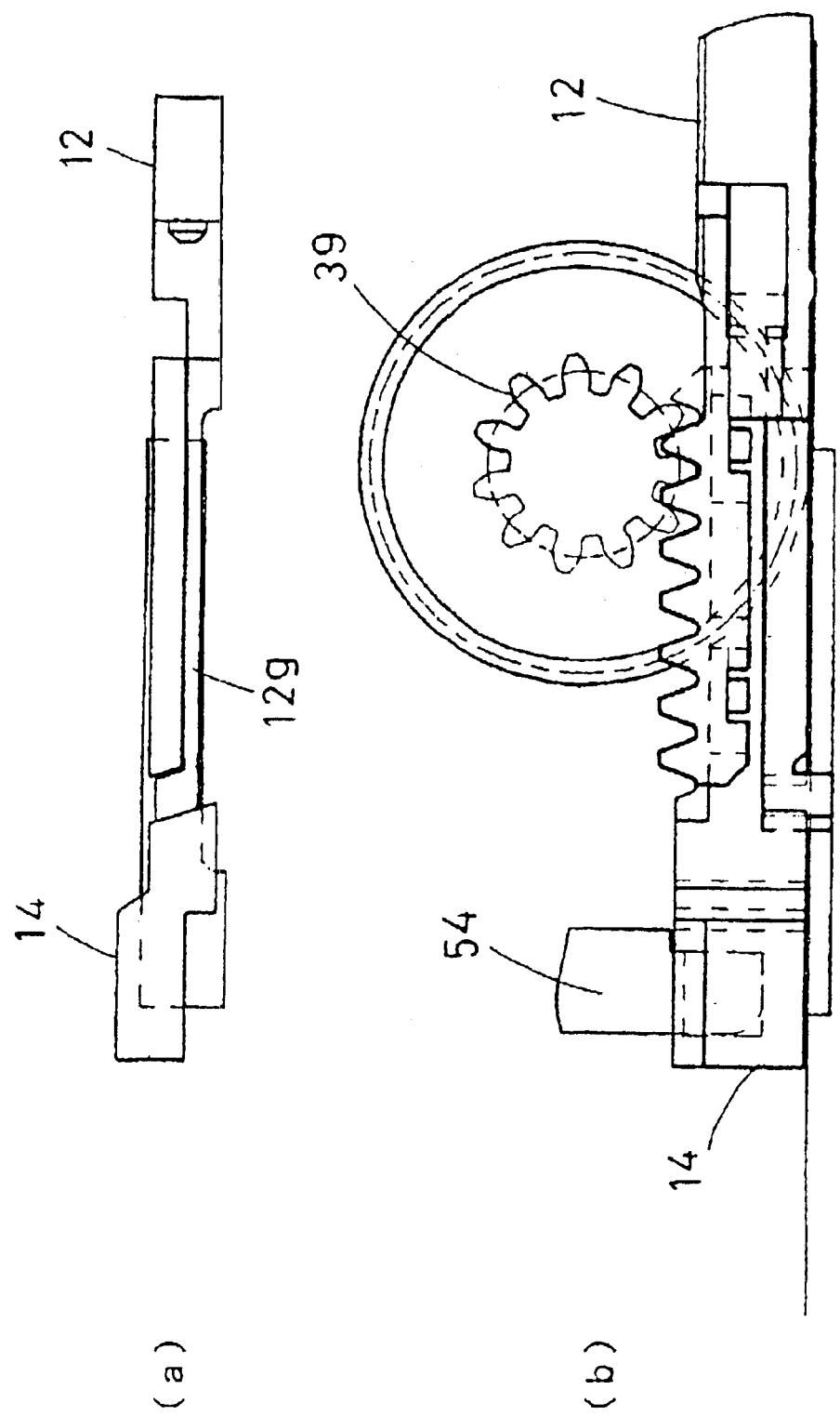
FIG. 36(a) shows a cross sectional view of the main part of a slide rack in a traveling state.
FIG. 36(b) shows an elevation view of a slide rack in a traveling state.

As shown in FIG. 29, the outer edge of the 12-cm disk 100 confronts and rotates the stop lever 47, and thereby causes the engagement of the stop lever 47 at a predetermined position. As shown in FIG. 29, the disk 100 is transferred into the apparatus in the state that the outer edge is retained among the out-lever L 4, the out-lever R 9, the set lever 46, and the check lever 48. The check cam 54 is provided with a cam groove 54c which has substantially an L shape and engages with the pin 48e in order that the pin 48e of the check lever 48 pushes the check cam 54 in the −Y direction immediately before the completion of disk insertion. The check cam 54 having been pushed out pushes the engaging slide rack 14 in the −Y direction. Accordingly, starting from the state shown in FIG. 32 that the rack sections 14c and 12k of the slide rack 14 and the slide cam R 12 have a different phase from each other, and that the engagement between the the rack sections 14c and 12k and the gear 39 is inhibited by the groove 1p of the mechanism chassis 1 and the head 12g1 serving as a claw of the lever 12g of the slide cam R 12, the state changes as follows. That is, the rack sections 14c and 12k of the slide rack 14 and the slide cam R 12 go into the in-phase state as shown in FIG. 33. Further, as shown in FIGS. 34–36, the head 12g1 of the slide cam R 12 engages with the engagement groove 14b of the slide rack 14. Then, the lock is released between the tip of the protrusion 1q in the groove 1p of the mechanism chassis 1 and the head 12g1 of the slide cam R 12, whereby the rack section 14c of the slide rack 14 engages with the gear 39. Then, as shown in FIG. 33, the rack section 12k of the slide cam R 12 also engages with the gear 39. After that, the slide rack 14 and the slide cam R 12 travel as one piece.

Figure 32:
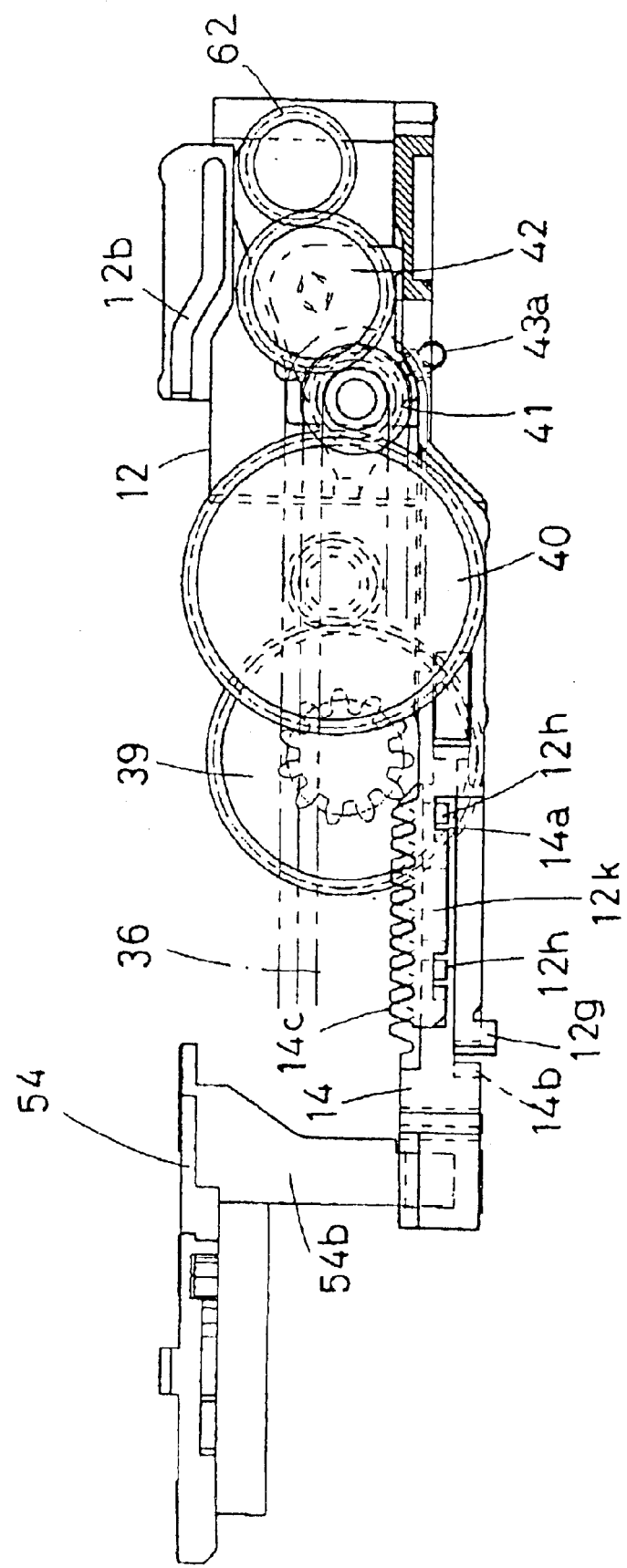
FIG. 32 shows an elevation view illustrating the situation before a slide rack of a slide cam unit engages with a gear.

As for the gear engagement action of the roller gear 62 before the the slide rack 14 starts to move, as shown in FIG. 32, the pulley gear 41 connected by the belt 36 to the loading motor 32 via the reduction gears engages with the gears 41, 42, and 62 in the roller revolution system, and at the same time, transmits a driving force to the gears 40 and 42 in the traverse mechanism elevation system. However, at this time, the gear 39 does not engage with the slide cam R 12 and the slide rack 14. Accordingly, the roller revolution system is solely powered.

After the the slide rack 14 starts to move, as shown in FIGS. 33–37, the cam section 43a of the clutch 43 is pushed up by the cam section 12f of the slide cam R 12, whereby the gear 42 attached to the clutch 43 departs from the gear 62 pushed into the roller shaft 60, in terms of the gear pitch. Accordingly, the transmission of the driving force to the roller revolution system is lost gradually.

Figure 37:
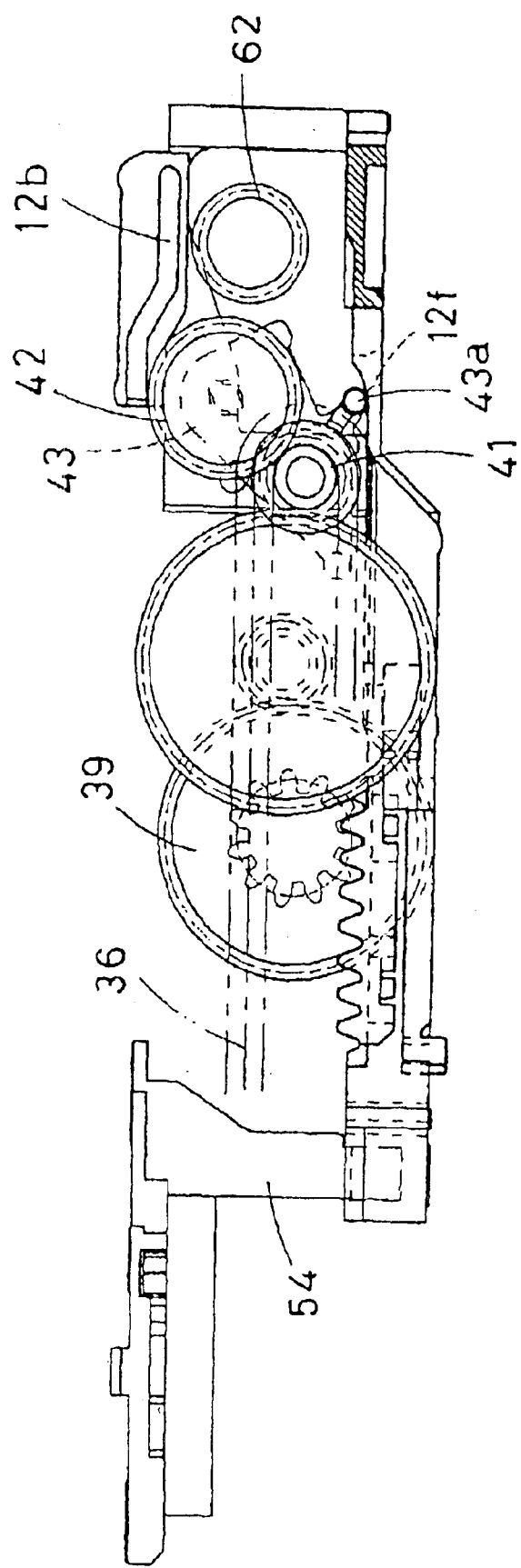
FIG. 37 shows an elevation view illustrating the situation that a slide cam unit moves, whereby the gear of a clutch disengages from a roller gear.
Figure 39:
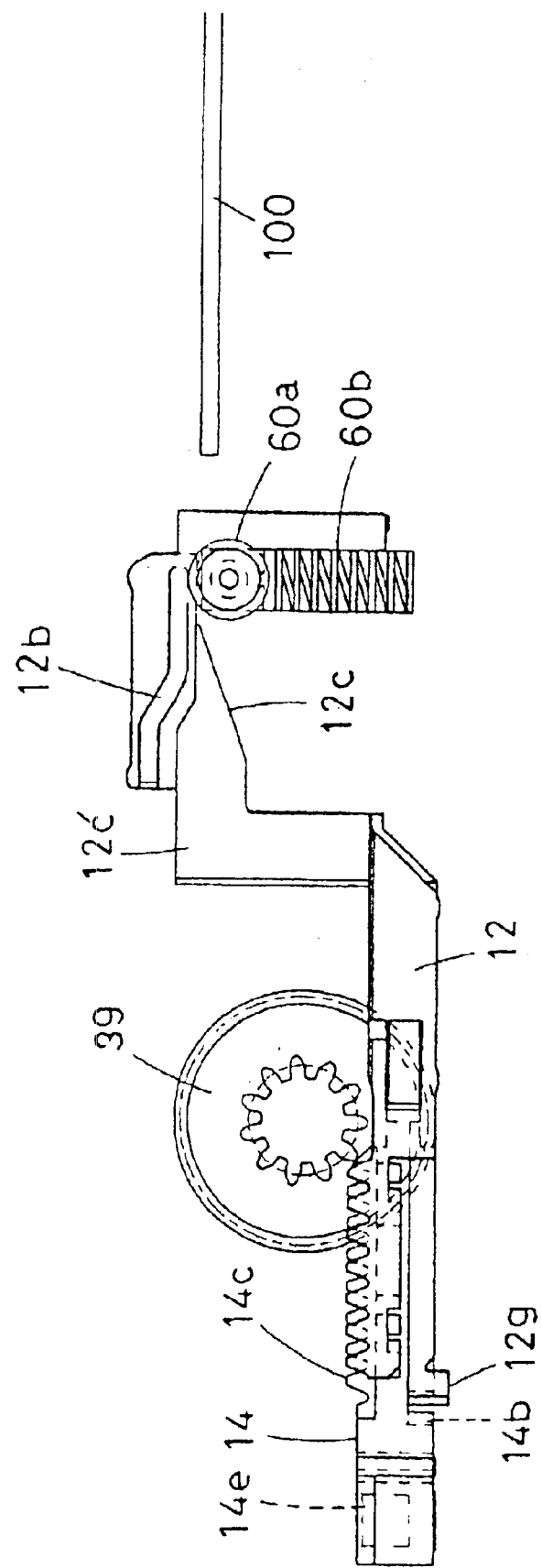
FIG. 39 shows an elevation view illustrating the situation before a disk is inserted onto rollers.
Figure 40:
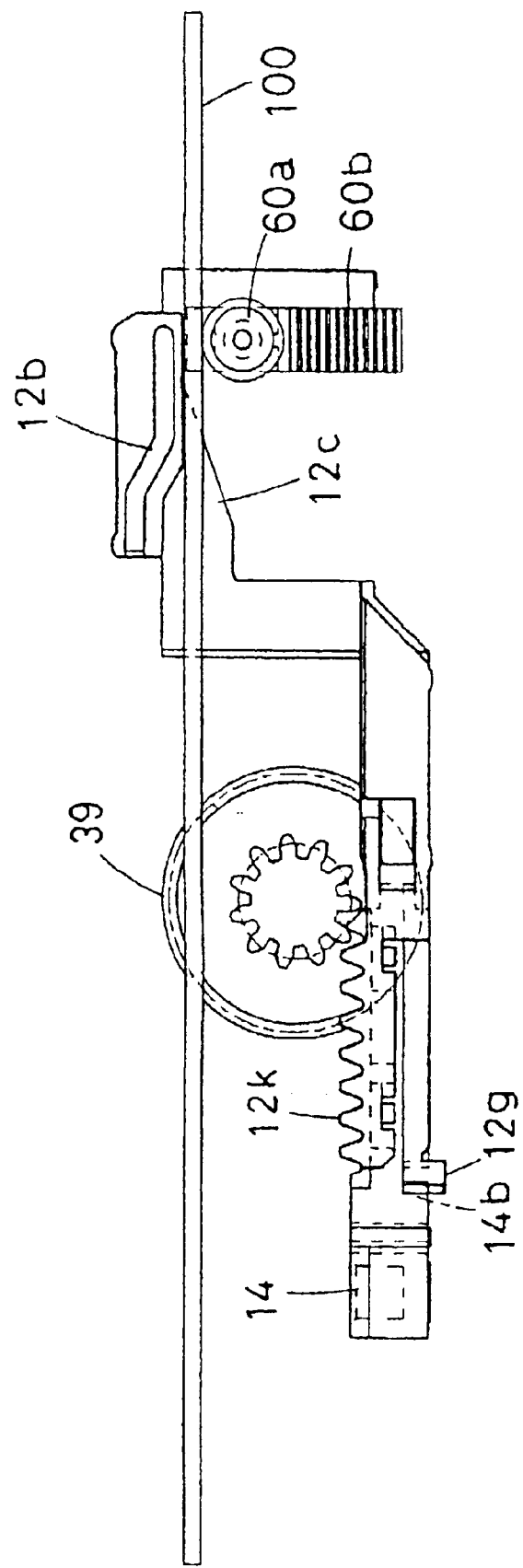
FIG. 40 shows an elevation view illustrating the situation that a disk is inserted onto rollers.
Figure 41:
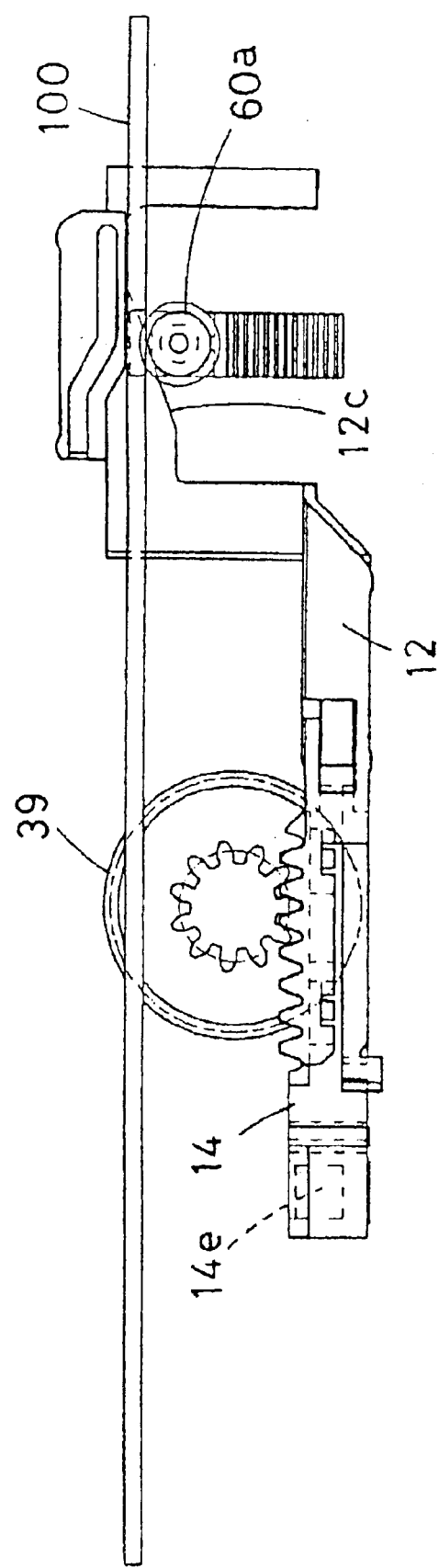
FIG. 41 shows an elevation view illustrating the situation that rollers are going down along cam grooves.
Figure 42:
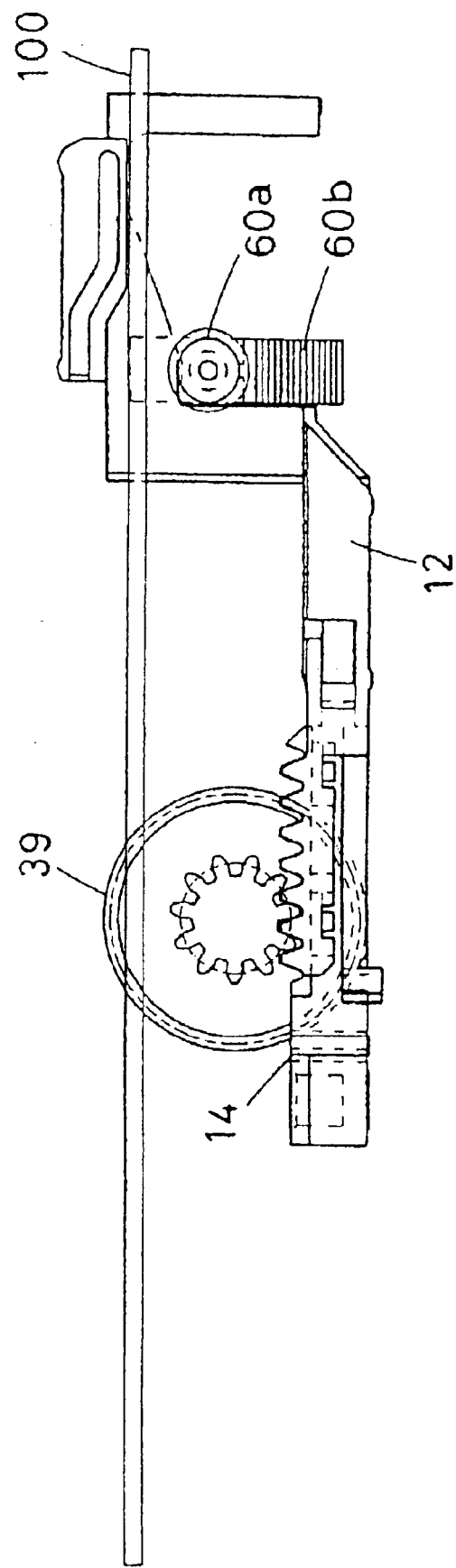
FIG. 42 shows an elevation view illustrating the situation that rollers have gone down along cam grooves, and hence are departing from a disk completely.

On completion of the engagement of the gear 39 to the slide cam R 12 and the slide rack 14 as shown in FIG. 37, the traverse mechanism elevation system is solely powered.

Figure 30:
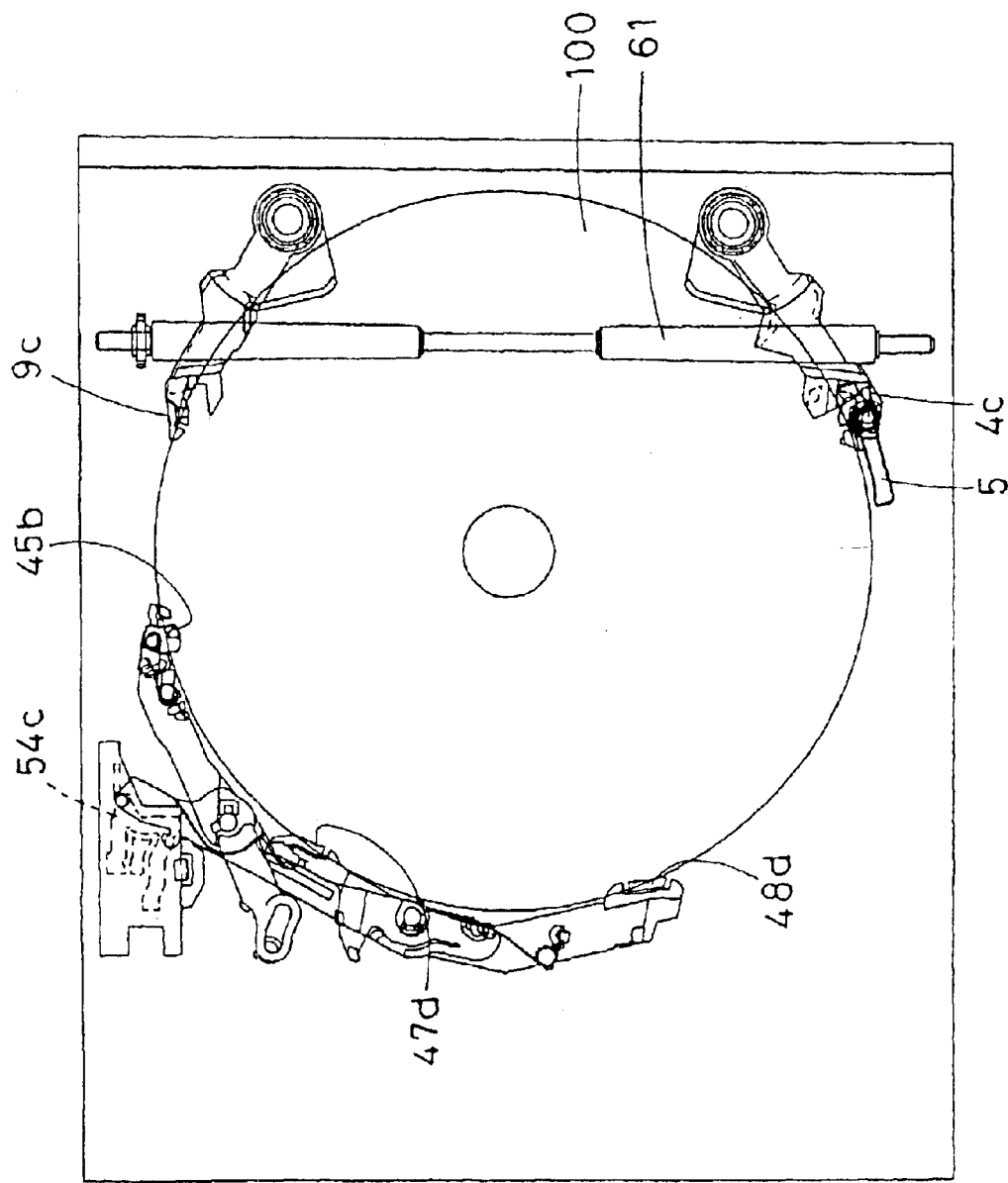
FIG. 30 shows a plan view illustrating the situation that a check lever, a set lever, and a stop arm are slightly departing from a disk.

As shown in FIG. 30, in response to the motion of the slide cam R 12 after the completion of disk insertion, until immediately before the state that the disk 100 is retained by the spindle motor 17 and the clamp unit 50, the 12-cm disk 100 is transferred in the manner that the disk 100 is supported by the out-lever L 4, the out-lever R 9, the set lever 46, and the check lever 48 in the state having a gap of 0.5 mm or the like around the outer edge of the disk 100. This reduces the amount of off-centering during the disk retaining, and hence improves the centering performance.

Figure 31:
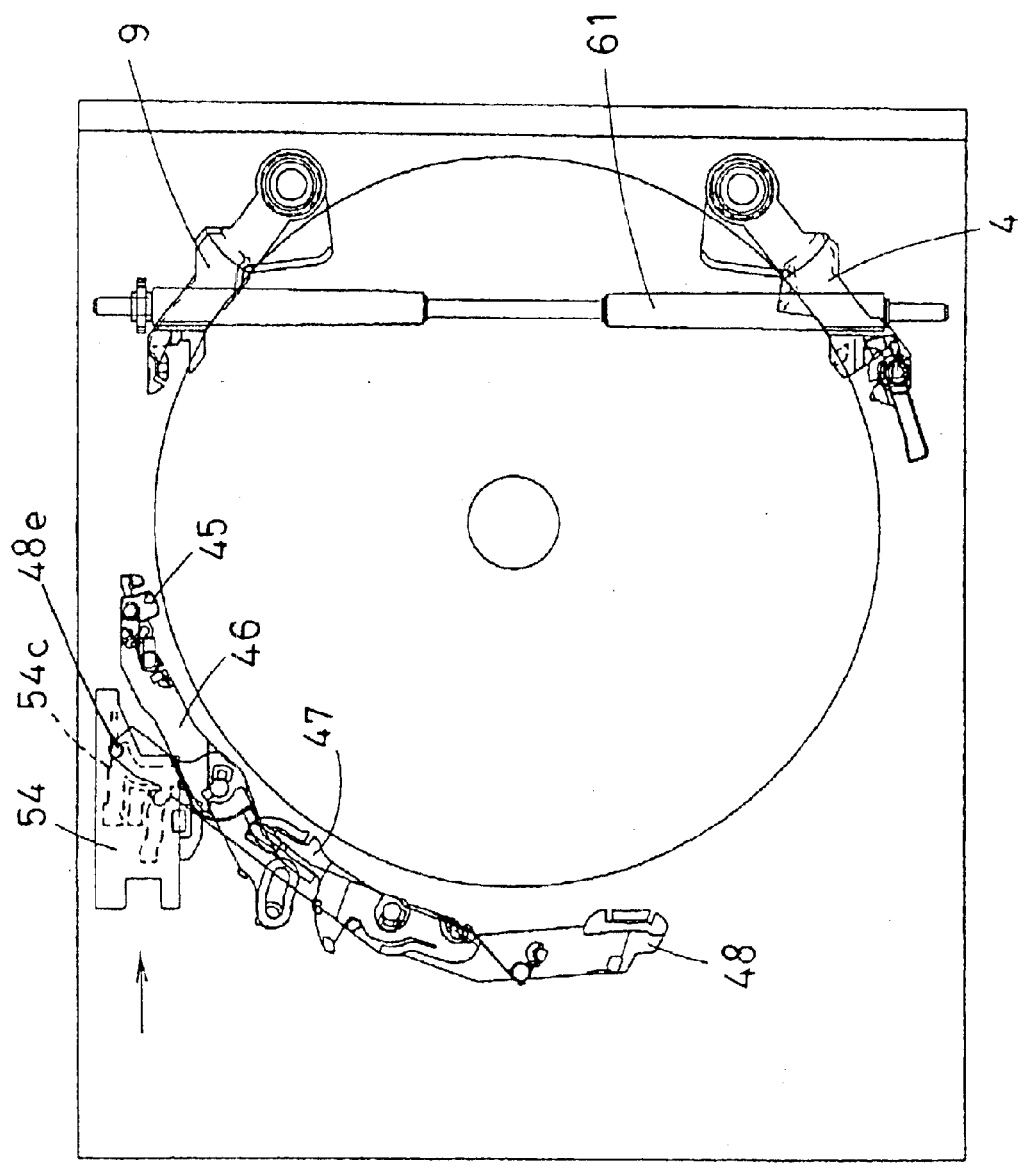
FIG. 31 shows a plan view illustrating the situation that an out-lever, a check lever, a set lever, and a stop arm are departing from a disk.

Immediately before the completion of disk loading, as shown in FIG. 31, the 12-cm disk 100 is transferred in the manner that the disk 100 is supported by the out-lever L 4, the out-lever R 9, the set lever 46, and the check lever 48 in the state having a gap of 1.5–2 mm or the like around the outer edge of the disk 100. This avoids damage to the disk 100 caused by shock and vibration. This permits the disk 100 to be clamped on the disk motor 17 with precise centering.

In linkage with the motion of the slide cam R 12, carried out similarly are the up and down motion of the roller unit 503, the up and down motion of the traverse base 16, and the up and down motion of the top plate 57.

As for the up and down motion of the roller unit 503, as shown in FIGS. 38(*a*) and 39, when the slide cam R 12 does not move, the roller ring 60*a* in the roller guide forming the rack is not affected by the cam section 12*c* of the slide cam R 12. Then, as shown in FIGS. 38(*b*) and 40, depending on the thickness of the disk, the tapered rollers 61 serving as rotary retaining means go down with compressing the spring 60*b*, whereby the driving force of the above-mentioned roller revolution system is transmitted to the disk 100.

As shown in FIGS. 38(*c*) and 41, when the slide cam R 12 starts to move, the roller ring 60*a* in the roller guide engages with the cam section 12*c* of the slide cam R12, whereby the tapered rollers 61 go down. The revolution of the tapered rollers 61 going down stops when the transmission of the driving force from the roller revolution system stops. At last, as shown in FIGS. 38(*d*) and 42, a gap of 1.5–2 mm or the like is ensured around the disk 100. This avoids damage to the disk 100 caused by shock and vibration.

Figure 43:
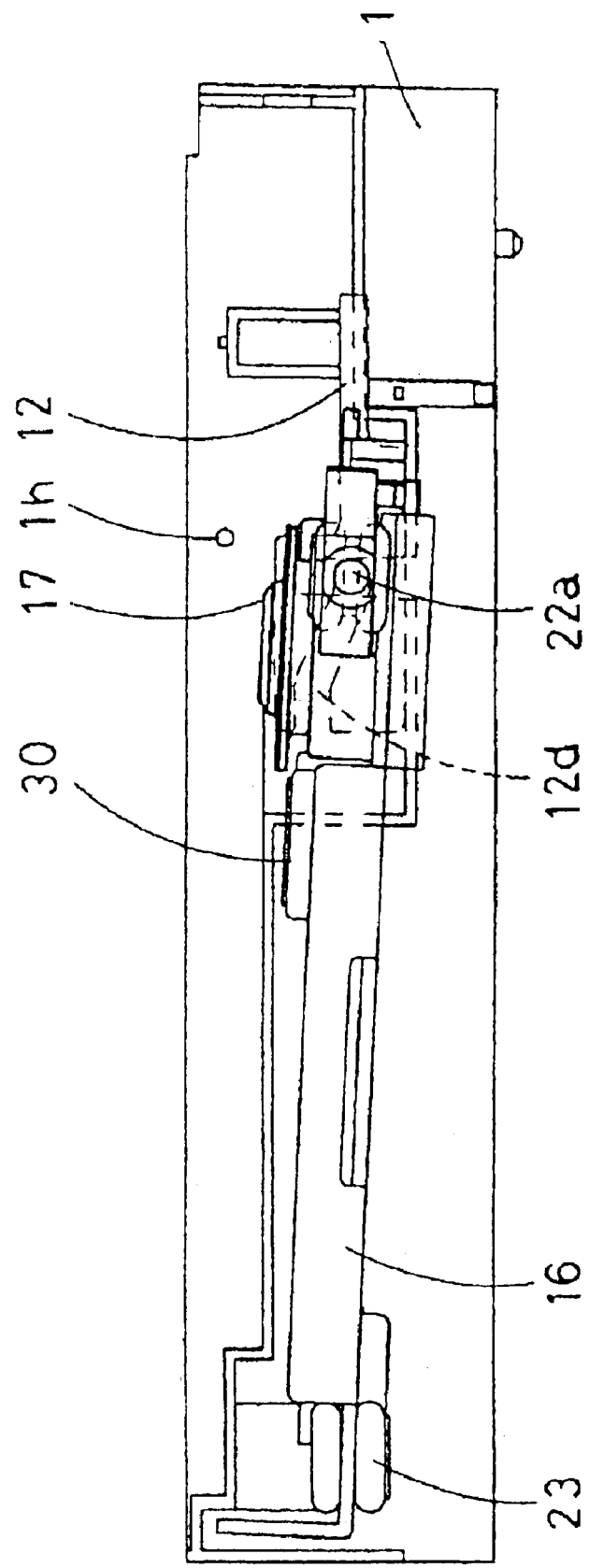
FIG. 43 shows an elevation view illustrating the inclined state before a slide cam unit of a traverse unit moves.

As for the up and down motion of the traverse base 16, as shown in FIG. 43, when the slide cam R 12 does not move, the shafts 22*a* and 22*b* which are guide pins of the traverse chassis 22 attached to the traverse base 16 via the dampers 23 engage with the the cam grooves 12*d* and 13*d* of the slide cam R 12 and the slide cam L13. Accordingly, the traverse base 16 is retained in an inclined state.

In the inclined state, on completion of the disk 100 transfer, the slide cam R 12 starts to move. Then, the slide cam rod 11 causes the slide cam L 13 to move in the opposite direction. Accordingly, the shafts 22*a* and 22*b* engaging with the cam grooves 12*d* and 13*d* move along the cam shapes, whereby the traverse base 16 gradually goes substantially to the level state.

Figure 44:
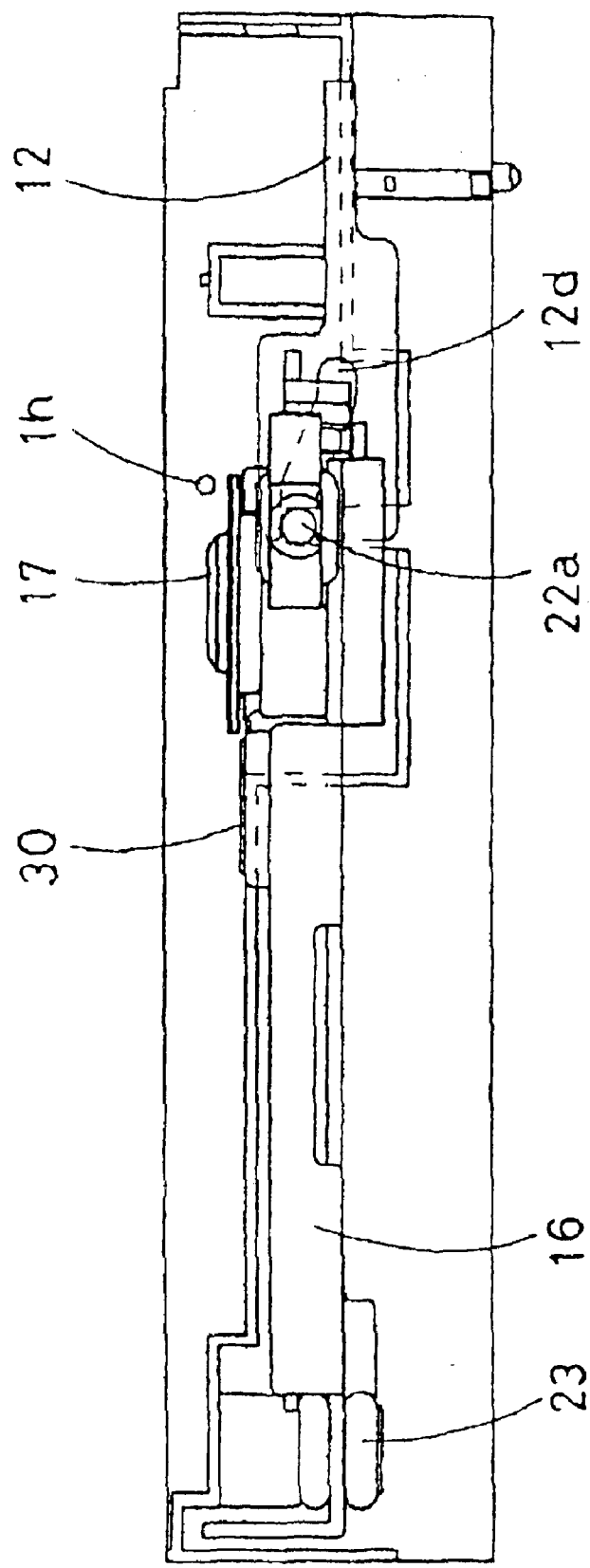
FIG. 44 shows an elevation view illustrating the level state that a slide cam unit has moved, whereby the traverse unit is on the level for disk retaining.

On completion of the disk 100 centering in which the recess 17*a* of the spindle motor 17 engages with the protrusion 55*b* of the clamp unit 508, the traverse base 16 is substantially in the level state as shown in FIG. 44.

Figure 45:
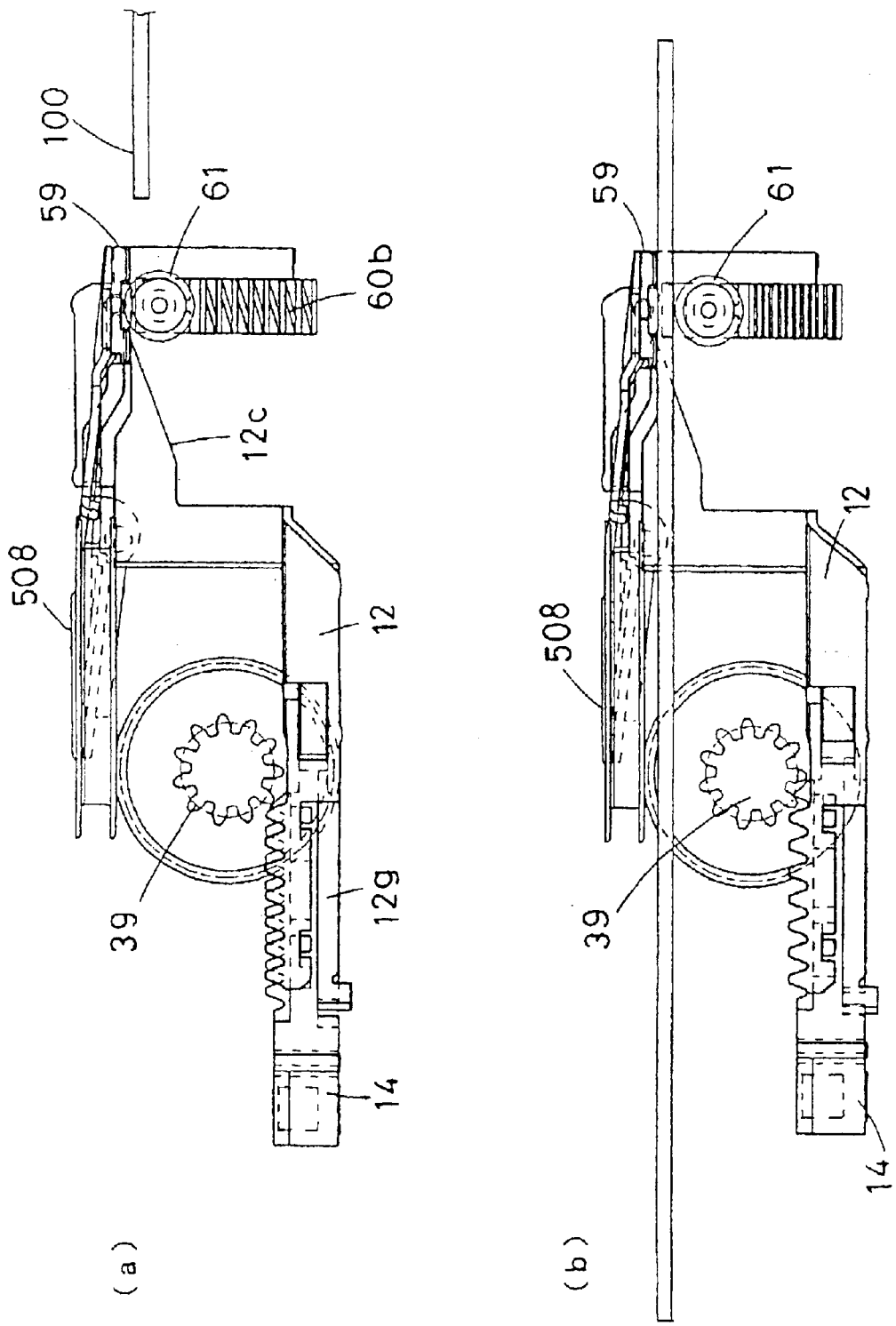
FIG. 45 shows schematic elevation views illustrating the states of a top plate before and after disk insertion.

At last, as for the up and down motion of the top plate 57, as shown in FIG. 45(*a*), when the slide cam R 12 does not move, the top pads 59 for retaining the disk 100 agaist the tapered rollers 61 are substantially in the level state. The clamp retaining section 57*e* of the top plate 57 containing the clamp unit 508 for retaining the disk 100 is sufficiently departing from the disk 100. At this time, in the clamp unit 508, the clamp lock 58 resolves the gap in order to prevent the clamp from drooping and contacting to the disk 100.

As shown in FIG. 45(*b*), when the disk 100 is inserted, the elevation of the top pads 59 is retained by the cam groove 12*b* of the slide cam R 12, whereby the top pads 59 do not move. In contrast, the tapered rollers 61 on the opposing side go down depending on the thickness of the disk 100. Then, the disk 100 is inserted by the driving force from the roller revolution system.

Figure 46:
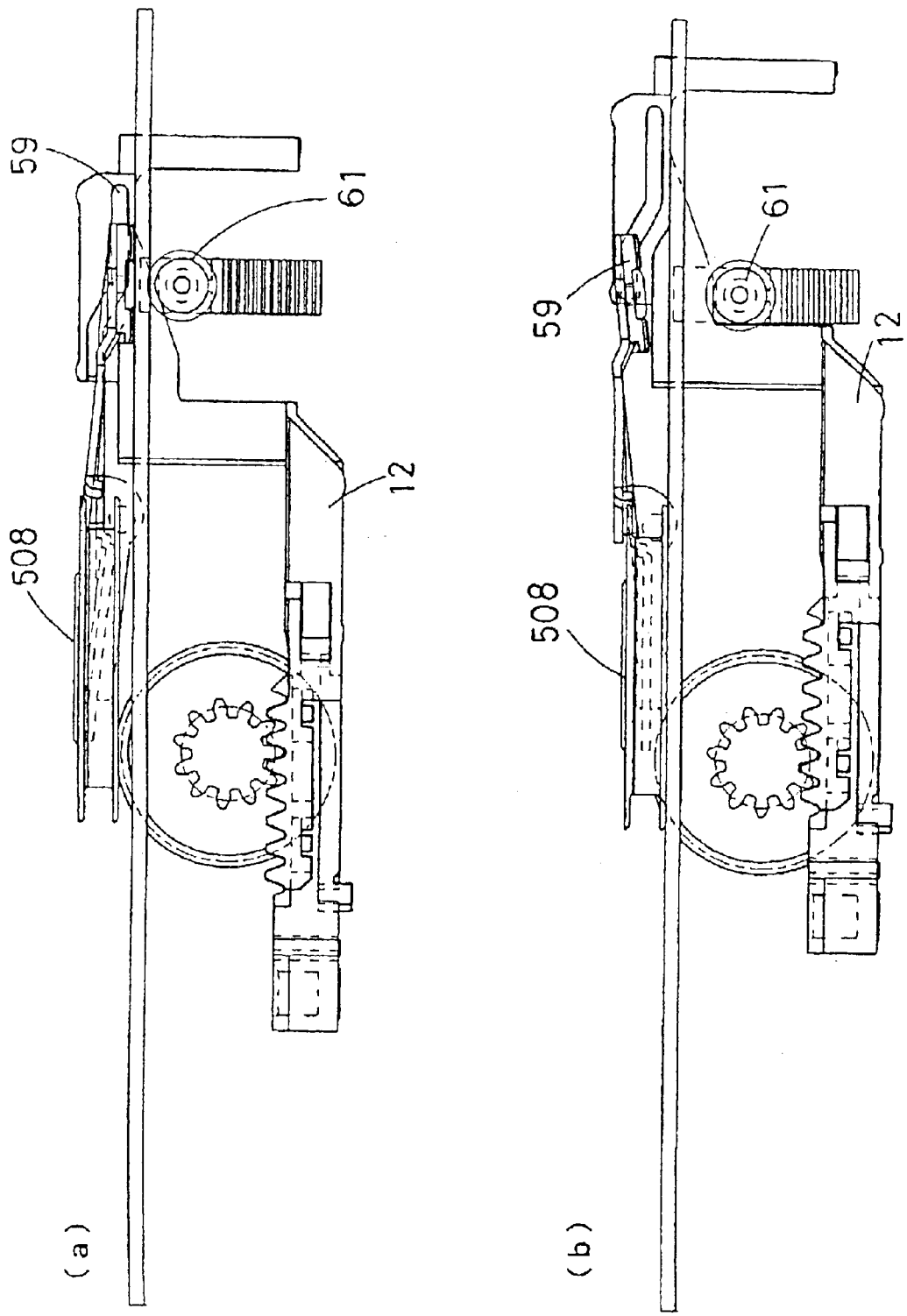
FIG. 46 shows schematic elevation views illustrating the state that a top pad of a top plate departs from a disk, and that a clamp lies on the disk.

After the disk insertion, when the slide cam R 12 starts to move., as shown in FIG. 46(*a*), the top plate 57 rotates gradually by virtue of the cam shape of the slide cam R 12. The top pads 59 are inclined and enforced in the direction departing from the disk 100, whereby the clamp retaining section 57*e* containing the clamp unit 508 goes substantially to the level state. At this time, the clamp lock 58 restricts the elevation of the clamp unit 508, until immediately before the clamp unit 508 clamps the disk 100 aginst the spindle motor 17.

On completion of the disk 100 centring relative to the spindle motor 17 and the clamp unit 508, that is, when the disk 100 is placed on the spindle motor 17 in the centered state, the clamp lock 58 departs from the clamp unit 508 as shown in FIG. 46(*b*). Then, the clamp retaining section 57*e* of the top plate 57 goes substantially to the level state.

The eject action by the eject switch 65*e* is an action reverse to the above-mentioned disk loading action, and hence is carried out by the reversed procedure.

Figure 47:
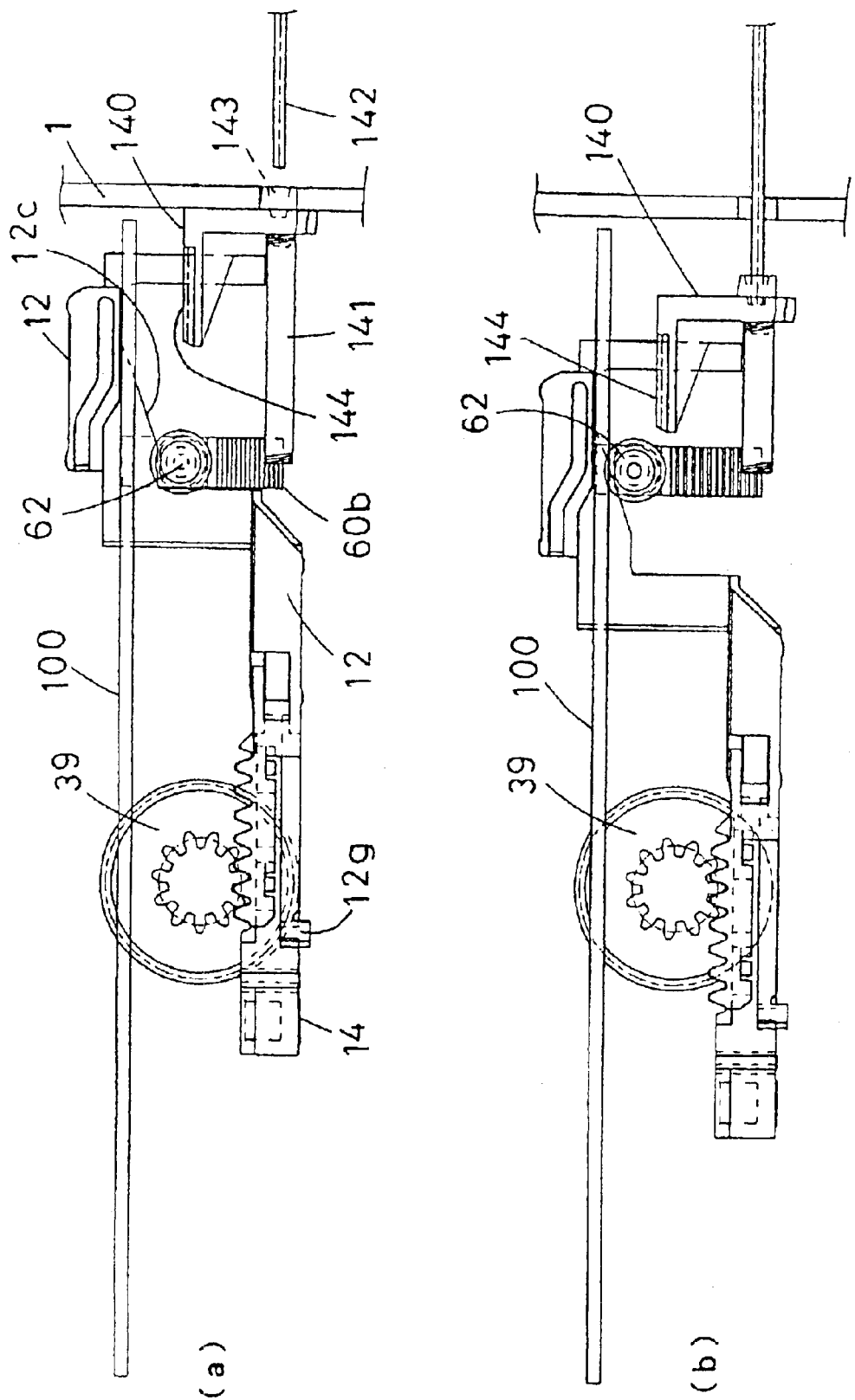
FIG. 47(a) shows a cross sectional view of the main part of a forced ejection mechanism before a pin is inserted.
FIG. 47(b) shows a cross sectional view of the main part of a forced ejection mechanism after a pin is inserted and thereby a slide cam R is moved.
Figure 48:
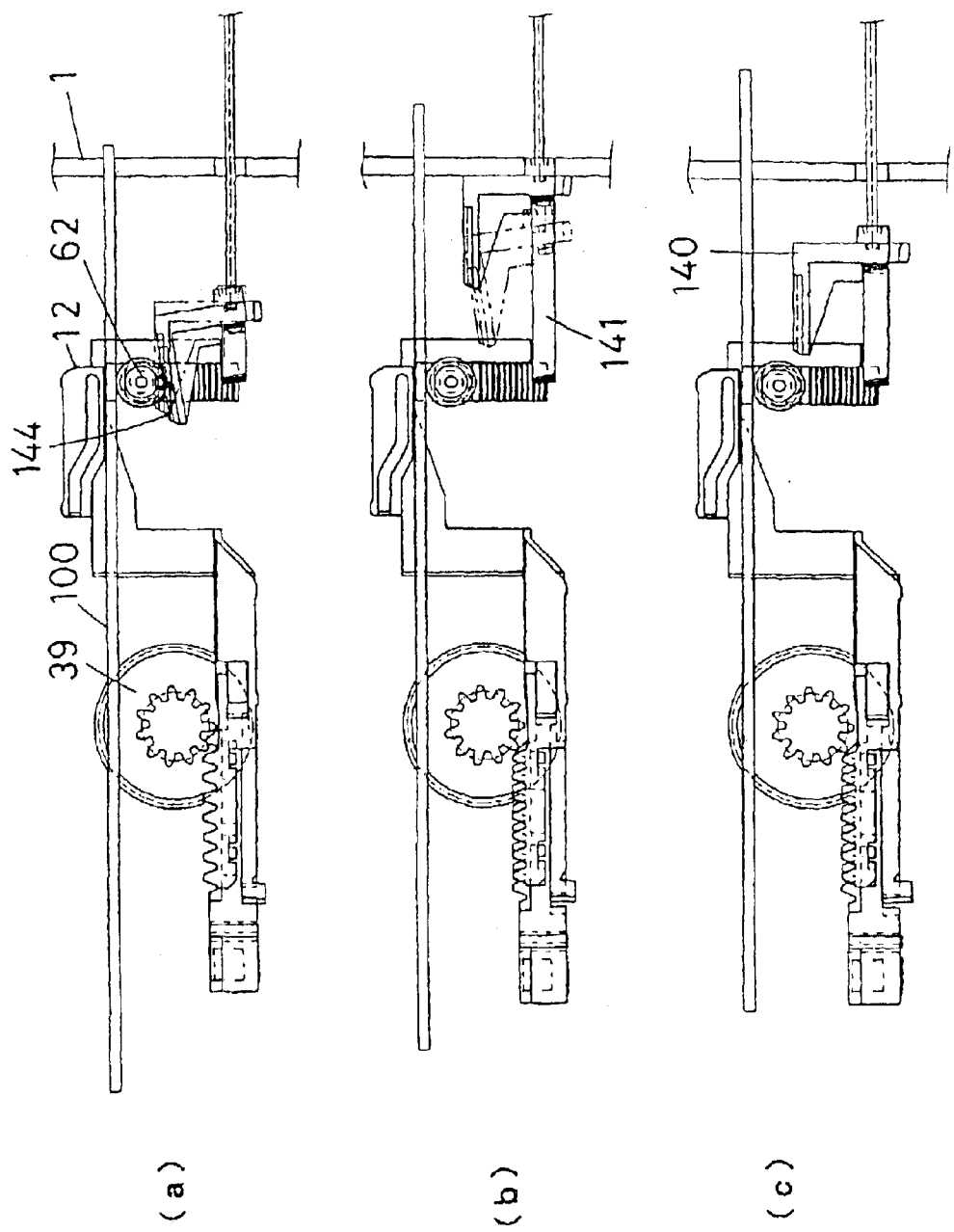
FIG. 48 shows a cross sectional view of the main part in which an ejection lever rotates a roller gear repeatedly in order to eject a disk.

FIGS. 47 and 48 show the forced ejection mechanism and its operation. The forced ejection mechanism is a disk ejection mechanism used when the power is off. The forced ejection mechanism comprises: means for enforcing and pressing manually the slide cam R 12 in the direction opposite to that of disk loading; and means for enforcing and rotating manually the roller gear 62 in the direction that the disk 100 is transferred out.

FIG. 47(*a*) shows: the slide cam R 12; and the eject lever 140 forming a fourth rack provided in the vicinity of the slide cam R 12; in the state that the loading is completed. The eject lever 140 is enforeced such as to be pressed against the inner surface of the mechanism chassis 1, by the spring 141. In order to eject the disk 100 inside the loading mechanism, the eject lever 140 is pressed against the spring 141 by the pin 142 through the hole 143 in the mechanism chassis 1.

As shown in FIG. 47(*b*), the eject lever 140 pressed by the pin 142 engages with the slide cam R 12, whereby the slide cam R 12 is moved to the position of the completion of traveling of the slide cam R 12 at disk ejection. Accordingly, the tapered rollers 61 go up and thereby contact to the outer edge of the disk 100. At this time, the upper rack 144 of the eject lever 140 engages with the gear 62, and thereby rotates the gear 62 in the direction of the disk 100 ejection. In response to the rotation, the disk 100 is ejected.

As shown in FIG. 48(*a*), the pin 142 can not be pressed freely exceeding the position of the completion of traveling of the slide cam R 12. Accordingly, when the pin 142 is fully pressed, a moment is exerted on the eject lever 140. This moment rotates the eject lever 140, and thereby disengages the uppe rack 144 and the gear 62.

As shown in FIG. 48(*b*), when the pressing force exerted on the pin 142 being fully pressed is released, the pin 142 is pressed back out of the apparatus by the enforcing spring 141. At this time, with the rotation being maintained, the eject lever 140 returs to the position shown in FIG. 47(*a*).

As shown in FIG. 48(*c*), in the situation that the slide cam R 12 is down at the position of the completion of traveling at ejection, when the eject lever 140 is pressed again by the pin 142, the upper rack 144 of the eject lever 140 engages with the gear 62, and thereby rotates the gear 62 in the direction of the disk 100 ejection. Accordingly, the tapered rollers 61 rotate. In response to the rotation, the disk 100 is ejected.

The disk 100 ejection is achieved by repeating the operation shown in FIG. 48. The pin 142 is operated manually.

As an electrical forced disk ejection mechanism, when the frequency or the duration in which the eject switch 65e is pressed through the eject button 10 is high or long, respectively, the disk may be moved towards the ejection during the pressing of the eject button 10. Further, when the frequency and the duration are low and short, respectively, the eject button 10 may be used as a load/eject switch for normal use. As such, the single eject switch 65e can select various transferring modes. Further, in case that the eject switch 65e is pressed depending on the detection operation of the switch for detecting the completion of disk loading or the switch for detecting the completion of disk ejection, when the switch is pressed, for example, during disk loading, ejection may be carried out by the disk transferring means. When the switch is pressed during disk ejection, and when the duration is, for example, 1 sec or shorter, the mode maybe changed into disk loading. In contrast, when the duration is longer, the mode may be determined as electrical forced disk ejection, whereby the disk is moved towards the ejection during the pressing of the eject button 10.

Figure 49:
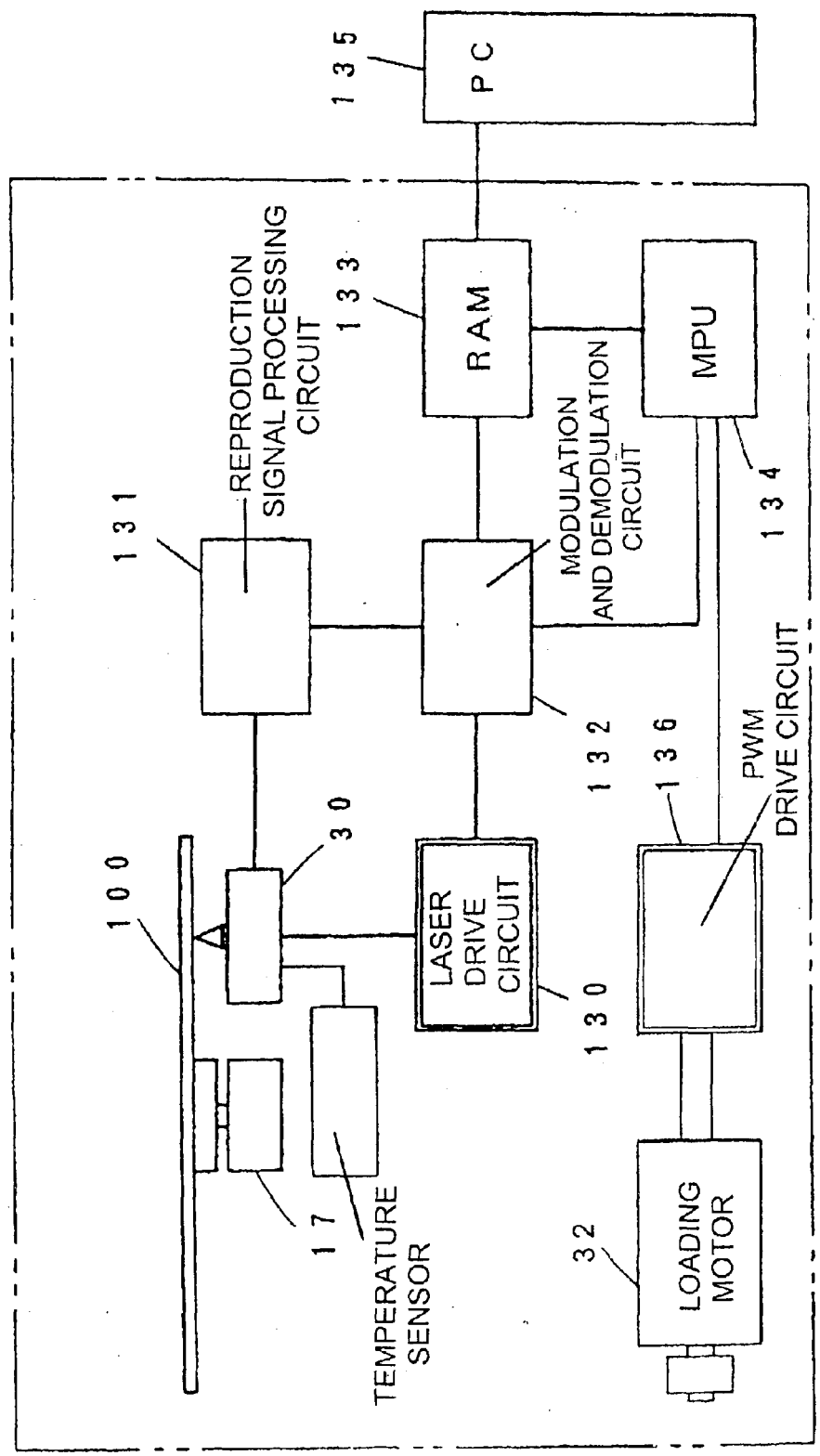
FIG. 49 shows a block diagram of a circuit system of a disk loading apparatus.

FIG. 49 is a block diagram showing the configuration of this disk loading apparatus provided on the P board 65. A laser drive circuit 130 causes the optical pickup (head) 30 to irradiate the disk 100 with laser light. The signal from the disk 100 is received by the light receiving section of the optical pickup 30, and then processed by a reproduction signal processing circuit 131. Numeral 132 indicates a modulation and demodulation circuit thereof. Numeral 133 indicates a RAM. Numeral 134 indicates a micro-processing unit (MPU). Numeral 135 indicates a personal computer (PC). The optical pickup 30 is provided with a temperature sensor for measuring the temperature in the vicinity of the recording film in the disk 100.

Numeral 136 indicates a PWM drive circuit for motor system. In the PWM (pulse width modulation), a constant voltage is supplied as pulses. By changing the width of the supplied pulses, the drive circuit supplies a current equivalent to the integration of the supplied pulses to the motor 17.

The PWM drive circuit can control precisely the drive current to the motor 17. Accordingly, in case that the profile of the supplied current is set in firmware, no changing is necessary for the circuit constants and the drive mechanism. Further, the circuit contributes to reduction in the operation sound and improvement in the reliability.

In general, lower loading sound is preferable during the ordinary use. Accordingly, gera ratios in the loading mechanism and firm specification are set assuming the use of standard disks. Nevertheless, in the use of abnormal disks or at low temperatures, the torque can be insufficient. This has caused the problem that the disk cannot be transferred, and the like.

According to the invention, the firmware specification of load and eject operations is set different between guaranteed temperature conditions and unguaranteed temperature conditions of 5° C. or lower where the load to the loading mechanism increases. Thus, the above-mentioned problem is resolved. Temperature for the mode switching is measured by the temperature sensor in the optical pickup 30.

FIG. 50 shows the profiles in the PWM drive circuit of a disk loading apparatus according to the invention during disk loading and disk ejection. In FIG. 50(*a*), the vertical axis indicates PWM drive voltage, while the horizontal axis indicates the time during the operation. In FIG. 50(*b*), the vertical axis indicates PWM drive current which is the integration of the supplied pulses from the PWM drive circuit to the motor, while the horizontal axis indicates the time during the operation. For example, when the reference voltage is 12 V, and when the pulse duty is 50%, the current supplied to the motor is equivalent to a constant current of 6 V.

FIG. 51(*a*) shows the profiles in the PWM drive circuit during the disk loading within the guaranteed temperature range. In general, during disk loading, disk transfer needs a longer time, and thereby is operated at the pulse duty of a % in order to reduce the loading sound. Motion of the traverse base needs a high power but completes immediately, and thereby is operated at the pulse duty of b %.

In the disk loading mechanism using tapered rollers 61, a higher load during disk transfer is caused by: sticked adhessive and cutting fins on the disk thickness and the disk edge; and coating on the label surface of the disk 100. Further, as a result of aging, slip occurs in the tapered rollers 61 and the shafts 60 and between the belt 36 and the pulleies. This reduces the transmitted torque, and thereby causes a ligher load during disk transfer.

Even in case of disk transfer at such a ligh load, the initial duty of a % in which the disk 100 cannot be transferred goes to b % as time precedes. This permits smooth transfer of the disk 100, and thereby avoids problems in the normal use. For the purpose of this, the time-out is set at twice or longer of the normal loading time. Further, the pulse duty is set at maximum when the time is out.

FIG. 51(*b*) shows the profiles in the PWM drive circuit during the disk loading outside the guaranteed temperature range. Assumed is disk loading in early morning in mid winter. The PWM pulse duty is set at c % which is higher than the value b % used within the guaranteed temperature range. In general, the load to the loading mechanism at low temperatures increases as high as 1.5 times or greater of that at normal temperatures. Accordingly, the time-out is set at four times or longer of the normal loading time.

FIG. 52(*a*) shows the profiles in the PWM drive circuit during the disk ejection within the guaranteed temperature range (normal usable temperature range). In general, during disk ejection, motion of the traverse base needs a high power but completes immediately, and thereby is operated at the pulse duty of b %. In contrast, disk transfer needs a longer time, and thereby is operated at the pulse duty of a % in order to reduce the loading sound.

Even in case of the disk 100 transfer at ligh load, the initial duty of a % in which the disk 100 cannot be transferred goes to b % as time procedes. This permits smooth transfer of the disk 100, and thereby avoids problems in the normal use. For the purpose of this, the time-out is set at twice or longer of the normal loading time. Further, the pulse duty is set at maximum when the time is out.

FIG. 52(*b*) shows the profiles in the PWM drive circuit during the disk ejection outside the guaranteed temperature range. Assumed is the disk 100 ejection in early morning in mid winter. The PWM pulse duty is set at c % which is higher than the value b % used within the guaranteed temperature range. In general, the load to the loading mechanism at low temperatures increases as high as 1.5 times or greater of that at normal temperatures. Accordingly, the time-out is set at four times or longer of the normal loading time.

Figure 53:
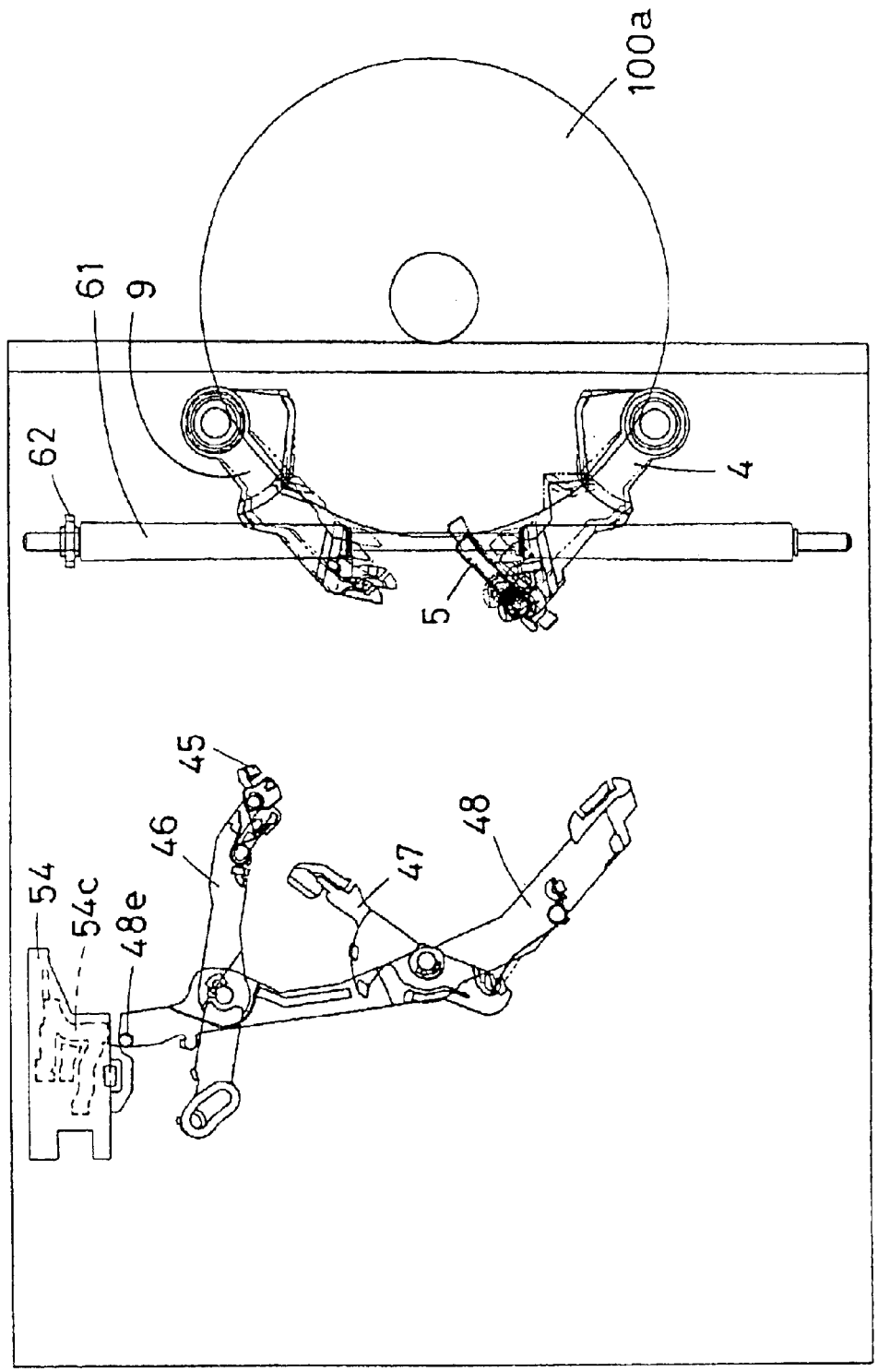
FIG. 53 shows the situation before an 8-cm disk is inserted.
Figure 54:
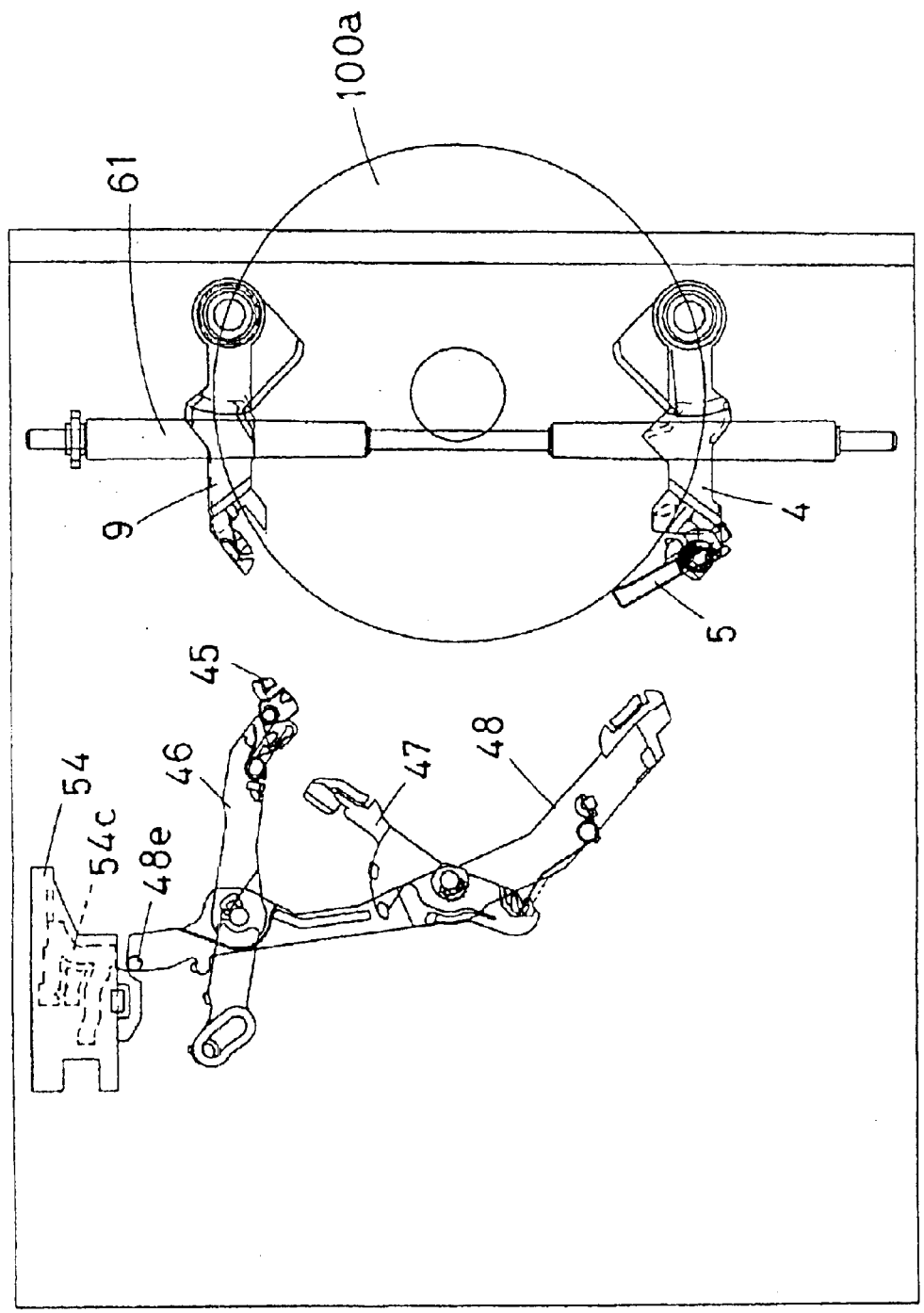
FIG. 54 shows the situation that an 8-cm disk opens an out-lever.

FIGS. 53–58 show the loading operation of an 8-cm disk. FIG. 53 corresponds to FIG. 25. FIG. 54 corresponds to FIG.

Figure 55:
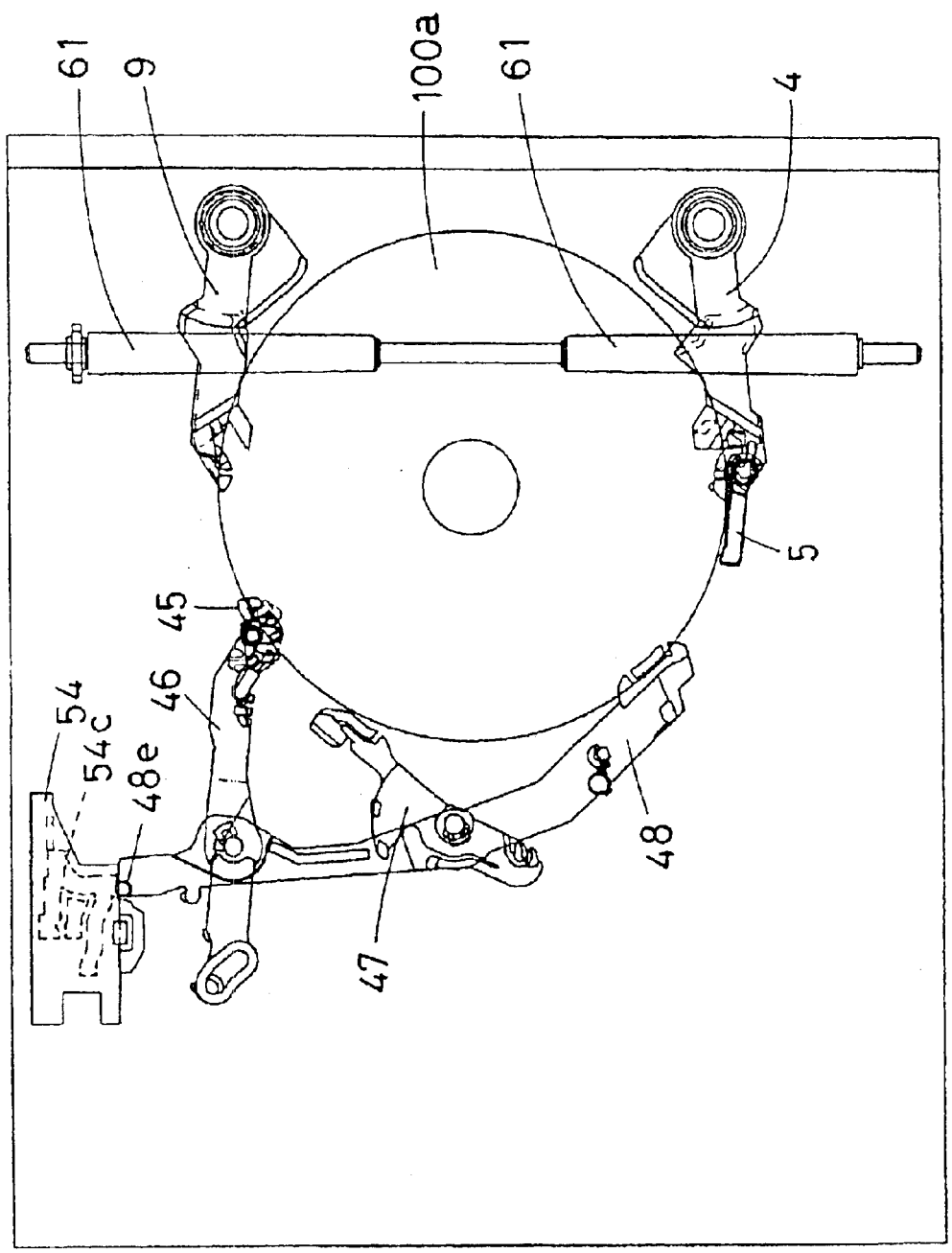
FIG. 55 shows the situation that the outer edge of a disk confronts a set lever and a check lever.
Figure 56:
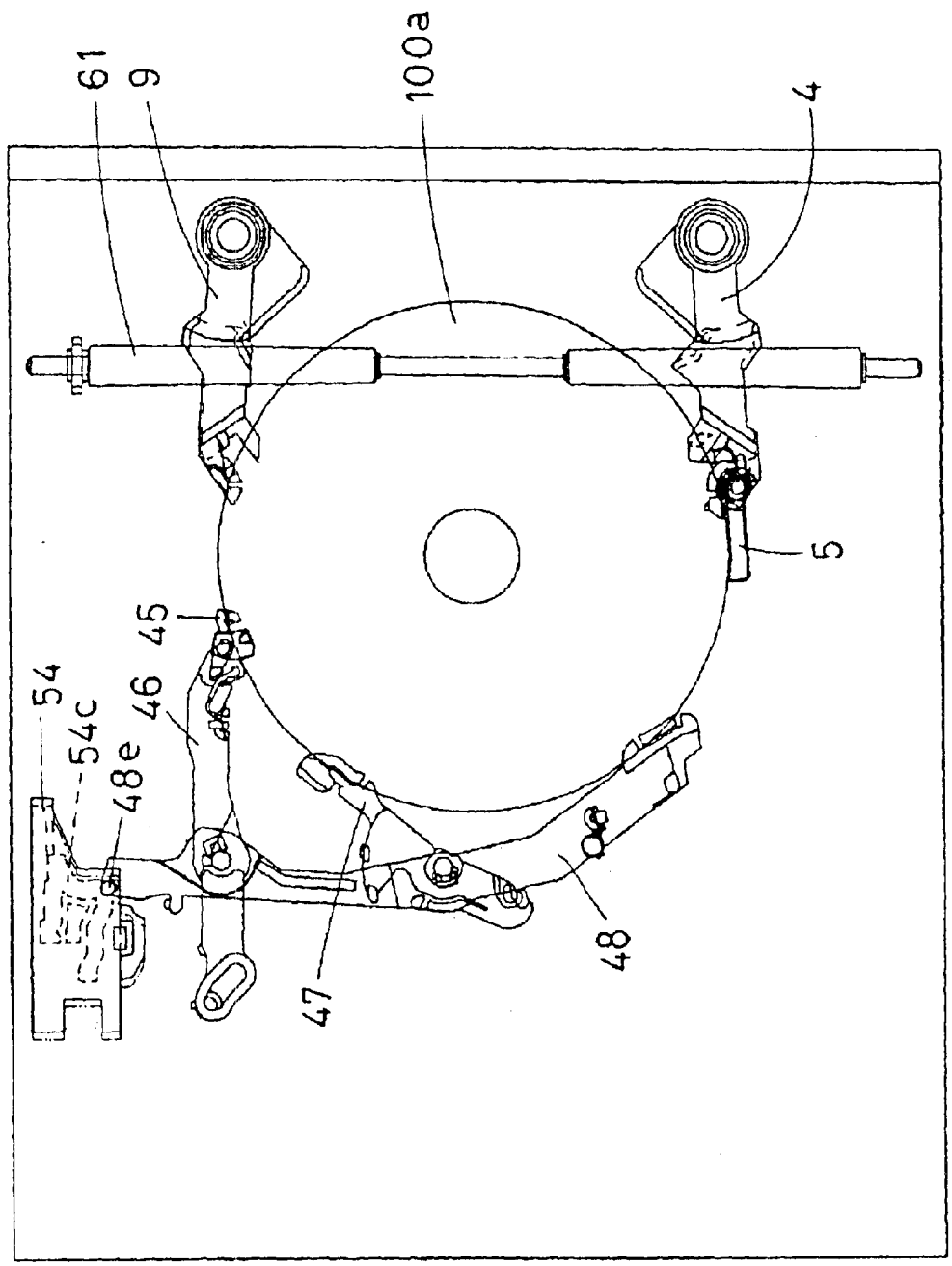
FIG. 56 shows the situation that a disk is further transferred, and thereby confronts a stop arm.
Figure 57:
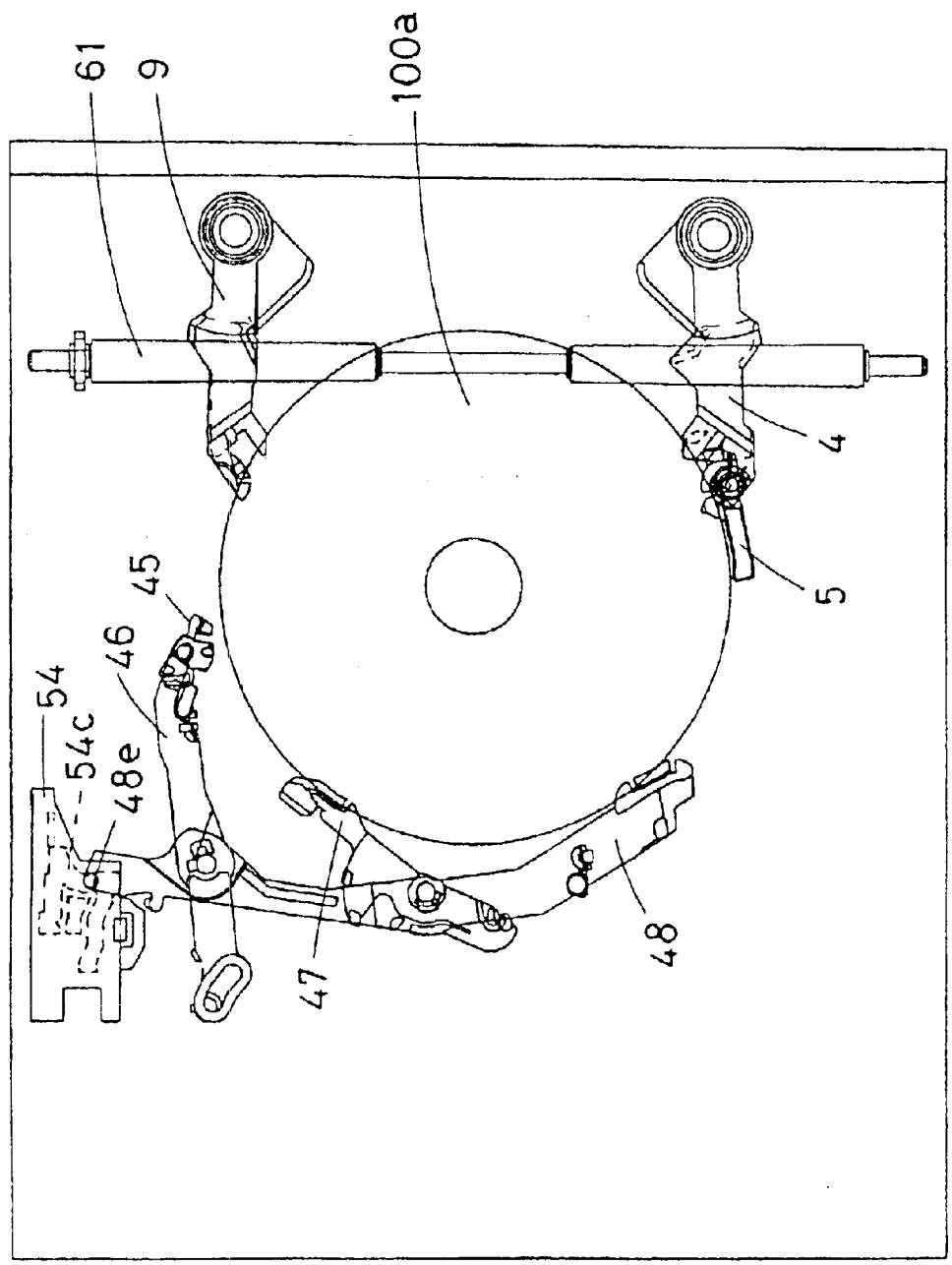
FIG. 57 shows the situation that a stop arm stops.
Figure 58:
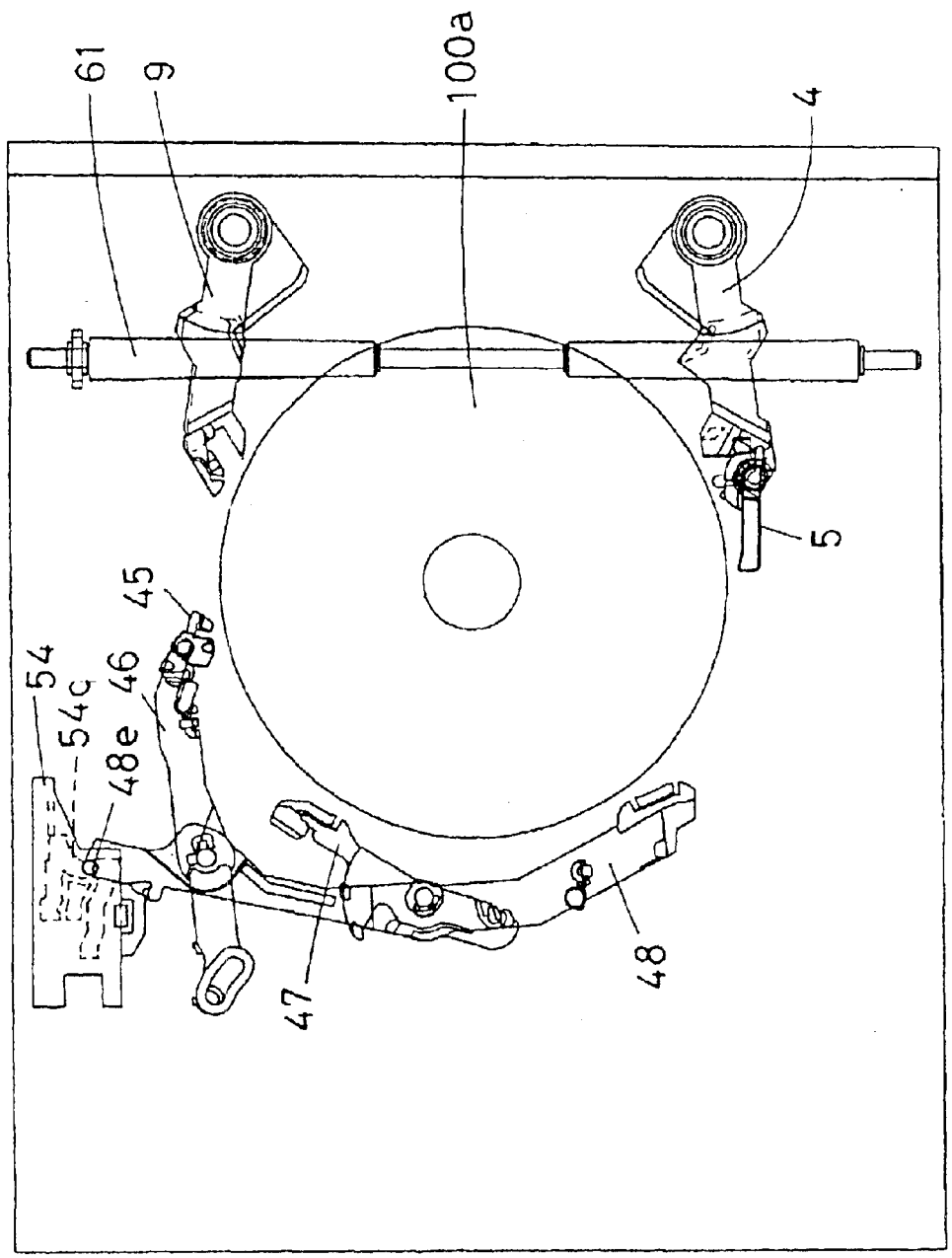
FIG. 58 shows the situation that a disk is clamped on a spindle motor.

27. FIG. 55 corresponds to FIG. 28. FIG. 56 corresponds to FIG. 29. FIG. 57 corresponds to FIG. 30. FIG. 58 corresponds to FIG. 31. As seen from the comparison between these figures, the degree of opening between the in-push arm 5 attached at the tip of the out-lever L 4 and the out-lever R 9 during disk insertion, because the 8-cm disk is smaller than a 12-cm disk. Further, the degree of engagement among the side arm 45, the set lever 46, the stop arm 47, and the check lever 48 is different in the course of disk transfer. The transfer path is determined by the cam grooves in the check plate 53 and the check cam 54. That is, as shown in FIG. 55, the outer edge of the disk 100a confronts the confronting sections of the set lever 46 and the check lever 48, and thereby causes rotation and opening actions. As shown in FIG. 56, the outer edge of the disk 100a further confronts the stop arm 47, whereby the rib 48e of the check lever 48 engages with the cam groove 54c of the check cam 54, in the vicinity of the entrance. As shown in FIG. 57, until the rotation of the stop arm 47 stops, the check lever 48 and the set lever 46 rotate. At this time, the set lever 46 departs from the disk 100a, because the 8-cm disk is smaller than a 12-cm disk. The pin 48e stops at an intermediate position before reaching the far end of the cam groove 54 of the check cam 54c. During that time, the check cam 54 moves, whereby the slide rack 14 engages with the slide cam R 12. As shown in FIG. 58, the check cam 54 is moved by the loading motor 32, whereby the pin 48e rotates further. Accordingly, the check lever 48 and the stop arm 47 rotate further and thereby depart from the disk 100a. As shown in FIG. 60, in the stop arm 47, when the pin 48c of the check lever 48 enters from the engagement section 53g6 into the groove 53g7, the protrusion 47c disengages from the engagement section 53u, and then passes the protrusion 53w and the protrusion 53x of the engagement groove 53j, between the protrusions 47f and 47g in the stop arm 47. At the same time, the protrusion 47g confronts the side surface of the protrusion 53x, and then slides along the side surface, whereby the confronting section 47d rotates and departs from the disk 100a.

The loading operation is the same as that for a 12-cm disk 100, except for the lever conformation described above in the disk transfer.

INDUSTRIAL APPLICABILITY

As described above, a disk loading apparatus in a recording and reproducing apparatus according to the invention is advantageously used in a recording and reproducing apparatus for disks such as optical disks.

What is claimed is:

1. A disk loading apparatus comprising:
   first retaining means which is arranged in a slot for a disk to be inserted and thereby retains the outer edge of said disk so as to permit said disk inserted into said slot to pass through said slot;
   transferring means for transferring said disk retained by said first retaining means to a predetermined position;
   second retaining means which is arranged in the interior from said slot and thereby retains the outer edge of said disk retained by said first retaining means and transferred by said transferring moans; and
   rotating means for rotating said disk at said predetermined position, wherein:
   each of said first retaining means and said second retaining means has a contact section for contacting with the outer edge, upper surface, and lower, surface of said disk in a slidable manner, and
   the transfer level at which said disk is transferred by said transferring means and the rotation level at which said disk is rotated by said rotating means are made to be almost the same.

2. The disk loading apparatus according to claim 1, wherein:
   each of said first retaining means and said second retaining means has groove-shaped confronting sections for engaging with the outer edge of said disk in a slidable manner; and
   at the beginning of engagement between said disk and said rotating means, each said confronting section stays at a position in which the groove bottom of the confronting section is slightly departing from the outer edge of said disk, while on completion of the engagement between said disk and said rotating means, each said confronting section retracts to a position substantially departing from the outer edge of said disk.

3. The disk loading apparatus according to claim 1 or 2, wherein said first retaining means comprises a pair of levers which grip the outer edge of said disk in a slidable manner and are arranged at positions symmetric with respect to the transfer direction of said disk.

4. The disk loading apparatus according to claim 3, wherein at least one lever in said pair of levers comprises an arm for contacting with said disk at first when said disk is inserted into said disk loading apparatus.

5. The disk loading apparatus according to claim 3, wherein at least one lever in said pair of levers comprises an arm for contacting with said disk at last when said disk is ejected from said disk loading apparatus.

6. The disk loading apparatus according to claim 3, wherein said pair of levers comprise a link mechanism in which a motion of one lever causes a motion of the other lever.

7. The disk loading apparatus according to claim 1 or 2, wherein said second retaining means comprises three levers.

8. The disk loading apparatus according to claim 7, wherein said three levers are configured such that a second lever and a third lever are attached to a first lever.

9. The disk loading apparatus according to claim 8, wherein said second lever or said third lever comprises a rotary arm for retaining the outer edge of said disk in a slidable manner.

10. The disk loading apparatus according to claim 1 or 2 wherein said second retaining means comprises:
    three levers; and
    cam plates for engaging with said levers and thereby defining the path of disk transfer.

11. The disk loading apparatus according to claim 10, wherein said cam plates comprise a first cam plate fixed to said disk loading apparatus and a second cam plate which is movable.

12. The disk loading apparatus according to claim 1 or 2, wherein said transferring means for said disk comprises:
    a transfer mechanism for pressing and retaining the outer circumference solely of said disk;
    a motor and a series of gears for driving said transfer mechanism; and
    racks capable of engaging with and departing from at least one gear in said series of gears.

13. The disk loading apparatus according to claim 12, wherein said transfer mechanism comprises a pair of rotary retaining members which are arranged opposingly to each other in the direction perpendicular to the disk transfer direction and parallel to the disk and thereby move the outer circumference of said disk by friction.

14. The disk loading apparatus according to claim 13, wherein said series of gears further comprise a clutch capable of engaging with and departing from a gear of at least one rotary retaining member.

15. The disk loading apparatus according to claim 12, wherein said transfer mechanism comprises:
   a fixed member for sliding along the outer circumference of said disk; and
   a rotary retaining member for moving the outer circumference of said disk by friction, wherein:
   said fixed and rotary retaining members are arranged opposingly to each other in the direction of disk thickness.

16. The disk loading apparatus according to claim 15, wherein said racks comprise a rack capable of engaging with and departing from a gear of said rotary retaining member.

17. The disk loading apparatus according to claim 12, wherein said racks comprise:
   a first rack engaging with said second retaining means; and
   a second rack not engaging with said second retaining means but slidable along said first rack, wherein:
   when said first rack is moved by said second retaining means, each of said first rack and said second rack engages with a gear in said series of gears.

18. The disk loading apparatus according to claim 17, wherein said racks further comprise a third rack for acting symmetrically to said second rack by means of a link mechanism.

19. The disk loading apparatus according to claim 18, wherein said rotating means for said disk comprises:
   a disk motor for retaining said disk;
   a clamp arranged opposingly to said disk motor across said disk; and
   a clamp restricting member capable of engaging with and departing from said clamp, wherein:
   each of said second rack and said third rack is provided with:
      a cam groove for an up and down motion of said rotating means for said disk;
      a cam groove for an up and down motion of said clamp; and
      a cam groove for the engagement motion of said clamp restricting member.

20. The disk loading apparatus according to claim 1 or 2, wherein said rotating means for said disk comprises:
   a disk motor for retaining said disk;
   a clamp arranged opposingly to said disk motor across said disk;
   a clamp restricting member capable of engaging with and departing from said clamp; and
   rotatable restricting member retaining means which loads the clamp restricting member.

21. A disk loading apparatus comprising:
   a mechanism chassis for containing a mechanism; and
   a frame serving as a cover capable of engaging with and departing from said mechanism chassis, wherein:
   each of both side surfaces of said mechanism chassis is provided with a groove open forward and backward, and
   said frame is provided with bent members each capable of engaging with and departing from said groove.

22. A disk loading apparatus comprising:
   a switch for detecting the completion of disk loading;
   a switch for detecting the completion of disk ejection;
   a disk ejection switch; and
   disk transferring means for transferring a disk in response to said disk ejection switch, wherein:
   when said disk ejection switch is pressed, the method of disk ejection is changed in said disk transferring means depending on the state of said switch for detecting the completion of disk loading or said switch for detecting the completion of disk ejection.

23. A disk loading apparatus comprising:
   disk transferring means;
   a drive circuit for said disk transferring means; and
   temperature detecting means, wherein:
   said drive circuit comprises a PWM drive circuit, whereby the operation duty of said disk transferring means is changed on the basis of the detected temperature.

24. The disk loading apparatus according to claim 23, wherein:
   a time-out limit is provided in the PWM drive of said drive circuit, and
   said time-out limit is set at or longer than the twice of either the disk loading time or the disk ejection time at normal temperatures.

25. A disk loading apparatus comprising:
   disk transferring means;
   a drive circuit for said disk transferring means; and
   disk rotating means, wherein:
   said drive circuit comprises a PWM drive circuit, and
   the operation duty during disk insertion and disk ejection is set lower than the value for an up and down motion of said disk rotating means after the disk is loaded.

* * * * *